(12) United States Patent
Bollinger et al.

(10) Patent No.: US 8,046,990 B2
(45) Date of Patent: Nov. 1, 2011

(54) SYSTEMS AND METHODS FOR IMPROVING DRIVETRAIN EFFICIENCY FOR COMPRESSED GAS ENERGY STORAGE AND RECOVERY SYSTEMS

(75) Inventors: Benjamin R. Bollinger, West Lebanon, NH (US); Troy O. McBride, West Lebanon, NH (US)

(73) Assignee: SustainX, Inc., West Lebanon, NH (US)

( * ) Notice: Subject to any disclaimer, the term of this patent is extended or adjusted under 35 U.S.C. 154(b) by 0 days.

(21) Appl. No.: 13/026,920

(22) Filed: Feb. 14, 2011

(65) Prior Publication Data

US 2011/0138797 A1 Jun. 16, 2011

Related U.S. Application Data

(63) Continuation of application No. 12/794,237, filed on Jun. 4, 2010.

(60) Provisional application No. 61/184,191, filed on Jun. 4, 2009, provisional application No. 61/222,286, filed on Jul. 1, 2009, provisional application No. 61/242,526, filed on Sep. 15, 2009, provisional application No. 61/256,484, filed on Oct. 30, 2009.

(51) Int. Cl.
*F16D 31/02* (2006.01)

(52) U.S. Cl. .................. 60/410; 60/413; 60/416

(58) Field of Classification Search .......... 60/408, 60/410, 413, 414, 415, 416, 427, 483
See application file for complete search history.

(56) References Cited

U.S. PATENT DOCUMENTS

| | | | |
|---|---|---|---|
| 114,297 A | 5/1871 | Ivens et al. | |
| 224,081 A | 2/1880 | Eckart | |
| 233,432 A | 10/1880 | Pitchford | |
| 1,635,524 A | 7/1927 | Aikman | |
| 1,681,280 A | 8/1928 | Bruckner | |
| 2,025,142 A | 12/1935 | Zahm et al. | |
| 2,042,991 A | 6/1936 | Harris, Jr. | |
| 2,141,703 A | 12/1938 | Bays | |
| 2,280,100 A | 4/1942 | SinQleton | |
| 2,280,845 A | 4/1942 | Parker | |
| 2,404,660 A | 7/1946 | Rouleau | |
| 2,420,098 A | 5/1947 | Rouleau | |
| 2,539,862 A | 1/1951 | Rushinq | |
| 2,628,564 A | 2/1953 | Jacobs | |
| 2,712,728 A | 7/1955 | Lewis et al. | |
| 2,813,398 A | 11/1957 | Wilcox | |
| 2,829,501 A | 4/1958 | Walls | |
| 2,880,759 A | 4/1959 | Wisman | |

(Continued)

FOREIGN PATENT DOCUMENTS

BE 898225 3/1984

(Continued)

OTHER PUBLICATIONS

"Hydraulic Transformer Supplies Continuous High Pressure," Machine Design, Penton Media, vol. 64, No. 17, (Aug. 1992), 1 page.
Lemofouet, "Investigation and Optimisation of Hybrid Electricity Storage Systems Based on Compressed Air and Supercapacitors," (Oct. 20, 2006), 250 pages.
Cyphelly et al., "Usage of Compressed Air Storage Systems," BFE-Program "Electricity," Final Report, May 2004, 14 pages.

(Continued)

*Primary Examiner* — Michael Leslie
(74) *Attorney, Agent, or Firm* — Bingham McCutchen LLP

(57) ABSTRACT

The invention relates to power generation and energy storage and recovery. In particular, the invention relates to compressed gas energy storage and recovery systems using staged pneumatic conversion systems for providing narrow pressure ranges to a hydraulic motor.

20 Claims, 42 Drawing Sheets

U.S. PATENT DOCUMENTS

| | | |
|---|---|---|
| 3,041,842 A | 7/1962 | Heinecke |
| 3,236,512 A | 2/1966 | Caslav et al. |
| 3,269,121 A | 8/1966 | Ludwig |
| 3,538,340 A | 11/1970 | LanQ |
| 3,608,311 A | 9/1971 | Roesel, Jr. |
| 3,648,458 A | 3/1972 | McAlister |
| 3,650,636 A | 3/1972 | Eskeli |
| 3,672,160 A | 6/1972 | Kim |
| 3,677,008 A | 7/1972 | Koutz |
| 3,704,079 A | 11/1972 | Berlyn |
| 3,757,517 A | 9/1973 | Riqollot |
| 3,793,848 A | 2/1974 | Eskeli |
| 3,801,793 A | 4/1974 | Goebel |
| 3,803,847 A | 4/1974 | McAlister |
| 3,839,863 A | 10/1974 | Frazier |
| 3,847,182 A | 11/1974 | Greer |
| 3,895,493 A | 7/1975 | Rigollot |
| 3,903,696 A | 9/1975 | Carman |
| 3,935,469 A | 1/1976 | Haydock |
| 3,939,356 A | 2/1976 | Loane |
| 3,945,207 A | 3/1976 | Hyatt |
| 3,948,049 A | 4/1976 | Ohms et al. |
| 3,952,516 A | 4/1976 | Lapp |
| 3,952,723 A | 4/1976 | Browning |
| 3,958,899 A | 5/1976 | Coleman, Jr. et al. |
| 3,986,354 A | 10/1976 | Erb |
| 3,988,592 A | 10/1976 | Porter |
| 3,988,897 A | 11/1976 | Strub |
| 3,990,246 A | 11/1976 | Wilmers |
| 3,991,574 A | 11/1976 | Frazier |
| 3,996,741 A | 12/1976 | Herberq |
| 3,998,049 A | 12/1976 | McKinley et al. |
| 4,008,006 A | 2/1977 | Bea |
| 4,027,993 A | 6/1977 | Wolff |
| 4,030,303 A | 6/1977 | Kraus et al. |
| 4,031,702 A | 6/1977 | Burnett et al. |
| 4,031,704 A | 6/1977 | Moore et al. |
| 4,041,708 A | 8/1977 | Wolff |
| 4,050,246 A | 9/1977 | Bourquardez |
| 4,055,950 A | 11/1977 | Grossman |
| 4,058,979 A | 11/1977 | Germain |
| 4,089,744 A | 5/1978 | Cahn |
| 4,095,118 A | 6/1978 | Rathbun |
| 4,100,745 A | 7/1978 | Gyarmathy et al. |
| 4,108,077 A | 8/1978 | Laing |
| 4,109,465 A | 8/1978 | Plen |
| 4,110,987 A | 9/1978 | Cahn et al. |
| 4,112,311 A | 9/1978 | Theyse |
| 4,117,342 A | 9/1978 | Melley, Jr. |
| 4,117,696 A | 10/1978 | Fawcett et al. |
| 4,118,637 A | 10/1978 | Tackett |
| 4,124,182 A | 11/1978 | Loeb |
| 4,126,000 A | 11/1978 | Funk |
| 4,136,432 A | 1/1979 | Melley, Jr. |
| 4,142,368 A | 3/1979 | Mantegani |
| 4,147,204 A | 4/1979 | Pfenninger |
| 4,149,092 A | 4/1979 | Cros |
| 4,150,547 A | 4/1979 | Hobson |
| 4,154,292 A | 5/1979 | Herrick |
| 4,167,372 A | 9/1979 | Tackett |
| 4,170,878 A | 10/1979 | Jahniq |
| 4,173,431 A | 11/1979 | Smith |
| 4,189,925 A | 2/1980 | Long |
| 4,197,700 A | 4/1980 | Jahniq |
| 4,197,715 A | 4/1980 | Fawcett et al. |
| 4,201,514 A | 5/1980 | Huetter |
| 4,204,126 A | 5/1980 | Diggs |
| 4,206,608 A | 6/1980 | Bell |
| 4,209,982 A | 7/1980 | Pitts |
| 4,220,006 A | 9/1980 | Kindt |
| 4,229,143 A | 10/1980 | Pucher |
| 4,229,661 A | 10/1980 | Mead et al. |
| 4,232,253 A | 11/1980 | Mortelmans |
| 4,237,692 A | 12/1980 | Ahrens et al. |
| 4,242,878 A | 1/1981 | Brinkerhoff |
| 4,246,978 A | 1/1981 | Schulz et al. |
| 4,262,735 A | 4/1981 | Courrege |
| 4,273,514 A | 6/1981 | Shore et al. |
| 4,274,010 A | 6/1981 | Lawson-tancred |
| 4,275,310 A | 6/1981 | Summers et al. |
| 4,281,256 A | 7/1981 | Ahrens |
| 4,293,323 A | 10/1981 | Cohen |
| 4,299,198 A | 11/1981 | Woodhull |
| 4,302,684 A | 11/1981 | Gogins |
| 4,304,103 A | 12/1981 | Hamrick |
| 4,311,011 A | 1/1982 | Lewis |
| 4,316,096 A | 2/1982 | Syverson |
| 4,317,439 A | 3/1982 | Emmerlinq |
| 4,335,867 A | 6/1982 | Bihlmaier |
| 4,340,822 A | 7/1982 | Gregg |
| 4,341,072 A | 7/1982 | Clyne |
| 4,348,863 A | 9/1982 | Taylor et al. |
| 4,353,214 A | 10/1982 | Gardner |
| 4,354,420 A | 10/1982 | Bianchetta |
| 4,355,956 A | 10/1982 | Ringrose et al. |
| 4,358,250 A | 11/1982 | Payne |
| 4,367,786 A | 1/1983 | Hafner et al. |
| 4,368,692 A | 1/1983 | Kita |
| 4,368,775 A | 1/1983 | Ward |
| 4,370,559 A | 1/1983 | Langley, Jr. |
| 4,372,114 A | 2/1983 | Burnham |
| 4,375,387 A | 3/1983 | deFilippi et al. |
| 4,380,419 A | 4/1983 | Morton |
| 4,393,752 A | 7/1983 | Meier |
| 4,411,136 A | 10/1983 | Funk |
| 4,421,661 A | 12/1983 | Claar et al. |
| 4,428,711 A | 1/1984 | Archer |
| 4,435,131 A | 3/1984 | Ruben |
| 4,444,011 A | 4/1984 | Kolin |
| 4,446,698 A | 5/1984 | Benson |
| 4,447,738 A | 5/1984 | Allison |
| 4,449,372 A | 5/1984 | Rilett |
| 4,452,046 A | 6/1984 | Valentin |
| 4,454,429 A | 6/1984 | Buonome |
| 4,454,720 A | 6/1984 | Leibowitz |
| 4,455,834 A | 6/1984 | Earle |
| 4,462,213 A | 7/1984 | Lewis |
| 4,474,002 A | 10/1984 | Perry |
| 4,476,851 A | 10/1984 | Brugger et al. |
| 4,478,553 A | 10/1984 | Leibowitz et al. |
| 4,489,554 A | 12/1984 | Otters |
| 4,491,739 A | 1/1985 | Watson |
| 4,492,539 A | 1/1985 | Specht |
| 4,493,189 A | 1/1985 | Slater |
| 4,496,847 A | 1/1985 | Parkings |
| 4,498,848 A | 2/1985 | Petrovsky |
| 4,502,284 A | 3/1985 | Chrisoqhilos |
| 4,503,673 A | 3/1985 | Schachle |
| 4,515,516 A | 5/1985 | Perrine et al. |
| 4,520,840 A | 6/1985 | Michel |
| 4,525,631 A | 6/1985 | Allison |
| 4,530,208 A | 7/1985 | Sato |
| 4,547,209 A | 10/1985 | Netzer |
| 4,585,039 A | 4/1986 | Hamilton |
| 4,589,475 A | 5/1986 | Jones |
| 4,593,202 A | 6/1986 | Dickinson |
| 4,619,225 A | 10/1986 | Lowther |
| 4,624,623 A | 11/1986 | Wagner |
| 4,648,801 A | 3/1987 | Wilson |
| 4,651,525 A | 3/1987 | Cestero |
| 4,653,986 A | 3/1987 | Ashton |
| 4,671,742 A | 6/1987 | Gyimesi |
| 4,676,068 A | 6/1987 | Funk |
| 4,679,396 A | 7/1987 | Heggie |
| 4,691,524 A | 9/1987 | Holscher |
| 4,693,080 A | 9/1987 | Van Hooff |
| 4,706,456 A | 11/1987 | Backe |
| 4,707,988 A | 11/1987 | Palmers |
| 4,710,100 A | 12/1987 | Laing et al. |
| 4,735,552 A | 4/1988 | Watson |
| 4,739,620 A | 4/1988 | Pierce |
| 4,760,697 A | 8/1988 | Heggie |
| 4,761,118 A | 8/1988 | Zanarini et al. |
| 4,765,142 A | 8/1988 | Nakhamkin |
| 4,765,143 A | 8/1988 | Crawford et al. |
| 4,767,938 A | 8/1988 | Bervig |
| 4,792,700 A | 12/1988 | Ammons |

| Patent No. | Date | Name |
|---|---|---|
| 4,849,648 A | 7/1989 | Longardner |
| 4,870,816 A | 10/1989 | Nakhamkin |
| 4,872,307 A | 10/1989 | Nakhamkin |
| 4,873,828 A | 10/1989 | Lainq et al. |
| 4,873,831 A | 10/1989 | Dehne |
| 4,876,992 A | 10/1989 | Sobotowski |
| 4,877,530 A | 10/1989 | Moses |
| 4,885,912 A | 12/1989 | Nakhamkin |
| 4,886,534 A | 12/1989 | Castan |
| 4,907,495 A | 3/1990 | Sugahara |
| 4,936,109 A | 6/1990 | Lonqardner |
| 4,942,736 A | 7/1990 | Bronicki |
| 4,947,977 A | 8/1990 | Bronicki |
| 4,955,195 A | 9/1990 | Jones et al. |
| 4,984,432 A | 1/1991 | Corey |
| 5,056,601 A | 10/1991 | Grimmer |
| 5,058,385 A | 10/1991 | Everett, Jr. |
| 5,062,498 A | 11/1991 | Tobias |
| 5,107,681 A | 4/1992 | Wolfbauer, III |
| 5,133,190 A | 7/1992 | Abdelmalek |
| 5,138,838 A | 8/1992 | Crosser |
| 5,140,170 A | 8/1992 | Henderson |
| 5,152,260 A | 10/1992 | Erickson et al. |
| 5,161,449 A | 11/1992 | Everett, Jr. |
| 5,169,295 A | 12/1992 | Stoqner et al. |
| 5,182,086 A | 1/1993 | Henderson et al. |
| 5,203,168 A | 4/1993 | Oshina |
| 5,209,063 A | 5/1993 | Shirai et al. |
| 5,213,470 A | 5/1993 | Lundquist |
| 5,239,833 A | 8/1993 | Fineblum |
| 5,259,345 A | 11/1993 | Richeson |
| 5,271,225 A | 12/1993 | Adamides |
| 5,279,206 A | 1/1994 | Krantz |
| 5,296,799 A | 3/1994 | Davis |
| 5,309,713 A | 5/1994 | Vassallo |
| 5,321,946 A | 6/1994 | Abdelmalek |
| 5,327,987 A | 7/1994 | Abdelmalek |
| 5,339,633 A | 8/1994 | Fujii et al. |
| 5,341,644 A | 8/1994 | Nelson |
| 5,344,627 A | 9/1994 | Fujii et al. |
| 5,364,611 A | 11/1994 | Iijima et al. |
| 5,365,980 A | 11/1994 | Deberardinis |
| 5,375,417 A | 12/1994 | Barth |
| 5,379,589 A | 1/1995 | Cohn et al. |
| 5,384,489 A | 1/1995 | Bellac |
| 5,387,089 A | 2/1995 | Stogner et al. |
| 5,394,693 A | 3/1995 | Plyter |
| 5,427,194 A | 6/1995 | Miller |
| 5,436,508 A | 7/1995 | Sorensen |
| 5,448,889 A | 9/1995 | Bronicki |
| 5,454,408 A | 10/1995 | Dibella et al. |
| 5,454,426 A | 10/1995 | Moseley |
| 5,467,722 A | 11/1995 | Meratla |
| 5,477,677 A | 12/1995 | Krnavek |
| 5,491,969 A | 2/1996 | Cohn et al. |
| 5,491,977 A | 2/1996 | Cho |
| 5,524,821 A | 6/1996 | Vie et al. |
| 5,537,822 A | 7/1996 | Shnaid et al. |
| 5,544,698 A | 8/1996 | Paulman |
| 5,561,978 A | 10/1996 | Buschur |
| 5,562,010 A | 10/1996 | McGuire |
| 5,579,640 A | 12/1996 | Gray, Jr. et al. |
| 5,584,664 A | 12/1996 | Elliott et al. |
| 5,592,028 A | 1/1997 | Pritchard |
| 5,598,736 A | 2/1997 | Erskine |
| 5,599,172 A | 2/1997 | Mccabe |
| 5,600,953 A | 2/1997 | Oshita et al. |
| 5,616,007 A | 4/1997 | Cohen |
| 5,634,340 A | 6/1997 | Grennan |
| 5,641,273 A | 6/1997 | Moseley |
| 5,674,053 A | 10/1997 | Paul et al. |
| 5,685,155 A | 11/1997 | Brown |
| 5,768,893 A | 6/1998 | Hoshino et al. |
| 5,769,610 A | 6/1998 | Paul et al. |
| 5,771,693 A | 6/1998 | Coney |
| 5,775,107 A | 7/1998 | Sparkman |
| 5,778,675 A | 7/1998 | Nakhamkin |
| 5,794,442 A | 8/1998 | Lisniansky |
| 5,797,980 A | 8/1998 | Fillet |
| 5,819,533 A | 10/1998 | Moonen |
| 5,819,635 A | 10/1998 | Moonen |
| 5,831,757 A | 11/1998 | DiFrancesco |
| 5,832,728 A | 11/1998 | Buck |
| 5,832,906 A | 11/1998 | Douville et al. |
| 5,839,270 A | 11/1998 | Jirnov et al. |
| 5,845,479 A | 12/1998 | Nakhamkin |
| 5,873,250 A | 2/1999 | Lewis |
| 5,901,809 A | 5/1999 | Berkun |
| 5,924,283 A | 7/1999 | Burke, Jr. |
| 5,934,063 A | 8/1999 | Nakhamkin |
| 5,934,076 A | 8/1999 | Coney |
| 5,937,652 A | 8/1999 | Abdelmalek |
| 5,971,027 A | 10/1999 | Beachley et al. |
| 6,012,279 A | 1/2000 | Hines |
| 6,023,105 A | 2/2000 | Youssef |
| 6,026,349 A | 2/2000 | Heneman |
| 6,029,445 A | 2/2000 | Lech |
| 6,073,445 A | 6/2000 | Johnson |
| 6,073,448 A | 6/2000 | Lozada |
| 6,085,520 A | 7/2000 | Kohno |
| 6,090,186 A | 7/2000 | Spencer |
| 6,119,802 A | 9/2000 | Puett, Jr. |
| 6,132,181 A | 10/2000 | Mccabe |
| 6,145,311 A | 11/2000 | Cyphelly |
| 6,148,602 A | 11/2000 | Demetri |
| 6,153,943 A | 11/2000 | Mistr, Jr. |
| 6,158,499 A | 12/2000 | Rhodes |
| 6,170,443 B1 | 1/2001 | Hofbauer |
| 6,178,735 B1 | 1/2001 | Frutschi |
| 6,179,446 B1 | 1/2001 | Sarmadi |
| 6,188,182 B1 | 2/2001 | Nickols et al. |
| 6,202,707 B1 | 3/2001 | Woodall et al. |
| 6,206,660 B1 | 3/2001 | Coney et al. |
| 6,210,131 B1 | 4/2001 | Whitehead |
| 6,216,462 B1 | 4/2001 | Gray, Jr. |
| 6,225,706 B1 | 5/2001 | Keller |
| 6,276,123 B1 | 8/2001 | Chen et al. |
| 6,327,858 B1 | 12/2001 | Negre et al. |
| 6,327,994 B1 | 12/2001 | Labrador |
| 6,349,543 B1 | 2/2002 | Lisniansky |
| RE37,603 E | 3/2002 | Coney |
| 6,352,576 B1 | 3/2002 | Spencer et al. |
| 6,360,535 B1 | 3/2002 | Fisher |
| 6,367,570 B1 | 4/2002 | Long, III |
| 6,372,023 B1 | 4/2002 | Kiyono et al. |
| 6,389,814 B2 | 5/2002 | Viteri et al. |
| 6,397,578 B2 | 6/2002 | Tsukamoto |
| 6,401,458 B2 | 6/2002 | Jacobson |
| 6,407,465 B1 | 6/2002 | Peltz et al. |
| 6,419,462 B1 | 7/2002 | Horie et al. |
| 6,422,016 B2 | 7/2002 | Alkhamis |
| 6,478,289 B1 | 11/2002 | Trewin |
| 6,512,966 B2 | 1/2003 | Lof |
| 6,513,326 B1 | 2/2003 | Maceda et al. |
| 6,516,615 B1 | 2/2003 | Stockhausen et al. |
| 6,516,616 B2 | 2/2003 | Carver |
| 6,598,392 B2 | 7/2003 | Majeres |
| 6,598,402 B2 | 7/2003 | Kataoka et al. |
| 6,606,860 B2 | 8/2003 | McFarland |
| 6,612,348 B1 | 9/2003 | Wiley |
| 6,619,930 B2 | 9/2003 | Jansen et al. |
| 6,626,212 B2 | 9/2003 | Morioka et al. |
| 6,629,413 B1 | 10/2003 | Wendt et al. |
| 6,637,185 B2 | 10/2003 | hatamiva et al. |
| 6,652,241 B1 | 11/2003 | Alder |
| 6,652,243 B2 | 11/2003 | Krasnov |
| 6,666,024 B1 | 12/2003 | Moskal |
| 6,670,402 B1 | 12/2003 | Lee et al. |
| 6,672,056 B2 | 1/2004 | Roth et al. |
| 6,675,765 B2 | 1/2004 | Endoh |
| 6,688,108 B1 | 2/2004 | Van Liere |
| 6,698,472 B2 | 3/2004 | Camacho et al. |
| 6,711,984 B2 | 3/2004 | Tagge et al. |
| 6,712,166 B2 | 3/2004 | Rush et al. |
| 6,715,514 B2 | 4/2004 | Parker, III |
| 6,718,761 B2 | 4/2004 | Merswolke et al. |
| 6,739,131 B1 | 5/2004 | Kershaw |
| 6,745,569 B2 | 6/2004 | Gerdes |

| | | |
|---|---|---|
| 6,745,801 B1 | 6/2004 | Cohen et al. |
| 6,748,737 B2 | 6/2004 | Lafferty |
| 6,762,926 B1 | 7/2004 | Shiue et al. |
| 6,786,245 B1 | 9/2004 | Eichelberger |
| 6,789,387 B2 | 9/2004 | Brinkman |
| 6,789,576 B2 | 9/2004 | Umetsu et al. |
| 6,797,039 B2 | 9/2004 | Spencer |
| 6,815,840 B1 | 11/2004 | Aldendeshe |
| 6,817,185 B2 | 11/2004 | Coney et al. |
| 6,834,737 B2 | 12/2004 | Bloxham |
| 6,848,259 B2 | 2/2005 | Kelller-sornig |
| 6,857,450 B2 | 2/2005 | Rupp |
| 6,886,326 B2 | 5/2005 | Holtzapple et al. |
| 6,892,802 B2 | 5/2005 | Kelly et al. |
| 6,900,556 B2 | 5/2005 | Provanzana |
| 6,922,991 B2 | 8/2005 | Polcuch |
| 6,925,821 B2 | 8/2005 | Sienel |
| 6,927,503 B2 | 8/2005 | Enish et al. |
| 6,931,848 B2 | 8/2005 | Maceda et al. |
| 6,935,096 B2 | 8/2005 | Haiun |
| 6,938,415 B2 | 9/2005 | Last |
| 6,938,654 B2 | 9/2005 | Gershtein et al. |
| 6,946,017 B2 | 9/2005 | Leppin et al. |
| 6,948,328 B2 | 9/2005 | Kidwell |
| 6,952,058 B2 | 10/2005 | Mccoin |
| 6,959,546 B2 | 11/2005 | Corcoran |
| 6,963,802 B2 | 11/2005 | Enis |
| 6,964,165 B2 | 11/2005 | Uhl et al. |
| 6,964,176 B2 | 11/2005 | Kidwell |
| 6,974,307 B2 | 12/2005 | Antoune et al. |
| 7,000,389 B2 | 2/2006 | Lewellin |
| 7,007,474 B1 | 3/2006 | Ochs et al. |
| 7,017,690 B2 | 3/2006 | Burke |
| 7,028,934 B2 | 4/2006 | Burynski, Jr. |
| 7,040,083 B2 | 5/2006 | Horii et al. |
| 7,040,108 B1 | 5/2006 | Flammang |
| 7,040,859 B2 | 5/2006 | Kane |
| 7,043,920 B2 | 5/2006 | Viteri et al. |
| 7,047,744 B1 | 5/2006 | Robertson et al. |
| 7,055,325 B2 | 6/2006 | Wolken |
| 7,067,937 B2 | 6/2006 | Enish et al. |
| 7,075,189 B2 | 7/2006 | Heronemus |
| RE39,249 E | 8/2006 | Link, Jr. |
| 7,084,520 B2 | 8/2006 | Zambrano |
| 7,086,231 B2 | 8/2006 | Pinkerton |
| 7,093,450 B2 | 8/2006 | Jimenez Haertel et al. |
| 7,093,626 B2 | 8/2006 | Li et al. |
| 7,098,552 B2 | 8/2006 | Mccoin |
| 7,107,766 B2 | 9/2006 | Zacche' et al. |
| 7,107,767 B2 | 9/2006 | Frazer et al. |
| 7,116,006 B2 | 10/2006 | Mccoin |
| 7,124,576 B2 | 10/2006 | Cherney et al. |
| 7,124,586 B2 | 10/2006 | Negre et al. |
| 7,127,895 B2 | 10/2006 | Pinkerton et al. |
| 7,128,777 B2 | 10/2006 | Spencer |
| 7,134,279 B2 | 11/2006 | White |
| 7,155,912 B2 | 1/2007 | Enis et al. |
| 7,168,928 B1 | 1/2007 | West |
| 7,168,929 B2 | 1/2007 | Siegel et al. |
| 7,169,489 B2 | 1/2007 | Redmond |
| 7,177,751 B2 | 2/2007 | Froloff |
| 7,178,337 B2 | 2/2007 | Pflanz |
| 7,191,603 B2 | 3/2007 | Taube |
| 7,197,871 B2 | 4/2007 | Yoshino |
| 7,201,095 B2 | 4/2007 | Hughey |
| 7,218,009 B2 | 5/2007 | Hendrickson et al. |
| 7,219,779 B2 | 5/2007 | Bauer et al. |
| 7,225,762 B2 | 6/2007 | Mahlanen |
| 7,228,690 B2 | 6/2007 | Barker |
| 7,230,348 B2 | 6/2007 | Poole |
| 7,231,998 B1 | 6/2007 | Schechter |
| 7,240,812 B2 | 7/2007 | Kamikozuru |
| 7,249,617 B2 | 7/2007 | Musselman et al. |
| 7,254,944 B1 | 8/2007 | Goetzinger et al. |
| 7,273,122 B2 | 9/2007 | Rose |
| 7,281,371 B1 | 10/2007 | Heidenreich |
| 7,308,361 B2 | 12/2007 | Enis et al. |
| 7,317,261 B2 | 1/2008 | Rolt |
| 7,322,377 B2 | 1/2008 | Baltes |
| 7,325,401 B1 | 2/2008 | Kesseli et al. |
| 7,328,575 B2 | 2/2008 | Hedman |
| 7,329,099 B2 | 2/2008 | Hartman |
| 7,347,049 B2 | 3/2008 | Rajendran et al. |
| 7,353,786 B2 | 4/2008 | Scuderi et al. |
| 7,353,845 B2 | 4/2008 | Underwood et al. |
| 7,354,252 B2 | 4/2008 | Baatrup et al. |
| 7,364,410 B2 | 4/2008 | Link, Jr. |
| 7,392,871 B2 | 7/2008 | Severinsky et al. |
| 7,406,828 B1 | 8/2008 | Nakhamkin |
| 7,407,501 B2 | 8/2008 | Zvuloni |
| 7,415,835 B2 | 8/2008 | Cowans et al. |
| 7,415,995 B2 | 8/2008 | Plummer et al. |
| 7,417,331 B2 | 8/2008 | De La Torre et al. |
| 7,418,820 B2 | 9/2008 | Harvey et al. |
| 7,436,086 B2 | 10/2008 | Mcclintic |
| 7,441,399 B2 | 10/2008 | Utamura |
| 7,448,213 B2 | 11/2008 | Mitani |
| 7,453,164 B2 | 11/2008 | Borden et al. |
| 7,469,527 B2 | 12/2008 | Negre et al. |
| 7,471,010 B1 | 12/2008 | Fingersh |
| 7,481,337 B2 | 1/2009 | Luharuka et al. |
| 7,488,159 B2 | 2/2009 | Bhatt et al. |
| 7,527,483 B1 | 5/2009 | Glauber |
| 7,579,700 B1 | 8/2009 | Meller |
| 7,603,970 B2 | 10/2009 | Scuderi et al. |
| 7,607,503 B1 | 10/2009 | Schechter |
| 7,693,402 B2 | 4/2010 | Hudson et al. |
| 7,802,426 B2 | 9/2010 | Bollinger |
| 7,827,787 B2 | 11/2010 | Cherney et al. |
| 7,832,207 B2 | 11/2010 | McBride et al. |
| 7,843,076 B2 | 11/2010 | Gogoana et al. |
| 7,874,155 B2 | 1/2011 | McBride et al. |
| 7,900,444 B1 | 3/2011 | McBride et al. |
| 2001/0045093 A1 | 11/2001 | Jacobson |
| 2003/0131599 A1 | 7/2003 | Gerdes |
| 2003/0145589 A1 | 8/2003 | Tillyer |
| 2003/0177767 A1 | 9/2003 | Keller-sornig et al. |
| 2003/0180155 A1 | 9/2003 | Coney et al. |
| 2004/0050042 A1 | 3/2004 | Frazer |
| 2004/0050049 A1 | 3/2004 | Wendt et al. |
| 2004/0146406 A1 | 7/2004 | Last |
| 2004/0146408 A1 | 7/2004 | Anderson |
| 2004/0148934 A1 | 8/2004 | Pinkerton et al. |
| 2004/0211182 A1 | 10/2004 | Gould |
| 2004/0244580 A1 | 12/2004 | Coney et al. |
| 2004/0261415 A1 | 12/2004 | Negre et al. |
| 2005/0016165 A1 | 1/2005 | Enis et al. |
| 2005/0028529 A1 | 2/2005 | Bartlett et al. |
| 2005/0047930 A1 | 3/2005 | Schmid |
| 2005/0072154 A1 | 4/2005 | Frutschi |
| 2005/0115234 A1 | 6/2005 | Asano et al. |
| 2005/0155347 A1 | 7/2005 | Lewellin |
| 2005/0166592 A1 | 8/2005 | Larson et al. |
| 2005/0274334 A1 | 12/2005 | Warren |
| 2005/0275225 A1 | 12/2005 | Bertolotti |
| 2005/0279086 A1 | 12/2005 | Hoos |
| 2005/0279292 A1 | 12/2005 | Hudson et al. |
| 2006/0055175 A1 | 3/2006 | Grinblat |
| 2006/0059936 A1 | 3/2006 | Radke et al. |
| 2006/0059937 A1 | 3/2006 | Perkins et al. |
| 2006/0075749 A1 | 4/2006 | Cherney et al. |
| 2006/0090467 A1 | 5/2006 | Crow |
| 2006/0090477 A1 | 5/2006 | Rolff |
| 2006/0107664 A1 | 5/2006 | Hudson et al. |
| 2006/0162543 A1 | 7/2006 | Abe et al. |
| 2006/0162910 A1 | 7/2006 | Kelly et al. |
| 2006/0175337 A1 | 8/2006 | Defosset |
| 2006/0201148 A1 | 9/2006 | Zabtcioqlu |
| 2006/0248886 A1 | 11/2006 | Ma |
| 2006/0248892 A1 | 11/2006 | Ingersoll |
| 2006/0254281 A1 | 11/2006 | Badeer et al. |
| 2006/0260311 A1 | 11/2006 | Ingersoll |
| 2006/0260312 A1 | 11/2006 | Ingersoll |
| 2006/0262465 A1 | 11/2006 | Wiederhold |
| 2006/0266034 A1 | 11/2006 | Ingersoll |
| 2006/0266035 A1 | 11/2006 | Ingersoll et al. |
| 2006/0266036 A1 | 11/2006 | Ingersoll |
| 2006/0266037 A1 | 11/2006 | Ingersoll |

| | | |
|---|---|---|
| 2006/0280993 A1 | 12/2006 | Keefer et al. |
| 2006/0283967 A1 | 12/2006 | Cho et al. |
| 2007/0006586 A1 | 1/2007 | Hoffman et al. |
| 2007/0022754 A1 | 2/2007 | Perkins et al. |
| 2007/0022755 A1 | 2/2007 | Pinkerton et al. |
| 2007/0062194 A1 | 3/2007 | Ingersoll |
| 2007/0074533 A1 | 4/2007 | Hugenroth et al. |
| 2007/0095069 A1 | 5/2007 | Joshi et al. |
| 2007/0113803 A1 | 5/2007 | Froloff et al. |
| 2007/0116572 A1 | 5/2007 | Barbu et al. |
| 2007/0137595 A1 | 6/2007 | Greenwell |
| 2007/0151528 A1 | 7/2007 | Hedman |
| 2007/0158946 A1 | 7/2007 | Annen et al. |
| 2007/0181199 A1 | 8/2007 | Weber |
| 2007/0182160 A1 | 8/2007 | Enis et al. |
| 2007/0205298 A1 | 9/2007 | Harrison et al. |
| 2007/0234749 A1 | 10/2007 | Enis et al. |
| 2007/0243066 A1 | 10/2007 | Baron |
| 2007/0245735 A1 | 10/2007 | Ashikian |
| 2007/0258834 A1 | 11/2007 | Froloff et al. |
| 2008/0000436 A1 | 1/2008 | Goldman |
| 2008/0016868 A1 | 1/2008 | Ochs et al. |
| 2008/0047272 A1 | 2/2008 | Schoell |
| 2008/0050234 A1 | 2/2008 | Ingersoll et al. |
| 2008/0072870 A1 | 3/2008 | Chomyszak et al. |
| 2008/0087165 A1 | 4/2008 | Wright et al. |
| 2008/0104939 A1 | 5/2008 | Hoffmann et al. |
| 2008/0112807 A1 | 5/2008 | Uphues et al. |
| 2008/0127632 A1 | 6/2008 | Finkenrath et al. |
| 2008/0138265 A1 | 6/2008 | Lackner et al. |
| 2008/0155975 A1 | 7/2008 | Brinkman |
| 2008/0155976 A1 | 7/2008 | Smith et al. |
| 2008/0157528 A1 | 7/2008 | Wang et al. |
| 2008/0157537 A1 | 7/2008 | Richard |
| 2008/0164449 A1 | 7/2008 | Gray et al. |
| 2008/0185194 A1 | 8/2008 | Leone |
| 2008/0202120 A1 | 8/2008 | Karyambas |
| 2008/0211230 A1 | 9/2008 | Gurin |
| 2008/0228323 A1 | 9/2008 | Laumer et al. |
| 2008/0233029 A1 | 9/2008 | Fan et al. |
| 2008/0238105 A1 | 10/2008 | Ortiz et al. |
| 2008/0238187 A1 | 10/2008 | Garnett et al. |
| 2008/0250788 A1 | 10/2008 | Nuel et al. |
| 2008/0251302 A1 | 10/2008 | Lynn et al. |
| 2008/0272597 A1 | 11/2008 | Althaus |
| 2008/0272598 A1 | 11/2008 | Nakhamkin |
| 2008/0272605 A1 | 11/2008 | Borden et al. |
| 2008/0308168 A1 | 12/2008 | O'Brien, II et al. |
| 2008/0308270 A1 | 12/2008 | Wilson |
| 2008/0315589 A1 | 12/2008 | Malmrup |
| 2009/0000290 A1 | 1/2009 | Brinkman |
| 2009/0007558 A1 | 1/2009 | Hall et al. |
| 2009/0008173 A1 | 1/2009 | Hall et al. |
| 2009/0010772 A1 | 1/2009 | Siemroth |
| 2009/0020275 A1 | 1/2009 | Neher et al. |
| 2009/0021012 A1 | 1/2009 | Stull et al. |
| 2009/0056331 A1 | 3/2009 | Zhao et al. |
| 2009/0071153 A1 | 3/2009 | Boyapati et al. |
| 2009/0107784 A1 | 4/2009 | Gabriel et al. |
| 2009/0145130 A1 | 6/2009 | Kaufman |
| 2009/0158740 A1 | 6/2009 | Littau et al. |
| 2009/0178409 A1 | 7/2009 | Shinnar |
| 2009/0200805 A1 | 8/2009 | Kim et al. |
| 2009/0229902 A1 | 9/2009 | Stansbury, III |
| 2009/0249826 A1 | 10/2009 | Hugelman |
| 2009/0282822 A1 | 11/2009 | McBride et al. |
| 2009/0282840 A1 | 11/2009 | Chen et al. |
| 2009/0294096 A1 | 12/2009 | Mills et al. |
| 2009/0301089 A1 | 12/2009 | Bollinger |
| 2009/0317267 A1 | 12/2009 | Gill et al. |
| 2009/0322090 A1 | 12/2009 | Wolf |
| 2010/0018196 A1 | 1/2010 | Li et al. |
| 2010/0077765 A1 | 4/2010 | Japikse |
| 2010/0089063 A1 | 4/2010 | McBride et al. |
| 2010/0133903 A1 | 6/2010 | Rufer |
| 2010/0139277 A1 | 6/2010 | McBride et al. |
| 2010/0193270 A1 | 8/2010 | Deshaies et al. |
| 2010/0199652 A1 | 8/2010 | Lemofouet et al. |
| 2010/0205960 A1 | 8/2010 | McBride et al. |
| 2010/0229544 A1 | 9/2010 | Bollinger et al. |
| 2010/0307156 A1 | 12/2010 | Bollinger |
| 2010/0326062 A1 | 12/2010 | Fong et al. |
| 2010/0326064 A1 | 12/2010 | Fong et al. |
| 2010/0326066 A1 | 12/2010 | Fong et al. |
| 2010/0326068 A1 | 12/2010 | Fong et al. |
| 2010/0326069 A1 | 12/2010 | Fong et al. |
| 2010/0326075 A1 | 12/2010 | Fong et al. |
| 2010/0329891 A1 | 12/2010 | Fong et al. |
| 2010/0329903 A1 | 12/2010 | Fong et al. |
| 2010/0329909 A1 | 12/2010 | Fong et al. |
| 2011/0023488 A1 | 2/2011 | Fong et al. |
| 2011/0023977 A1 | 2/2011 | Fong et al. |
| 2011/0030359 A1 | 2/2011 | Fong et al. |
| 2011/0030552 A1 | 2/2011 | Fong et al. |
| 2011/0056193 A1 | 3/2011 | McBride et al. |
| 2011/0056368 A1 | 3/2011 | McBride et al. |
| 2011/0061741 A1 | 3/2011 | Ingersoll et al. |
| 2011/0061836 A1 | 3/2011 | Ingersoll et al. |
| 2011/0062166 A1 | 3/2011 | Ingersoll et al. |
| 2011/0079010 A1 | 4/2011 | McBride et al. |
| 2011/0083438 A1 | 4/2011 | McBride et al. |

FOREIGN PATENT DOCUMENTS

| | | |
|---|---|---|
| BE | 1008885 | 8/1996 |
| CN | 1061262 | 5/1992 |
| CN | 1171490 | 1/1998 |
| CN | 1276308 | 12/2000 |
| CN | 1277323 | 12/2000 |
| CN | 1412443 | 4/2003 |
| CN | 1743665 | 3/2006 |
| CN | 2821162 | 9/2006 |
| CN | 2828319 | 10/2006 |
| CN | 2828368 | 10/2006 |
| CN | 1884822 | 12/2006 |
| CN | 1888328 | 1/2007 |
| CN | 1967091 | 5/2007 |
| CN | 101033731 | 9/2007 |
| CN | 101042115 | 9/2007 |
| CN | 101070822 | 11/2007 |
| CN | 101149002 | 3/2008 |
| CN | 101162073 | 4/2008 |
| CN | 201103518 | 8/2008 |
| CN | 201106527 | 8/2008 |
| CN | 101289963 | 10/2008 |
| CN | 201125855 | 10/2008 |
| CN | 101377190 | 4/2009 |
| CN | 101408213 | 4/2009 |
| CN | 101435451 | 5/2009 |
| DE | 25 38 870 | 6/1977 |
| DE | 19530253 | 11/1996 |
| DE | 19903907 | 8/2000 |
| DE | 19911534 | 9/2000 |
| DE | 10042020 | 5/2001 |
| DE | 20118183 | 3/2003 |
| DE | 20120330 | 4/2003 |
| DE | 10147940 | 5/2003 |
| DE | 10205733 | 8/2003 |
| DE | 10212480 | 10/2003 |
| DE | 20312293 | 12/2003 |
| DE | 10220499 | 4/2004 |
| DE | 10334637 | 2/2005 |
| DE | 10 2005 047622 | 4/2007 |
| EP | 0204748 | 3/1981 |
| EP | 0091801 | 10/1983 |
| EP | 0097002 | 12/1983 |
| EP | 0196690 | 10/1986 |
| EP | 0212692 | 3/1987 |
| EP | 0364106 | 4/1990 |
| EP | 0507395 | 10/1992 |
| EP | 0821162 | 1/1998 |
| EP | 0 857 877 | 8/1998 |
| EP | 1 388 442 | 2/2004 |
| EP | 1405662 | 4/2004 |
| EP | 1657452 | 5/2006 |
| EP | 1726350 | 11/2006 |
| EP | 1741899 | 1/2007 |
| EP | 1 780 058 | 5/2007 |
| EP | 1988294 | 11/2008 |

| | | |
|---|---|---|
| EP | 2014896 | 1/2009 |
| EP | 2078857 | 7/2009 |
| FR | 2449805 | 9/1980 |
| FR | 2816993 | 5/2002 |
| FR | 2829805 | 3/2003 |
| GB | 722524 | 11/1951 |
| GB | 772703 | 4/1957 |
| GB | 1449076 | 9/1976 |
| GB | 1479940 | 7/1977 |
| GB | 2106992 | 4/1983 |
| GB | 2223810 | 4/1990 |
| GB | 2 300 673 | 11/1996 |
| GB | 2373546 | 9/2002 |
| GB | 2403356 | 12/2004 |
| JP | 57010778 | 1/1982 |
| JP | 57070970 | 5/1982 |
| JP | 57120058 | 7/1982 |
| JP | 58183880 | 10/1982 |
| JP | 58150079 | 9/1983 |
| JP | 58192976 | 11/1983 |
| JP | 60206985 | 10/1985 |
| JP | 62101900 | 5/1987 |
| JP | 63227973 | 9/1988 |
| JP | 2075674 | 3/1990 |
| JP | 2247469 | 10/1990 |
| JP | 3009090 | 1/1991 |
| JP | 3281984 | 12/1991 |
| JP | 4121424 | 4/1992 |
| JP | 6185450 | 7/1994 |
| JP | 8145488 | 6/1996 |
| JP | 9166079 | 6/1997 |
| JP | 2000-346093 | 6/1999 |
| JP | 11351125 | 12/1999 |
| JP | 2000166128 | 6/2000 |
| JP | 200346093 | 12/2000 |
| JP | 2002127902 | 5/2002 |
| JP | 2003083230 | 3/2003 |
| JP | 2005023918 | 1/2005 |
| JP | 2005036769 | 2/2005 |
| JP | 2005068963 | 3/2005 |
| JP | 2006220252 | 8/2006 |
| JP | 2007001872 | 1/2007 |
| JP | 2007145251 | 6/2007 |
| JP | 2007211730 | 8/2007 |
| JP | 2008038658 | 2/2008 |
| KR | 840000180 | 2/1984 |
| KR | 2004004637 | 1/2004 |
| RU | 2101562 | 1/1998 |
| RU | 2169857 | 6/2001 |
| RU | 2213255 | 9/2003 |
| SU | 800438 | 1/1981 |
| UA | 69030 | 8/2004 |
| WO | WO-82/00319 | 2/1982 |
| WO | WO-8802818 | 4/1988 |
| WO | WO-99/41498 | 8/1990 |
| WO | WO-92/22741 | 12/1992 |
| WO | WO-93/06367 | 4/1993 |
| WO | WO-93/11363 | 6/1993 |
| WO | WO-93/24754 | 12/1993 |
| WO | WO 9412785 | 6/1994 |
| WO | WO-95/25381 | 9/1995 |
| WO | WO-96/01942 | 1/1996 |
| WO | WO-96/22456 | 7/1996 |
| WO | WO-96/34213 | 10/1996 |
| WO | WO-97/01029 | 1/1997 |
| WO | WO-97/17546 | 5/1997 |
| WO | WO-98/02818 | 1/1998 |
| WO | WO-98/17492 | 4/1998 |
| WO | WO-00/01945 | 1/2000 |
| WO | WO-00/37800 | 6/2000 |
| WO | WO-00/65212 | 11/2000 |
| WO | WO-00/68578 | 11/2000 |
| WO | WO 0175290 | 10/2001 |
| WO | WO-02/25083 | 3/2002 |
| WO | WO-02/46621 | 6/2002 |
| WO | WO-02/103200 | 12/2002 |
| WO | WO-03/021702 | 3/2003 |
| WO | WO-03/078812 | 9/2003 |
| WO | WO-03/081011 | 10/2003 |
| WO | WO-2004/034391 | 5/2004 |
| WO | WO-2004/059155 | 7/2004 |
| WO | WO-2004/072452 | 8/2004 |
| WO | WO-2004/074679 | 9/2004 |
| WO | WO-2004/109172 | 12/2004 |
| WO | WO-2005/044424 | 5/2005 |
| WO | WO-2005/062969 | 7/2005 |
| WO | WO-2005/067373 | 7/2005 |
| WO | WO-2005/079461 | 9/2005 |
| WO | WO-2005/088131 | 9/2005 |
| WO | WO-2005/095155 | 10/2005 |
| WO | WO-2006/029633 | 3/2006 |
| WO | WO-2006/058085 | 6/2006 |
| WO | WO-2006/124006 | 11/2006 |
| WO | WO-2007/002094 | 1/2007 |
| WO | WO-2007/003954 | 1/2007 |
| WO | WO-2007/012143 | 2/2007 |
| WO | WO-2007/035997 | 4/2007 |
| WO | WO-2007/051034 | 5/2007 |
| WO | WO-2007/066117 | 6/2007 |
| WO | WO-2007/086792 | 8/2007 |
| WO | WO-2007/089872 | 8/2007 |
| WO | WO-2007/096656 | 8/2007 |
| WO | WO-2007/111839 | 10/2007 |
| WO | WO-2007/136765 | 11/2007 |
| WO | WO-2008/003950 | 1/2008 |
| WO | WO-2008/014769 | 2/2008 |
| WO | WO-2008023901 | 2/2008 |
| WO | WO-2008/027259 | 3/2008 |
| WO | WO-2008/028881 | 3/2008 |
| WO | WO-2008/039725 | 4/2008 |
| WO | WO-2008/045468 | 4/2008 |
| WO | WO-2009045468 | 4/2008 |
| WO | WO-2008/051427 | 5/2008 |
| WO | WO-2008/074075 | 6/2008 |
| WO | WO-2008/084507 | 7/2008 |
| WO | WO-2008/091373 | 7/2008 |
| WO | WO 2008102292 | 8/2008 |
| WO | WO-2008/106967 | 9/2008 |
| WO | WO-2008/108870 | 9/2008 |
| WO | WO-2008/109006 | 9/2008 |
| WO | WO-2008/110018 | 9/2008 |
| WO | WO-2008/115479 | 9/2008 |
| WO | WO-2008/121378 | 10/2008 |
| WO | WO-2008139267 | 11/2008 |
| WO | WO-2008/152432 | 12/2008 |
| WO | WO-2008/153591 | 12/2008 |
| WO | WO-2008/157327 | 12/2008 |
| WO | WO-2009/034421 | 3/2009 |
| WO | WO-2009/034548 | 3/2009 |
| WO | WO-2009/038973 | 3/2009 |
| WO | WO-2009/044139 | 4/2009 |
| WO | WO-2009/045110 | 4/2009 |
| WO | WO-2009/114205 | 9/2009 |
| WO | WO-2009/126784 | 10/2009 |
| WO | WO-2010/006319 | 1/2010 |
| WO | WO-2010/009053 | 1/2010 |
| WO | WO-2010/105155 | 9/2010 |
| WO | WO-2010/135658 | 11/2010 |
| WO | WO-2011/008321 | 1/2011 |
| WO | WO-2011/008325 | 1/2011 |
| WO | WO-2011/008500 | 1/2011 |

OTHER PUBLICATIONS

Lemofouet et al., "A Hybrid Energy Storage System Based on Compressed Air and Supercapacitors with Maximum Efficiency Point Tracking (MEPT)," IEEE Transactions on Industrial Electron, vol. 53, No. 4, (Aug. 2006) pp. 1105-1115.

International Search Report and Written Opinion issued Sep. 15, 2009 for International Application No. PCT/US2009/040027, 8 pages.

International Search Report and Written Opinion issued Aug. 30, 2010 for International Application No. PCT/US2010/029795, 9 pages.

International Search Report and Written Opinion issued Dec. 3, 2009 for International Application No. PCT/US2009/046725, 9 pages.

International Search Report and Written Opinion for International Application No. PCT/US2010/055279 mailed Jan. 24, 2011, 14 pages.

SYSTEMS AND METHODS FOR IMPROVING DRIVETRAIN EFFICIENCY FOR COMPRESSED GAS ENERGY STORAGE AND RECOVERY SYSTEMS

CROSS-REFERENCE TO RELATED APPLICATIONS

This application is a continuation of U.S. patent application Ser. No. 12/794,237, filed on Jun. 4, 2010, which claims the benefit of and priority to U.S. Provisional Patent Application Ser. Nos. 61/184,191, filed on Jun. 4, 2009; 61/222,286, filed on Jul. 1, 2009; 61/242,526, filed on Sep. 15, 2009; and 61/256,484, filed on Oct. 30, 2009, the disclosures of which are hereby incorporated herein by reference in their entireties.

STATEMENT REGARDING FEDERALLY SPONSORED RESEARCH

This invention was made with government support under IIP-0810590 and IIP-0923633 awarded by the NSF. The government has certain rights in the invention.

FIELD OF THE INVENTION

The invention relates to power generation and energy storage and recovery. More particularly, the invention relates to improving drivetrain efficiency in compressed gas energy storage and recovery systems.

BACKGROUND OF THE INVENTION

Storing energy in the form of compressed gas has a long history and components tend to be well tested and reliable and to have long lifetimes. The general principles for compressed gas energy storage are that generated energy (e.g., electric energy) is used to compress gas and thus convert the original energy to pressure potential energy; the energy is later recovered in a useful form (e.g., converted back to electric energy) via appropriate gas expansion. Advantages of compressed gas energy storage include low specific-energy costs, long lifetime, low maintenance, reasonable energy density, and good reliability.

As the world's demand for electric energy increases, the existing power grid is being taxed beyond its ability to meet continuous demand. In certain parts of the United States, inability to supply peak demand has led to inadvertent brownouts and blackouts due to system overload and to deliberate "rolling blackouts" of non-essential customers to shunt the excess demand. For the most part, peak demand occurs during the daytime hours (and during certain seasons, such as summer), when business and industry employ large quantities of power for running equipment, heating, air conditioning, lighting, etc. At night, demand for electricity is often reduced significantly, and the existing power grid in most areas can usually handle this load without problem.

To prevent power shortages at peak demand, users are asked to conserve where possible. Power companies often employ rapidly deployable gas turbines to supplement production to meet demand. However, these units burn expensive fuels, such as natural gas, and have high generation costs when compared with coal-fired systems and other large-scale generators. Thus, they are only a partial solution in any growing region and economy. The ultimate solution involves construction of new power plants, which is expensive and has environmental side effects.

Also, because most power plants operate most efficiently when generating a relatively continuous output, the difference between peak and off-peak demand often leads to wasteful practices during off-peak, such as over-lighting of outdoor areas, as power is sold at a lower rate during off peak.

In each case, the balancing of power production or provision of further capacity rapidly on-demand can be satisfied by a local backup generator. However, such generators are often costly, use expensive fuels such as natural gas or diesel, are noisy, and are environmentally damaging due to their inherent emissions.

Various techniques are available to store excess power for later delivery. One technique involves the use of driven flywheels that are spun up by a motor drawing excess power. When the power is needed, the flywheels' inertia is tapped by the motor or another coupled generator to deliver power back to the grid and/or customer. The flywheel units are expensive to manufacture and install and require costly maintenance on a regular basis.

Another approach to power storage is batteries. However, most large-scale batteries use a lead electrode and acid electrolyte. These components are environmentally hazardous. Many batteries must be arrayed to store substantial power, and the batteries have a relatively short life (3-7 years is typical). Thus, to maintain a battery storage system, a large number of heavy, hazardous battery units must be replaced on a regular basis and the old batteries must be recycled or properly disposed of.

Energy can also be stored in ultracapacitors. A capacitor is charged by line current so that it stores a potential, and this potential can be discharged rapidly when needed. Appropriate power-conditioning circuits are used to convert the power into the appropriate phase and frequency of AC. However, a large array of such capacitors is needed to store substantial electric power. Ultracapacitors, while more environmentally friendly and longer lived than batteries, are substantially more expensive and still require periodic replacement due to the breakdown of internal dielectrics, etc.

Another approach to storage of energy for later distribution involves the use of a large reservoir of compressed air. By way of background, a Compressed-Air Energy Storage (CAES) system is shown and described in the published thesis entitled *Investigation and Optimization of Hybrid Electricity Storage Systems Based Upon Air and Supercapacitors*, by Sylvain Lemofouet-Gatsi, Ecole Polytechnique Federale de Lausanne (20 Oct. 2006), Section 2.2.1, the disclosure of which is hereby incorporated by reference in its entirety. As stated by Lemofouet-Gatsi, "the principle of CAES derives from splitting of the normal gas turbine cycle—where roughly 66% of the produced power is used to compress air-into two separated phases: The compression phase where lower-cost energy from off-peak base-load facilities is used to compress air into underground salt caverns and the generation phase where the pre-compressed air from the storage cavern is pre-heated through a heat recuperator, then mixed with oil or gas and burned to feed a multistage expander turbine to produce electricity during peak demand. This functional separation of the compression cycle from the combustion cycle allows a CAES plant to generate three times more energy with the same quantity of fuel compared to simple cycle natural gas power plant.

CAES has the advantages that it doesn't involve huge, costly installations and can be used to store energy for a long time (more than one year). It also has a fast start-up time (9 to 12 minutes), which makes it suitable for grid operation, and the emissions of greenhouse gases are lower than that of a normal gas power plant, due to the reduced fuel consumption.

One of the main drawbacks of CAES is the geological structure reliance, which substantially limits the usability of this storage method. In addition, CAES power plants are not emission-free, as the pre-compressed air is heated up with a fossil fuel burner before expansion. Moreover, CAES plants are limited with respect to their effectiveness because of the loss of the compression heat through the inter-coolers, which must be compensated during expansion by fuel burning. The fact that conventional CAES still rely on fossil fuel consumption makes it difficult to evaluate its energy round-trip efficiency and to compare it to conventional fuel-free storage technologies . . . ."

SUMMARY OF THE INVENTION

Storing energy in the form of compressed gas has a long history and components tend to be well tested, reliable, and have long lifetimes. The general principles for compressed gas energy storage are the storage of original generated energy in terms of pressure potential energy by compression of gas and subsequent recovery of energy in useful form through expansion of the gas. Advantages to compressed gas energy storage include low specific-energy costs, long lifetime, low maintenance, reasonable energy density, and good reliability.

If the gas expansion occurs slowly relative to the rate at which heat flows into the gas, then the gas remains at a relatively constant temperature as it expands (isothermal gas expansion). Gas stored at ambient temperature and expanded isothermally recovers approximately three times the energy of ambient-temperature gas expanded adiabatically. Therefore, there is a significant energy advantage to expanding gas isothermally.

A more efficient and novel design for storing energy in the form of compressed gas utilizing isothermal gas expansion and compression is shown and described in U.S. patent application Ser. No. 12/421,057 (the '057 application), entitled SYSTEMS AND METHODS FOR ENERGY STORAGE AND RECOVERY USING COMPRESSED GAS, the disclosure of which is hereby incorporated by reference herein in its entirety. The '057 application provides a system for expanding gas isothermally in staged hydraulic/pneumatic cylinders and intensifiers over a large pressure range in order to generate electrical energy when required.

The power output of the system described in the '057 application is governed by how fast the gas expands isothermally. Therefore, the ability to expand/compress the gas isothermally at a faster rate will result in a greater power output of the system. By adding a heat-transfer circuit to the system described in the '057 application, the power density of said system can be increased substantially. Novel heat-transfer circuits are shown and described in U.S. patent application Ser. No. 12/639,703 (the '703 application), entitled SYSTEMS AND METHODS FOR ENERGY STORAGE AND RECOVERY USING RAPID ISOTHERMAL GAS EXPANSION AND COMPRESSION, the disclosure of which is hereby incorporated by reference herein in its entirety. By incorporating a variable displacement hydraulic-pneumatic pump/motor, the efficiency of the compressed gas energy storage and recovery system may be further improved, as described in U.S. patent application. Ser. No. 12/723,084 (the '084 application), entitled SYSTEMS AND METHODS FOR IMPROVING DRIVETRAIN EFFICIENCY FOR COMPRESSED GAS ENERGY STORAGE USING STAGED HYDRAULIC CONVERSION, the disclosure of which is hereby incorporated by reference herein in its entirety.

The novel compressed air energy storage and recovery systems using staged hydraulic conversion described in the '057 application include a hydraulic pump/motor which is driven by or used to pump hydraulic fluid over a range of pressures, i.e., from a mid-pressure to a high pressure (e.g., 300 psi to 3000 psi). For a typical such expansion or compression over a pressure range, using a fixed displacement hydraulic motor, as pressure drops, torque and power drop. In many instances, it would be advantageous to minimize these changes in power level over the pressure range. For example, efficiency for an electric motor/generator can vary substantially based on torque and RPM; when the hydraulic pump/motor in the staged hydraulic conversion described in the '057 application is attached to an electric motor/generator, it would be advantageous to operate at a narrow range or fixed value for RPM (e.g., ~1800 RPM) and torque to operate at peak efficiency, increasing electric-motor efficiency and thus system efficiency. Likewise, operating at a fixed RPM and power (and thus constant voltage, frequency, and current for an electric generator) during system discharge could allow an electric generator to be synchronized with the grid and potentially eliminate additional power conditioning equipment that would be required for a variable frequency, variable voltage, and/or variable power output. One method for maintaining a constant or nearly constant power output over the range of pressures is to use a variable displacement hydraulic pump/motor in lieu of a constant displacement pump/motor. By using a variable displacement hydraulic pump/motor, the displacement per revolution can be controlled in such a way as to maintain a nearly constant torque and proportionally increasing flow rate such that the RPM and power output are kept nearly constant. For the novel compressed air energy storage and recovery system using staged hydraulic conversion described in the '057 application, this constant RPM and power allows for a reduction in electric system costs by potentially eliminating power conditioning equipment necessary for a variable frequency, voltage, or power output, while at the same time improving overall system efficiency by operating at the peak efficiency region of the electric generator; likewise, increasing flow rate maintains a nearly constant power throughout a decreasing pressure range, also adding value to the energy storage and recovery system.

In one aspect, the invention relates to a compressed gas-based energy storage and recovery system utilizing substantially isothermal expansion and compression of a gas. The system includes at least one cylinder assembly including a first chamber and a second chamber separated by a movable mechanical boundary mechanism that transfers energy therebetween, a hydraulic motor, and a staging subsystem coupling the hydraulic motor to the at least one cylinder assembly. The staging subsystem is configured to convert a pneumatic pressure range within the at least one cylinder assembly into a smaller hydraulic pressure range at the hydraulic motor. In one embodiment, the hydraulic motor is a variable displacement hydraulic motor. The system can also include a compressed gas storage system, where the at least one cylinder assembly is in fluid communication with the compressed gas storage system.

In various embodiments of the foregoing aspect, the first chamber is a pneumatic chamber and the second chamber is a hydraulic chamber and the staging subsystem includes a double-acting hydraulic-hydraulic intensifier in fluid communication with the second chamber of the at least one cylinder assembly and the hydraulic motor. In additional embodiments, the at least one cylinder assembly includes a second cylinder assembly. The second cylinder assembly also includes first and second chambers separated by a movable mechanical boundary mechanism that transfers energy therebetween. The second cylinder assembly is in fluid communication with at least one of the at least one cylinder assembly and the double-acting hydraulic-hydraulic intensifier.

In one embodiment, an expansion of gas in the first chamber of the at least one cylinder assembly drives hydraulic fluid from the second chamber of the at least one cylinder assembly to push a piston in the double-acting hydraulic-hydraulic intensifier to drive the hydraulic motor with fluid from one hydraulic side of the double-acting hydraulic-hydraulic intensifier. The output of the hydraulic motor refills an opposing hydraulic side of the double-acting hydraulic-hydraulic intensifier, which in turn fills the second chamber of the second cylinder assembly with hydraulic fluid. Additionally, a gas expansion in the first chamber of the second cylinder assembly drives the hydraulic fluid in the second chamber of the second cylinder assembly to push the piston in the double-acting hydraulic-hydraulic intensifier driving the hydraulic motor with fluid from one hydraulic side of the double-acting hydraulic-hydraulic intensifier. This output of the hydraulic motor refills the opposing hydraulic side of the double-acting hydraulic-hydraulic intensifier, which in turn refills the second chamber of the at least one cylinder assembly with hydraulic fluid. In one embodiment, the double-acting hydraulic-hydraulic intensifier intensifies the pressure from the second chamber of the second cylinder assembly to approximately equal to the pressure of the second chamber of the at least one cylinder assembly. Additionally or alternatively, the double-acting hydraulic-hydraulic intensifier can add the pressures from the second chamber of the at least one cylinder assembly to the second chamber of the second cylinder assembly such that the hydraulic motor receives approximately two times the pressure of the second chamber of the at least one cylinder assembly. In yet another embodiment, the movable mechanical boundary mechanism of the at least one cylinder assembly is configured to transfer mechanical energy from the first chamber to the second chamber at a first pressure ratio, the movable mechanical boundary mechanism of the second cylinder assembly is configured to transfer mechanical energy from the first chamber to the second chamber at a second pressure ratio greater than the first pressure ratio, and the double-acting hydraulic-hydraulic intensifier includes a first hydraulic side and a second hydraulic side separated by a dual intensifier boundary mechanism, the double-acting hydraulic-hydraulic intensifier being configured to transfer mechanical energy between the first and second hydraulic sides at two different pressure ratios.

In other embodiments of the foregoing aspect of the invention, the staging subsystem includes a plurality of pneumatic-hydraulic intensifiers, each having a first chamber and a second chamber separated by a movable mechanical boundary mechanism that transfers energy therebetween, and at least one valve arrangement configured to provide fluid communication between the hydraulic motor and each second chamber of the plurality of pneumatic-hydraulic intensifiers. The movable mechanical boundary mechanisms of each pneumatic-hydraulic intensifier can be configured to transfer energy at different pressure ratios.

In still further embodiments of the foregoing aspect of the invention, the staging subsystem includes a second hydraulic motor in fluid communication with the at least one cylinder assembly and the hydraulic motor, and a valve arrangement for selectively connecting the second chamber of the at least one cylinder assembly to at least one of the hydraulic motors. In one embodiment, the second hydraulic motor has a first port configured for communication with a first port of the hydraulic motor and a second port configured for communication with at least one of the first port of the hydraulic motor and a second port of the hydraulic motor and the valve arrangement is configured for selectively connecting the two hydraulic motors in series or parallel relative to the second chamber of the at least one cylinder assembly. Additionally or alternatively, the second hydraulic motor can be a low-pressure turbine and the valve arrangement configured to direct hydraulic fluid from the second chamber of the at least one cylinder assembly to the turbine during a low-pressure operation and to the hydraulic motor during a high pressure operation.

In another embodiment of the foregoing aspect of the invention, the at least one cylinder assembly is a pneumatic cylinder assembly and the staging subsystem includes at least one hydraulic cylinder assembly having a first chamber and a second chamber separated by a movable mechanical boundary mechanism that transfers energy therebetween, a mechanical linkage coupling the movable mechanical boundary mechanism of the pneumatic cylinder assembly with the movable mechanical boundary mechanism of the hydraulic cylinder assembly, and a valve arrangement configured to fluidly couple at least one of the first chamber and the second chamber of the hydraulic cylinder assembly to the hydraulic motor. The staging subsystem can also include a second hydraulic cylinder assembly having a first chamber and a second chamber separated by a movable mechanical boundary mechanism that transfers energy therebetween. The second hydraulic cylinder assembly can be mechanically coupled to at least one of the pneumatic cylinder assembly and the hydraulic cylinder assembly via the mechanical linkage. The subsystem can also include a second valve arrangement configured to fluidly couple the first chamber of the second hydraulic cylinder assembly with the first chamber of the hydraulic cylinder assembly, a third valve arrangement configured to fluidly couple the second chamber of the second hydraulic cylinder assembly to the second chamber of the hydraulic cylinder assembly, and a fourth valve arrangement configured to fluidly couple the first and second chambers of the second hydraulic cylinder assembly. In one embodiment, the system includes a control system for operating the valve arrangements and cylinder assemblies in a staged manner to provide a predetermined pressure profile to the hydraulic motor. Additionally, the at least one cylinder assembly can include a plurality of pneumatic cylinder assemblies, each having a first chamber and a second chamber separated by a movable mechanical boundary mechanism that transfers energy therebetween. The pneumatic cylinder assemblies can be fluidly coupled in series. In one embodiment, the hydraulic cylinder assemblies are different sizes.

In another aspect, the invention relates to a method of providing a narrow pressure range to a hydraulic motor in a compressed gas-based energy storage and recovery system utilizing substantially isothermal expansion and compression of a gas. The method includes the steps of providing a compressed gas storage system, providing at least one cylinder assembly including a first chamber and a second chamber separated by a movable mechanical boundary mechanism that transfers energy therebetween, fluidly coupling the at least one cylinder assembly to the compressed gas storage system, providing a hydraulic motor, providing a staging subsystem to couple the hydraulic motor to the at least one cylinder assembly, and converting a pneumatic pressure range within the at least one cylinder assembly into a smaller hydraulic pressure range at the hydraulic motor.

In one embodiment of the foregoing aspect of the invention, the step of providing a staging subsystem includes providing a double-acting hydraulic-hydraulic intensifier, fluidly coupling the first chamber of the at least one cylinder assembly to the compressed gas storage system, fluidly coupling the second chamber of the at least one cylinder assembly to the double-acting hydraulic-hydraulic intensifier, and fluidly coupling the double-acting hydraulic-hydraulic intensifier to the hydraulic motor. The step of converting the pneumatic pressure range to a smaller hydraulic pressure range can include expanding gas from the compressed gas storage system in the first chamber of the at least one cylinder assembly, driving hydraulic fluid from the second chamber of the at least one cylinder assembly to push a piston in the double-acting hydraulic-hydraulic intensifier, and driving the hydraulic motor with fluid from one hydraulic side of the double-acting hydraulic-hydraulic intensifier.

In another embodiment, the step of providing a staging subsystem includes providing a plurality of pneumatic-hydraulic intensifiers, each having a first chamber and a second chamber separated by a movable mechanical boundary mechanism that transfers energy therebetween; coupling each first chamber of the plurality of pneumatic-hydraulic intensifiers to at least one of the at least one cylinder assembly and the compressed gas storage system; and coupling each second chamber of the plurality of pneumatic-hydraulic intensifiers to the hydraulic motor via at least one valve arrangement. The step of converting the pneumatic pressure range to a smaller hydraulic pressure range can include configuring each of the movable mechanical boundary mechanisms of the plurality of pneumatic-hydraulic intensifiers to transfer energy at different pressure ratios and operating the at least one valve arrangement to selectively couple each second chamber of the plurality of pneumatic-hydraulic intensifiers to the hydraulic motor.

In yet another embodiment of the foregoing aspect of the invention, the step of providing a staging subsystem includes providing a second hydraulic motor in fluid communication with the at least one cylinder assembly and the hydraulic motor and providing at least one valve arrangement for selectively connecting the second chamber of the at least one cylinder assembly to at least one of the hydraulic motors. The step of converting the pneumatic pressure range to a smaller hydraulic pressure range includes coupling a first port of the second hydraulic motor to a first port of the hydraulic motor, coupling a second port of the second hydraulic motor to the first port of the hydraulic motor and a second port of the hydraulic motor via the at least one valve arrangement, and operating the at least one valve arrangement to selectively connect the two hydraulic motors in series or parallel relative to the second chamber of the at least one cylinder assembly. In one embodiment, the second hydraulic motor is a low-pressure turbine and the step of converting the pneumatic pressure range to a smaller hydraulic pressure range includes directing hydraulic fluid from the second chamber of the at least one cylinder assembly to the turbine during a low-pressure operation and to the hydraulic motor during a high pressure operation.

In another embodiment of the foregoing aspect of the invention the at least one cylinder assembly is a pneumatic cylinder assembly. The step of providing a staging subsystem includes providing a hydraulic cylinder assembly having a first chamber and a second chamber separated by a movable mechanical boundary mechanism that transfers energy therebetween, mechanically coupling the movable mechanical boundary mechanism of the pneumatic cylinder assembly with the movable mechanical boundary mechanism of the hydraulic cylinder assembly via a linkage, and fluidly coupling at least one of the first chamber and the second chamber of the hydraulic cylinder assembly to the hydraulic motor via at least one valve arrangement. The step of providing a staging subsystem can also include providing a second hydraulic cylinder assembly having a first chamber and a second chamber separated by a movable mechanical boundary mechanism that transfers energy therebetween, mechanically coupling the second hydraulic cylinder to at least one of the pneumatic cylinder assembly and the hydraulic cylinder assembly via the linkage, fluidly coupling the first chamber of the second hydraulic cylinder assembly with the first chamber of the hydraulic cylinder assembly via a second valve arrangement, fluidly coupling the second chamber of the second hydraulic cylinder assembly to the second chamber of the hydraulic cylinder assembly via a third valve arrangement, and fluidly coupling the first and second chambers of the second hydraulic cylinder assembly via a fourth valve arrangement. The step of converting the pneumatic pressure range to a smaller hydraulic pressure range can include the step of operating the valve arrangements and cylinder assemblies in a staged manner to provide a predetermined pressure profile to the hydraulic motor.

In another aspect, the invention relates to a compressed gas-based energy storage and recovery system including a staged hydraulic-pneumatic energy conversion system. The staged hydraulic-pneumatic energy conversion system includes a compressed gas storage system, at least one pneumatic-hydraulic accumulator, at least one pneumatic-hydraulic intensifier, a double-acting hydraulic-hydraulic intensifier, and a control system. The control system operates the compressed gas storage system, the accumulator, and the intensifiers in a staged manner to provide a predetermined pressure profile to at least one outlet.

In another aspect, the invention relates to a method of energy storage and recovery in a compressed gas storage system. The system includes at least one pneumatic-hydraulic accumulator, at least one pneumatic-hydraulic intensifier, and a double-acting hydraulic-hydraulic intensifier. The method includes the steps of transferring mechanical energy from a pneumatic side of the at least one pneumatic-hydraulic accumulator to a hydraulic side of the at least one pneumatic-hydraulic accumulator at a first pressure ratio, transferring mechanical energy from a pneumatic side of the at least one pneumatic-hydraulic intensifier to a hydraulic side of the at least one pneumatic-hydraulic intensifier at a second pressure ratio greater than the first pressure ratio, transferring mechanical energy from a first hydraulic side of the double-acting hydraulic-hydraulic intensifier to a second hydraulic side of the double-acting hydraulic-hydraulic intensifier at two different pressure ratios, and operating the compressed gas storage system, the accumulator, and the intensifiers in a staged manner to provide a predetermined pressure profile to at least one outlet.

In various embodiments of the foregoing aspect, the method includes the step of operating a control valve arrangement for interconnecting the compressed gas storage system, the accumulator, the intensifiers, and the at least one outlet. The step of operating the control valve arrangement comprises opening and closing the valve arrangements in response to at least one signal from a control system.

In various embodiments of the foregoing aspects of the invention, the pneumatic-hydraulic accumulator includes a hydraulic side and a pneumatic side separated by an accumulator boundary mechanism, the pneumatic-hydraulic intensifier includes a hydraulic side and a pneumatic side separated by an intensifier boundary mechanism, and the double-acting hydraulic-hydraulic intensifier includes a first hydraulic side and a second hydraulic side separated by a dual intensifier boundary mechanism. The accumulator can be configured to transfer mechanical energy from the pneumatic side to the hydraulic side at a first pressure ratio. The intensifier can be configured to transfer mechanical energy from the pneumatic side to the hydraulic side at a second pressure ratio greater than the first pressure ratio. The double-acting hydraulic-hydraulic intensifier can be configured to transfer mechanical energy between the first and second hydraulic sides at two different pressure ratios. The system can also include a variable displacement hydraulic motor/pump having a first port in communication with the first hydraulic side of the double-acting hydraulic-hydraulic intensifier and a second port in communication with the second hydraulic side of the double-acting hydraulic-hydraulic intensifier.

In additional embodiments, the system includes a second pneumatic-hydraulic accumulator having a hydraulic side and a pneumatic side separated by an accumulator boundary mechanism and a second pneumatic-hydraulic intensifier having a hydraulic side and a pneumatic side separated by an intensifier boundary mechanism. The accumulator can be configured to transfer mechanical energy from the pneumatic side to the hydraulic side at the first pressure ratio and the intensifier can be configured to transfer mechanical energy from the pneumatic side to the hydraulic side at the second pressure ratio. In one embodiment, the first (i.e., at least one) pneumatic-hydraulic accumulator and the second pneumatic-hydraulic intensifier are in communication with the first hydraulic side of the double-acting hydraulic-hydraulic intensifier and the second pneumatic-hydraulic accumulator and the first (i.e., at least one) pneumatic-hydraulic intensifier are in communication with the second hydraulic side of the double-acting hydraulic-hydraulic intensifier. The system can also include a control valve arrangement, responsive to the control system, for interconnecting the compressed gas storage system, the accumulators, the intensifiers, and the hydraulic motor/pump.

In various embodiments, the control valve arrangement includes a first arrangement for providing controllable fluid communication between at least one of the accumulator pneumatic sides and the compressed gas storage system, a second arrangement for providing controllable fluid communication between at least one of the accumulator pneumatic sides and at least one of the intensifier pneumatic sides, a third arrangement for providing controllable fluid communication between at least one of the accumulator hydraulic sides and at least one of the hydraulic sides of the double-acting hydraulic-hydraulic intensifier, and a fourth arrangement for providing controllable fluid communication between at least one of the intensifier hydraulic sides and at least one of the hydraulic sides of the double-acting hydraulic-hydraulic intensifier. The control valve arrangement can also include a fifth valve arrangement for providing controllable fluid communication between the first hydraulic side of the double-acting hydraulic-hydraulic intensifier and the first port of the hydraulic motor/pump and the second hydraulic side of the double-acting hydraulic-hydraulic intensifier and the second port of the hydraulic motor/pump. Any one of the first through fourth valve arrangements can be a two position, two-way valve. The fifth valve arrangement can be a two position, four-way valve to allow the variable displacement hydraulic pump/motor to operate in one direction.

Additionally, the staged hydraulic-pneumatic energy conversion system can include an electric generator/motor mechanically coupled to the hydraulic motor/pump. The control system can include a sensor system. The sensor system can monitor at least one of (a) a fluid state related to at least one of the accumulator pneumatic sides, at least one of the intensifier pneumatic sides, at least one of the accumulator hydraulic sides, and at least one of the intensifier hydraulic sides, (b) a fluid state related to at least one of the double-acting hydraulic-hydraulic intensifier hydraulic sides, (c) a flow in hydraulic fluid, or (d) a position of the accumulator boundary mechanism, the intensifier boundary mechanism, and the dual intensifier boundary mechanism.

The control valve arrangement can allow gas from the compressed gas storage system to expand first within at least one of the accumulator pneumatic sides and then into at least one of the intensifier pneumatic sides in a staged manner. The gas expansion occurs substantially isothermally. The substantially isothermal gas expansion can be free of an application of an external heating source other than thermal exchange with the system's surroundings. The system is configured to provide substantially isothermal gas expansion via heat transfer from outside the accumulators and the intensifiers therethrough, and to the gas within the accumulator pneumatic sides and the intensifier pneumatic sides. The compressed gas storage system can include at least one pressurized gas vessel.

In additional embodiments, the first pneumatic-hydraulic accumulator, the second pneumatic-hydraulic accumulator, the first pneumatic-hydraulic intensifier, and the second pneumatic-hydraulic intensifier have approximately the same volumetric capacity. The expansion of gas in the first pneumatic-hydraulic accumulator can drive hydraulic fluid in the first pneumatic-hydraulic accumulator to push a piston in the double-acting hydraulic-hydraulic intensifier to drive the variable displacement hydraulic motor/pump with fluid from one of the hydraulic sides of the double-acting hydraulic-hydraulic intensifier. The output of the variable displacement hydraulic motor/pump refills the opposing hydraulic side of the double-acting hydraulic-hydraulic intensifier, which in turn refills the first pneumatic-hydraulic intensifier with hydraulic fluid. The gas expansion in the second pneumatic-hydraulic accumulator drives the hydraulic fluid in the second pneumatic-hydraulic accumulator to push the piston in the double-acting hydraulic-hydraulic intensifier to drive the variable displacement hydraulic pump/motor with fluid from one of the hydraulic sides of the double-acting hydraulic-hydraulic intensifier. The output of the variable displacement hydraulic pump/motor refills the opposing hydraulic side of the double-acting hydraulic-hydraulic intensifier, which in turn refills the second pneumatic-hydraulic intensifier with hydraulic fluid.

In further embodiments, the double-acting hydraulic-hydraulic intensifier intensifies the pressure from the second pneumatic-hydraulic accumulator to approximately the pressure of the first pneumatic-hydraulic accumulator. The double-acting hydraulic-hydraulic intensifier can be operated to add the pressure from the first pneumatic-hydraulic accumulator to the pressure of the second pneumatic-hydraulic accumulator such that the variable displacement hydraulic motor/pump receives approximately two times the pressure of the first pneumatic-hydraulic accumulator.

In yet another aspect, the invention relates to a compressed gas-based energy storage and recovery system including a staged hydraulic-pneumatic energy conversion system. The gas-based energy storage system includes a compressed gas storage system, at least two pneumatic-hydraulic accumulators, a double-acting hydraulic-hydraulic intensifier, and a control system. The control system operates the compressed gas storage system, the accumulators, and the intensifier in a staged manner to provide a predetermined pressure profile to at least one outlet. In one embodiment, the double-acting hydraulic-hydraulic intensifier includes a first hydraulic side and a second hydraulic side separated by a dual intensifier boundary mechanism. The double-acting hydraulic-hydraulic intensifier is configured to transfer mechanical energy between the first and second hydraulic sides at two different pressure ratios. The system can also include a variable displacement hydraulic motor-pump having a first port in communication with the first hydraulic side of the double-acting hydraulic-hydraulic intensifier and a second port in communication with the second hydraulic side of the double-acting hydraulic-hydraulic intensifier. The control system can be used to control at least one variable selected from the group consisting of pressure, piston position, power, flow rate, torque, RPM, current, voltage, and displacement per revolution of the variable displacement hydraulic motor-pump.

In various embodiments of the foregoing aspect of the invention, the compressed gas-based energy storage and recovery system includes a control valve arrangement, responsive to the control system, for interconnecting the compressed gas storage system, the accumulators, the intensifier, and the variable displacement hydraulic motor-pump. The control valve arrangement can include a two position, four-way valve to allow the variable displacement hydraulic motor-pump to operate in one direction. The compressed gas-based energy storage system can also include an electric generator/motor mechanically coupled to the hydraulic motor-pump.

In additional embodiments, at least one of the pneumatic-hydraulic accumulators is a high pressure accumulator and at least one of the pneumatic-hydraulic accumulators is a low pressure accumulator. In one embodiment, the low pressure accumulator is volumetrically larger than the high pressure accumulator, for example, the low pressure accumulator can be ten times volumetrically larger than the high pressure accumulator. In addition, at least one of the pneumatic-hydraulic accumulators can be a liquid-piston cylinder assembly, e.g., a pistonless accumulator.

The compressed gas-based energy storage system can also include a heat exchange circuit for expediting heat transfer in an air side of at least one of the accumulators. The heat exchange circuit can include a fluid circulator (i.e., a circulation apparatus) and a heat exchanger. The heat exchange circuit can also include a heat transfer fluid reservoir, where the fluid circulator pumps a heat transfer fluid into the air side of the at least one accumulator. In one embodiment, the heat transfer fluid reservoir includes a hydraulic side of the at least one accumulator. The at least one accumulator can include a spray mechanism such as a spray head disposed within the air side thereof for introducing the heat transfer fluid. In another embodiment, the at least one accumulator can include a spray mechanism such as a spray rod disposed therein, where the heat transfer fluid is directed radially outward from the spray rod into the air side of the at least one accumulator. The compressed-gas-based energy system can also include a hydraulic turbine in communication with one or more low pressure accumulators.

The invention is also directed toward efficiently utilizing high-pressure compressed air in combination with hydraulic-pneumatic cylinders and a hydraulic motor to provide the primary means of propulsion for a vehicle, such as an automobile, truck, boat, or train. Specifically, high-pressure compressed air, stored in pressure vessels, is expanded in batches in hydraulic-pneumatic cylinders, driving high-pressure hydraulic fluid through a hydraulic motor to provide propulsive force. The compressed air undergoes quasi-isothermal controlled expansion in the hydraulic-pneumatic cylinders, which are integrated with heat exchangers. The hydraulic-pneumatic cylinders may include intensifiers to maintain a high hydraulic pressure even as the air pressure decreases within each batch expansion. Additional hydraulic boosters may be used to intensify and/or add pressures from multiple expanding cylinders. During braking and coasting, the hydraulic motor may be run in reverse, recompressing the air in the pneumatic-hydraulic cylinders and storing energy from the motion of the vehicle as compressed-air potential energy. In an alternative embodiment of this application, when the compressed air reaches a lower pressure (e.g., 120 psi), it is expanded in an air-turbine-based motor attached to the same shaft as the hydraulic motor, thus greatly increasing the power density of the hydraulic-pneumatic conversion system. In an additional embodiment, the lower-pressure compressed air is used in combination with compressed natural gas to drive a turbine-based motor attached to the same shaft as the hydraulic motor, further increasing power density and energy density.

Compressed air has long been used in industry, has been used in two utility-scale energy storage installations combined with natural gas turbines, and has been proposed as a vehicular power source (e.g., driving a piston engine directly). Compressed air storage relies on mechanical, non-toxic components, has a very high cycle lifetime, and offers reasonably high energy density, especially for larger vehicles such as trains, ships, and trucks. Like electric vehicles, compressed-air vehicles produce no emissions locally by swapping out pressure vessels. Compressed air can be used as both a prime mover or in combination with other power sources. For example, it can be used to recover energy from braking for startup acceleration (regenerative braking).

In the open-air cycle described herein, compressed air is stored at high pressure (e.g., 3,000 psi) in pressure vessels and then expanded down to atmospheric pressure and vented to the environment. During compression, air is drawn from the environment, compressed, and then stored in pressure vessels. Thus, the pressure range goes from atmospheric to full pressure (e.g., 3,000 psi) and the quantity (mass) of air stored in the vessels varies with working pressure. In this way, energy density of an open-air system is more than 10 times that of a closed-air system.

Near-isothermal expansion permits increased round-trip thermodynamic efficiency in the compressed-air energy storage component, e.g., ~95% versus <40% for an adiabatic system. For the same reason, the energy density of a near-isothermal system is more than double the energy density of an adiabatic compressed-air storage system. Moreover, with near-isothermal compression and expansion, there is a non-linear gain in energy density and power density with increasing maximum storage pressure—e.g., storage at 10,000 psi more than triples (increases ~3.7 times) energy density over storage at 3,333 psi. In addition, increasing maximum pressure reduces the amount of energy in each expansion at low pressures, thus reducing any losses that would be associated with the inclusion of a low-pressure air turbine motor to increase power density, as described in FIG. 33 herein.

In another aspect, the invention relates to a vehicle propulsion system using compressed air. The system includes a driveshaft, an open-air staged hydraulic-pneumatic system, a hydraulic motor/pump mechanically coupled to the driveshaft, and a control system for operating the propulsion system. The open-air staged hydraulic-pneumatic system includes a compressed gas storage system and a hydraulic cylinder including a pneumatic side and a hydraulic side separated by a boundary mechanism that transfers mechanical energy therebetween. The hydraulic motor/pump has a first port in fluid communication with the hydraulic side of the hydraulic cylinder and a second port in fluid communication with the hydraulic cylinder.

In various embodiments of the foregoing aspect, the system includes a control valve arrangement responsive to the control system for interconnecting the compressed gas storage system, the hydraulic cylinder, and the hydraulic motor/pump. The drive shaft can include a transmission assembly and a transaxle coupled thereto and/or a propeller. In additional embodiments, the system includes an electric generator/motor mechanically coupled to the hydraulic motor/pump. The hydraulic cylinder can be an accumulator or an intensifier.

Furthermore, the system can include a second hydraulic cylinder including a pneumatic side and a hydraulic side separated by a boundary mechanism that transfers mechanical energy therebetween. The second hydraulic cylinder can be connected in parallel with the first hydraulic cylinder such that the pneumatic sides of the cylinders are in fluid communication and the hydraulic sides of the cylinders are in fluid communication. The system can further include a control valve arrangement responsive to the control system for interconnecting and operating the two hydraulic cylinders in a staged manner. In one embodiment of the system, the first hydraulic cylinder transfers mechanical energy at a first pressure ratio and the second hydraulic cylinder transfers mechanical energy at a second pressure ratio greater than the first pressure ratio. The system can also include a sensor system that monitors at least one of (a) a fluid state related to the first cylinder pneumatic side, the second cylinder pneumatic side, the first cylinder hydraulic side, and the second cylinder hydraulic side (b) a flow in hydraulic fluid, or (c) a position of the first cylinder boundary mechanism and the second cylinder boundary mechanism. The control can be configured for receiving telemetry from the sensor system to control operation of the vehicle propulsion system based at least in part on the received telemetry.

In additional embodiments, the system includes a heat transfer subsystem in fluid communication with the pneumatic side of the hydraulic cylinder. The heat transfer subsystem can include a circulation apparatus in fluid communication with the pneumatic side of the hydraulic cylinder for circulating the gas through the heat transfer subsystem and a heat exchanger. The heat exchanger can include a first side in fluid communication with the circulation apparatus and the pneumatic side of the hydraulic cylinder, and a second side in fluid communication with a fluid source having a substantially constant temperature. The circulation apparatus circulates the gas from the pneumatic side of the hydraulic cylinder, through the heat exchanger, and back to the pneumatic side of the hydraulic cylinder. The system can also include at least one temperature sensor for monitoring the temperature of the gas circulating within the heat transfer subsystem at various locations, for example, the temperature of the gas exiting the heat transfer subsystem or the temperature of the gas in the pneumatic side of the hydraulic cylinder. The control system can be configured for receiving telemetry from the at least one temperature sensor to control operation of the heat transfer subsystem based at least in part on the received telemetry.

In another aspect, the invention relates to a method of providing propulsion to a vehicle using a compressed gas storage system, a hydraulic cylinder, and a hydraulic motor/pump. The method includes the steps of coupling a shaft of the hydraulic motor/pump to a drive shaft of the vehicle, providing pressurized gas from the compressed gas storage system to a pneumatic side of the hydraulic cylinder, transferring mechanical energy from the pneumatic side of the hydraulic cylinder to a hydraulic side of the hydraulic accumulator, and driving hydraulic fluid out of the hydraulic cylinder and through the hydraulic motor/pump. Driving hydraulic fluid through the hydraulic motor/pump causes rotation of the shaft of the hydraulic motor/pump and the vehicle drive shaft coupled thereto.

In various embodiments, the method includes the step of providing a second hydraulic cylinder connected in parallel with the first hydraulic cylinder and operated sequentially with and in the same manner as the first hydraulic cylinder. In addition, the step of transferring mechanical energy from the pneumatic side of the hydraulic cylinder to a hydraulic side of the hydraulic accumulator comprises expanding the compressed gas within the pneumatic side of the hydraulic cylinder in a substantially isothermal manner. The method can include the step of circulating the compressed gas within the pneumatic side of the hydraulic cylinder through a heat exchange system.

These and other objects, along with the advantages and features of the present invention herein disclosed, will become apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

Figure 1A:
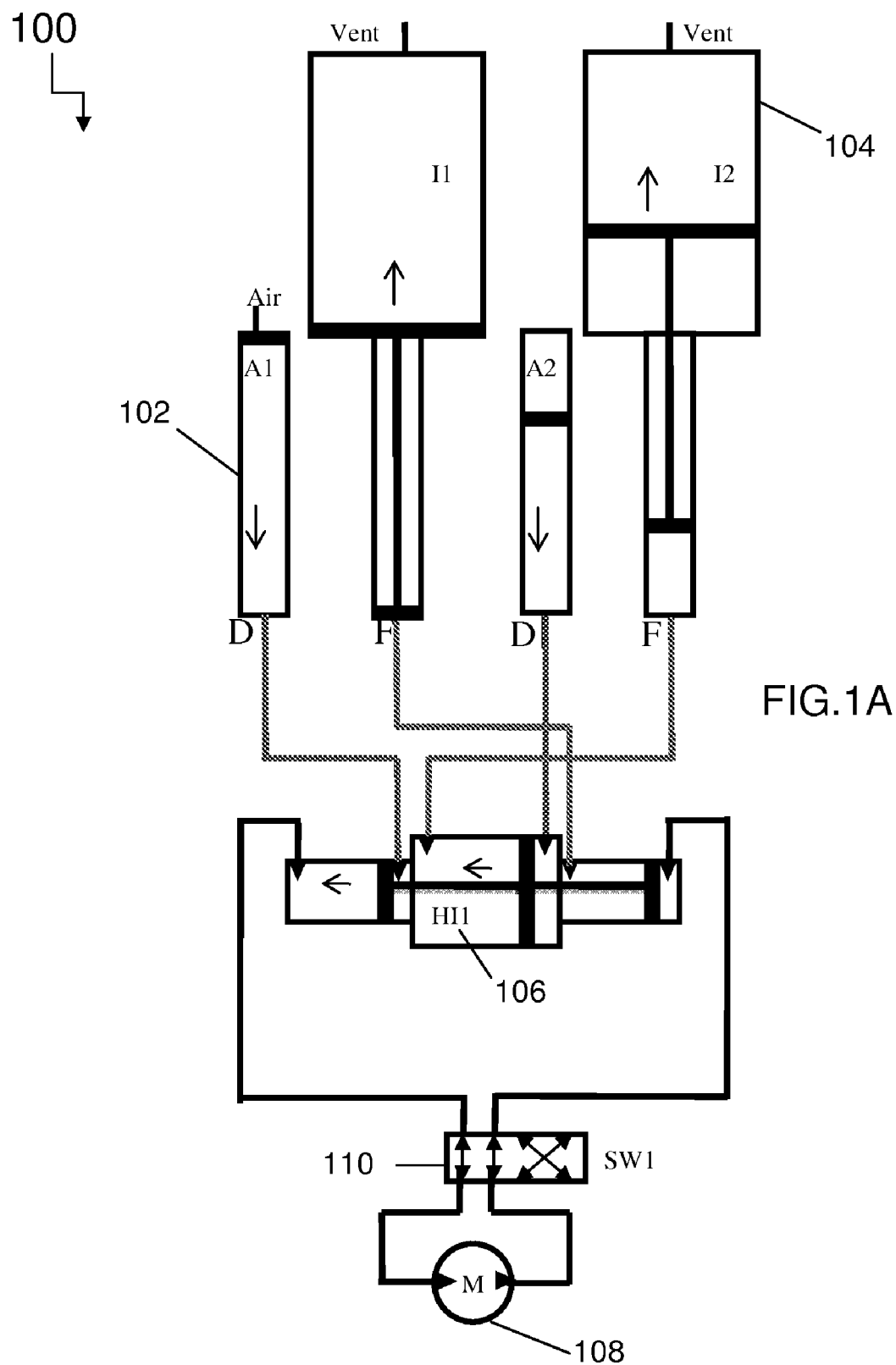
FIGS. 1A-1D are schematic diagrams of the major pneumatic and hydraulic components for compressed air energy storage and recovery systems using staged hydraulic conversion, illustrating first through fourth time steps in a single full cycle.

The various systems and methods described herein refer to multiple arrangements of pneumatic and hydraulic-pneumatic components, the components generally designated as follows: accumulators (A1, A2, . . . ); intensifiers (I1, I2, . . . ); hydraulic-hydraulic intensifiers (HI1; hydraulic motors (M), and directional valves (SW1, SW2, . . . ).

FIGS. 1A-1D depict the major pneumatic and hydraulic components for a compressed air energy storage and recovery system 100 using staged hydraulic conversion. FIGS. 1A-1D illustrate four time steps in a single full cycle. The system 100 includes two pneumatic-hydraulic accumulators 102 and two pneumatic-hydraulic intensifiers 104 paired with one double-acting hydraulic-hydraulic intensifier 106, coupled with a variable displacement hydraulic pump/motor 108. In particular, the system 100 includes two equally sized hydraulic-pneumatic accumulators 102, labeled A1 and A2, two hydraulic-pneumatic intensifiers 104, labeled I1 and I2, with hydraulic fluid side capacity approximately equal to the accumulator capacity, one double-acting hydraulic-hydraulic intensifier 106, labeled HI1, coupled with a variable displacement hydraulic pump/motor 108, labeled M1. A four-way hydraulic valve 110, labeled SW1, allows the pump/motor 108 to always operate in one direction.

Figure 1B:
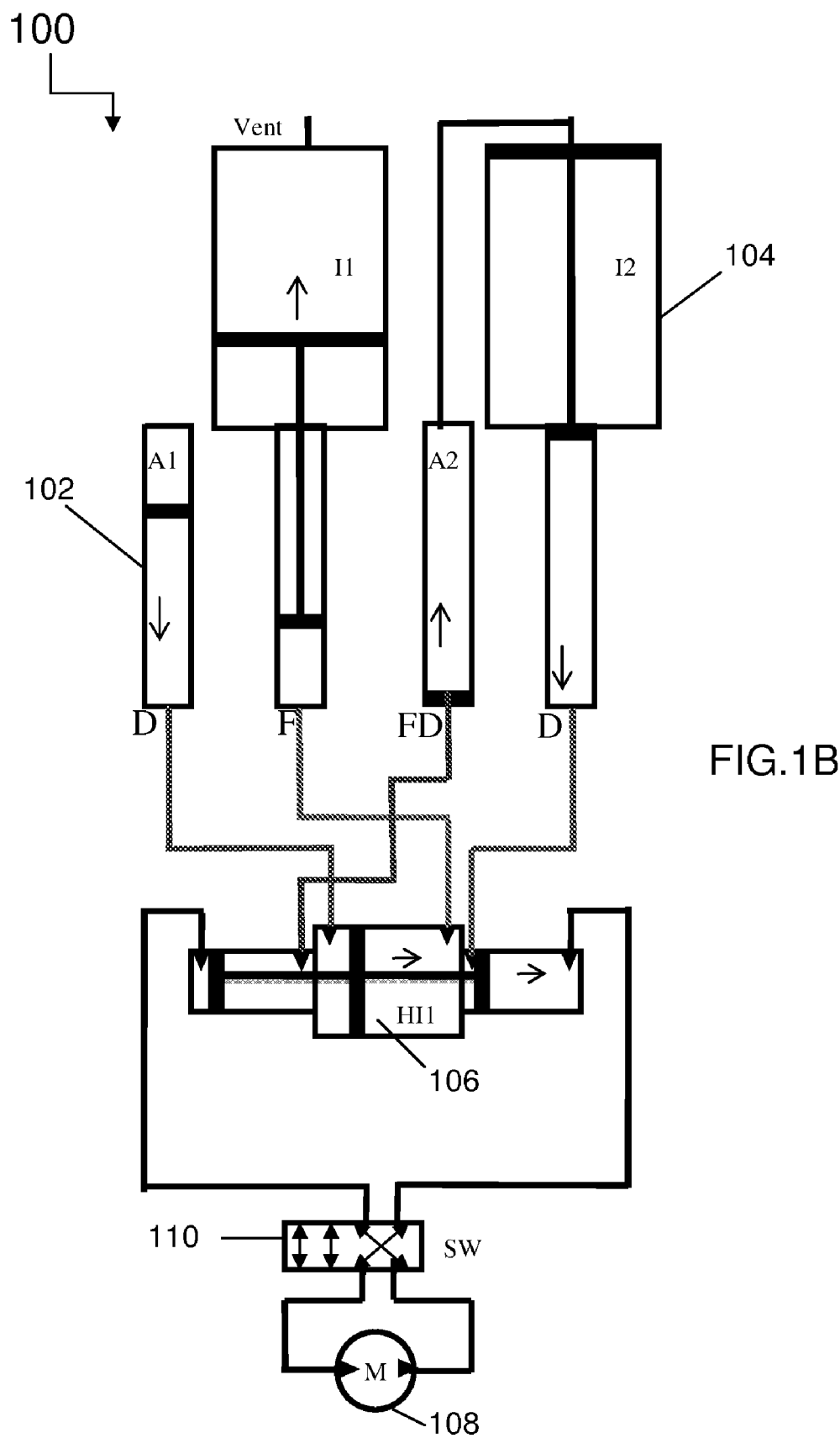
Figure 1C:
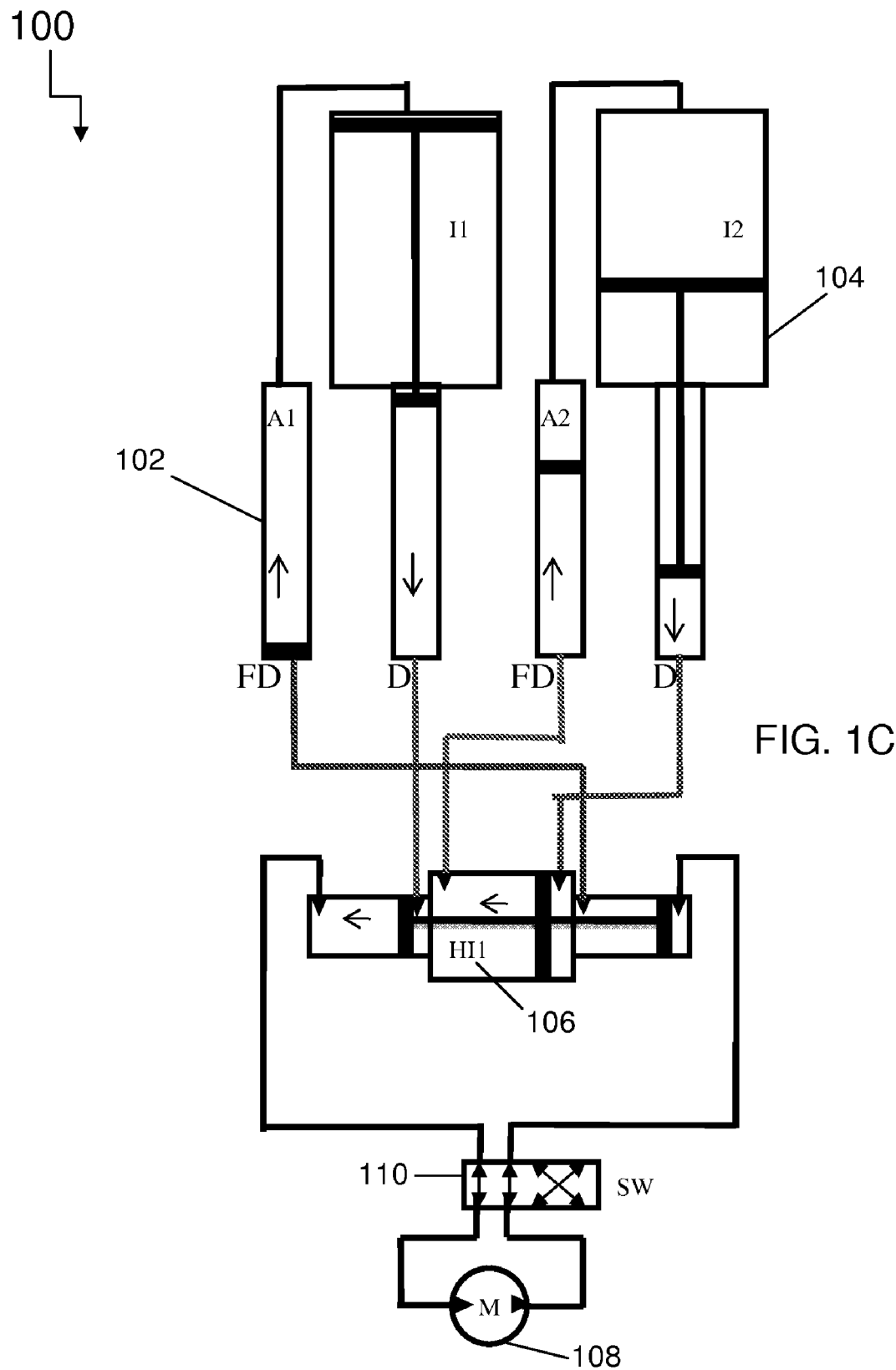
Figure 1D:
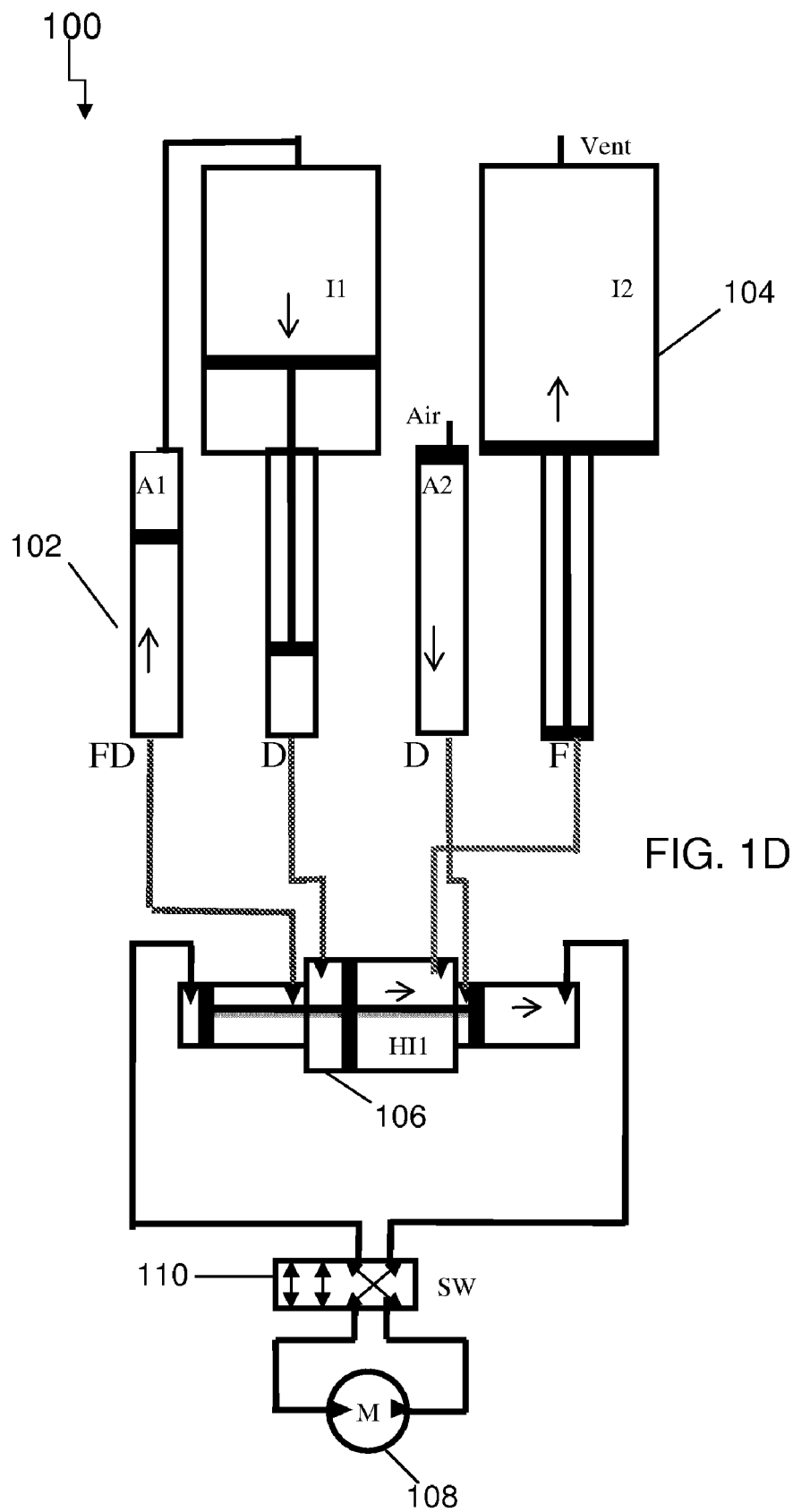

FIG. 1A through FIG. 1D show the progression of an expansion cycle in this system for a series of instances in time FIG. 1A to FIG. 1D, with the system returning to the state shown in FIG. 1A following the state shown in FIG. 1D. The labels D and F refer to whether the accumulator or intensifier is driving (D) or filling (F), with the additional label for the accumulators where FD refers to the accumulator filling with hydraulic fluid while still at moderate pressure, with the air side of the accumulator attached to and driving the intensifier air side. It should be noted that any number and combination of accumulators, intensifiers, and motors may be used to suit a particular application as discussed below with respect to, for example, FIGS. 2-22.

Figure 18:
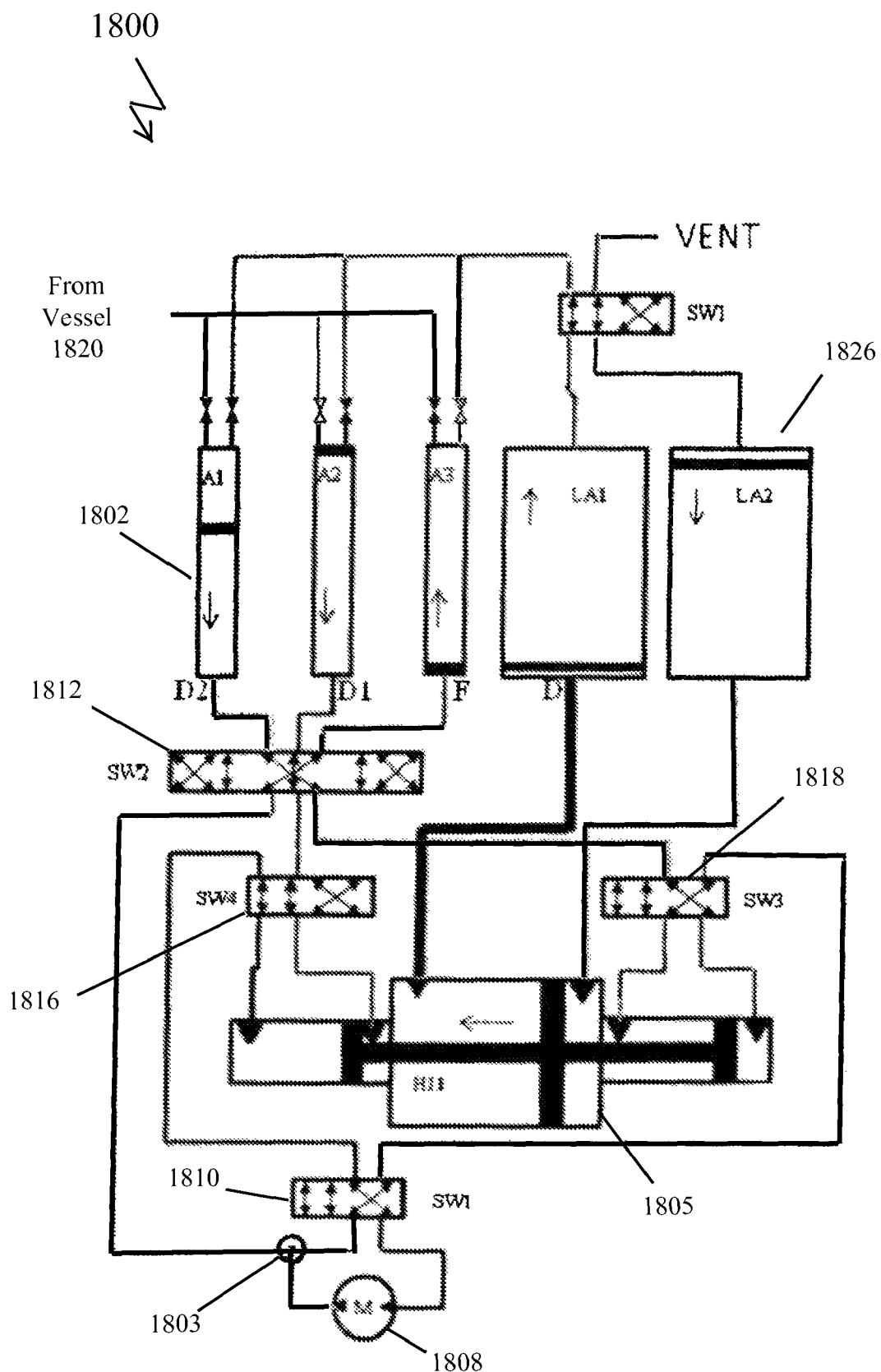

Following through the cycle, in the time instance shown in FIG. 1A, A1 is being driven with high pressure gas from a pressure vessel (not shown). After a specific amount of compressed gas is admitted (based on the current vessel pressure), a valve will be closed, disconnecting the pressure vessel, and the high pressure gas will continue to expand in A1 as shown in FIG. 18. Intensifier I1 is currently empty of hydraulic fluid and its pneumatic side is unpressurized and being vented to the atmosphere. The expansion of the gas in A1 drives the hydraulic fluid in the accumulator, which is attached to a port on HI1, pushing the piston to the left, driving the hydraulic motor M1, with the output of the motor M1 refilling HI1 and ultimately filling I1 with hydraulic fluid. At the time point shown in FIG. 1A, A2 already has mid-high pressure air in it that is at its half energy point in its expansion. Assuming that a 10:1 pressure expansion happens in the accumulator, this corresponds to the mid-high pressure equal to the max pressure multiplied by the square root of 10. Intensifier I2 is partially filled with hydraulic fluid and its pneumatic side is unpressurized and being vented to the atmosphere. The expansion of the gas in A2 drives the hydraulic fluid in the accumulator A2, which is attached to a port on HI1 connected to a piston that has a larger area (square of 10 larger for the 10:1 pressure expansion example) such that the pressure of the hydraulic fluid is multiplied by the area ratio, providing an output pressure approximately equal to the driving pressure from A1, pushing the piston to the left and driving the hydraulic motor M1, with the output of the motor refilling HI1 and ultimately filling I2 with hydraulic fluid. It is important to note that the forces from the two hydraulic driving pressures add, effectively doubling the pressure. Thus HI1 accomplishes two tasks: (1) it intensifies the mid-high pressure from A2 to equal to the high pressure of A1, and (2) it adds pressure from A1 and intensified A2 such that the motor sees a pressure of approximately two times the pressure of A1.

For an exemplary system where the pressure in the accumulator ranges from a high pressure of about 3,000 psi to a mid-pressure of about 300 psi, the HI1 intensification of A2 at the half energy point (3,000/√10=~950 psi, in this case) keeps the pressure range between 3,000 to the mid-high pressure of 950 psi. Additionally, by adding the pressures from the two accumulators in the hydraulic-hydraulic intensifier, the hydraulic motor sees a pressure from approximately 6,000 to 1,900 psi. By reducing the pressure variation, the variable displacement pump/motor size can be reduced (again by a factor of 1/√10 in this example). Likewise, by adding the pressures, the pressure seen at the variable displacement pump/motor is increased, also reducing the size of the pump/motor (by a factor of two for a given power) and, for many current commercial hydraulic pump/motors, operating at a higher overall efficiency.

Continuing to the time instance shown in FIG. 1B, A1 has reached the half energy point and is at the mid-high pressure (e.g., 950 psi); A2 has completed its expansion and is empty of hydraulic fluid, but contains air at the mid-pressure point (e.g., 300 psi). Intensifier I1 is partially full of hydraulic fluid and I2 is now full of hydraulic fluid. Valves (not shown) are now changed so that A1 is now driving the larger piston in HI1, driving M1, and ultimately filling I1. The air side of A2 is connected through a valve to the air side of I2. The air in I2 pushes on a larger piston that is connected to a smaller piston (area ratio equal to approximately 10×, for example) such that hydraulic fluid is pressurized to approximately the original high pressure (e.g., 3000 psi) and drives HI1, driving M1, and ultimately filling A2. Again, HI1 accomplishes two tasks: (1) it intensifies the mid-high pressure from A1 to approximately equal to that of the hydraulic fluid in I2, and (2) it adds the pressure from the I2 and intensified A1 such that the motor sees a pressure of approximately two times the hydraulic pressure in I2.

At the time instance shown in FIG. 1C, the system 100 has returned to a state similar to that shown in FIG. 1A, but with both intensifiers driving. Accumulator A2 is now partially full of hydraulic fluid and at a mid-low pressure (e.g., $300/\sqrt{10}$=~95 psi) and is still attached and driving I2. Accumulator A1 has completed its expansion and is empty of hydraulic fluid, but contains air at the mid-pressure point (e.g., 300 psi). Intensifier I1 is now full of hydraulic fluid and I2 is partially full of hydraulic fluid and still connected to A2. The air in I2 is at mid-low pressure and is intensified to drive hydraulic fluid at mid-high pressure (e.g., 950 psi) into the appropriate port in HI1 where is it further intensified to high pressure (e.g., 3,000 psi) driving M1 and ultimately filling A2. The air side of A1 is connected through a valve to the air side of I1. The mid-pressure (e.g., 300 psi) air in I1 is intensified to drive hydraulic fluid at high pressure (e.g., 3,000 psi) and drives HI1, driving M1, and ultimately filling A1. Hydraulic-hydraulic intensifier HI1 adds the pressure from intensified I2 and I1 such that the motor sees a pressure of approximately two times the hydraulic pressure in I1.

At the time instance shown in FIG. 1D, A1 is now partially full of hydraulic fluid and at a mid-low pressure (e.g., $300/\sqrt{10}$=~95 psi) and is still attached to and driving I1. Accumulator A2 has been refilled with hydraulic fluid. I2 is empty of hydraulic fluid and its air side has been fully expanded and vented to atmospheric pressure. Accumulator A2 is then connected to high pressure gas from a pressure vessel and a specific amount of compressed gas is admitted. The high pressure air in A2 drives hydraulic fluid at high pressure (e.g., 3,000 psi) into a port of HI1, driving M1 and ultimately filling I2. The air in I1 is at mid-low pressure and is intensified to drive hydraulic fluid at mid-high pressure (e.g., 950 psi) into the appropriate port in HI1, where it is further intensified to high pressure (e.g., 3,000 psi), driving M1 and ultimately filling A1. Hydraulic to hydraulic intensifier HI1 adds the pressure from intensified I1 and A2 such that the motor sees a pressure of approximately two times the hydraulic pressure in A2. Following the state shown in FIG. 1D, the system 100 returns to the state shown in FIG. 1A and the cycle continues.

Various alternative arrangements of the pneumatic and pneumatic-hydraulic components for a compressed air energy storage and recovery system are shown in FIGS. 2-22. Like the system described with respect to FIGS. 1A-1D, these alternative arrangements also provide for reducing the pressure profile for improving the efficiency of the drivetrain. Generally, the various arrangements/systems rely on certain common assumptions for determining the basic operational parameters: 3,000 psi max pressure and four liters of air admitted per expansion cycle. In addition, the basic operation of the various like components (e.g., hydraulic-hydraulic intensifier 206, 306, 406, etc. and hydraulic motor 208, 308, 408, etc.) is similar to that described with respect to FIGS. 1A-1D.

Additionally, while these various arrangements/systems are all configured to reduce the pressure profile, they utilize a variety of cylinders (pneumatic and/or pneumatic-hydraulic), booster/intensification stages, and valve and clutch arrangements to arrive at a pressure profile that is acceptable/optimal. The basic configurations and operating parameters for the different arrangements/systems are outlined in Table 1.

TABLE 1

Design Matrix for Drivetrain Options.

Figure 2:
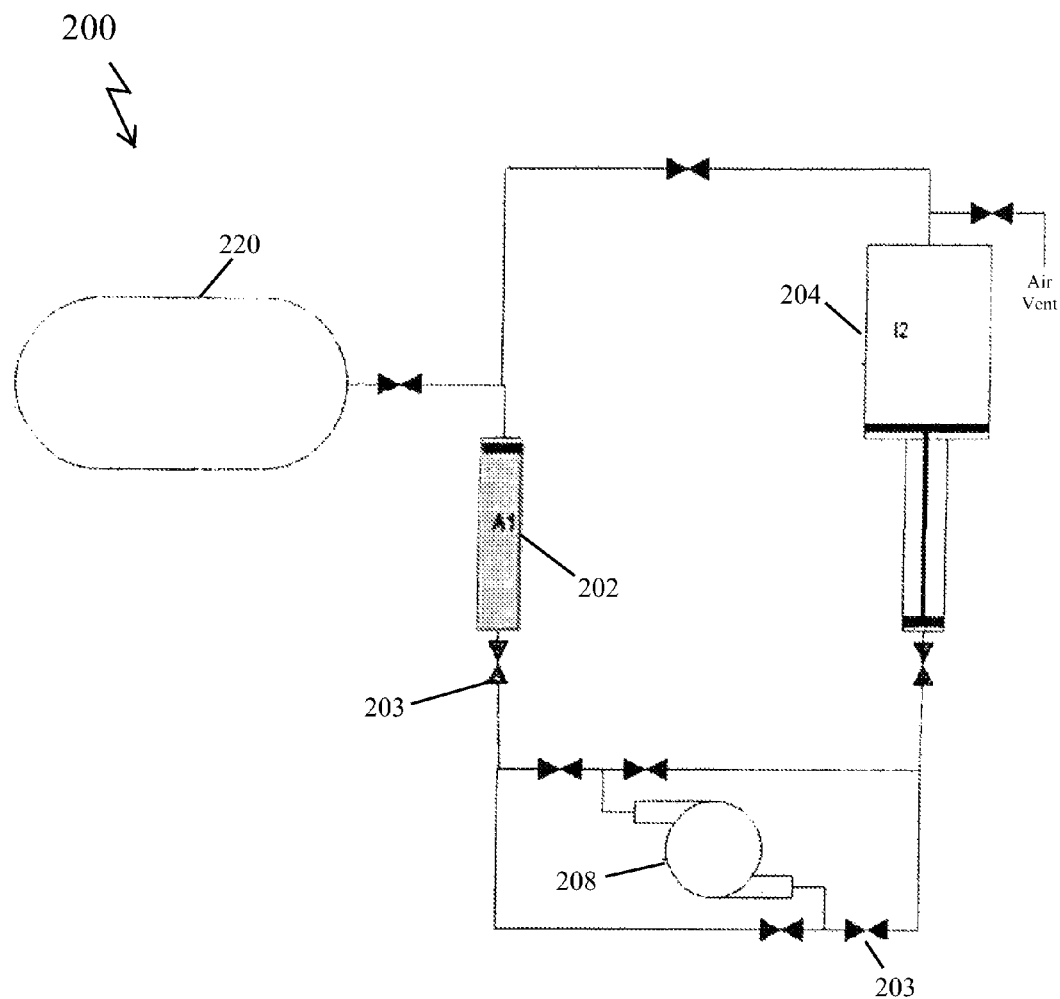
FIGS. 2-22 are alternative arrangements of pneumatic and hydraulic components for compressed air energy storage and recovery systems.
Figure 3A:
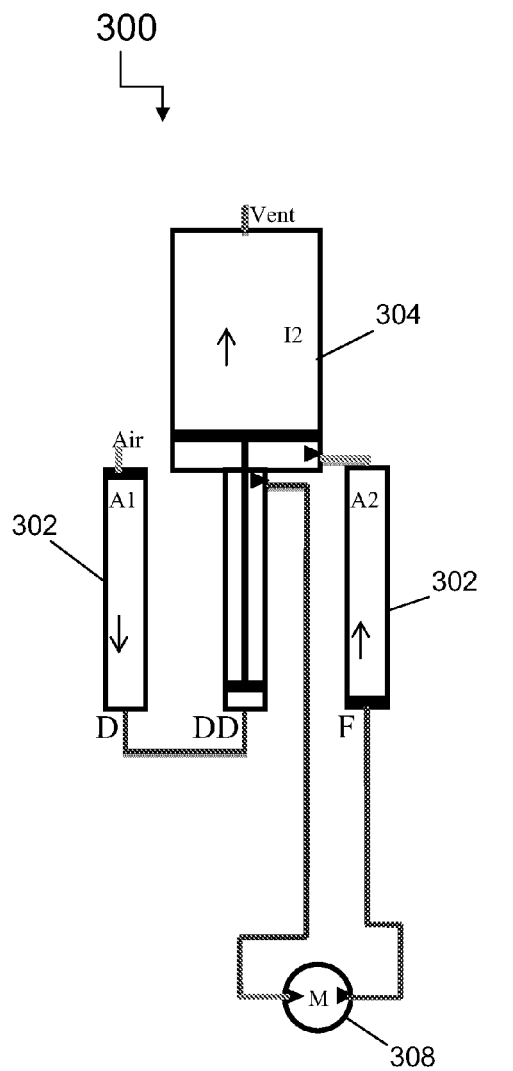
Figure 3B:
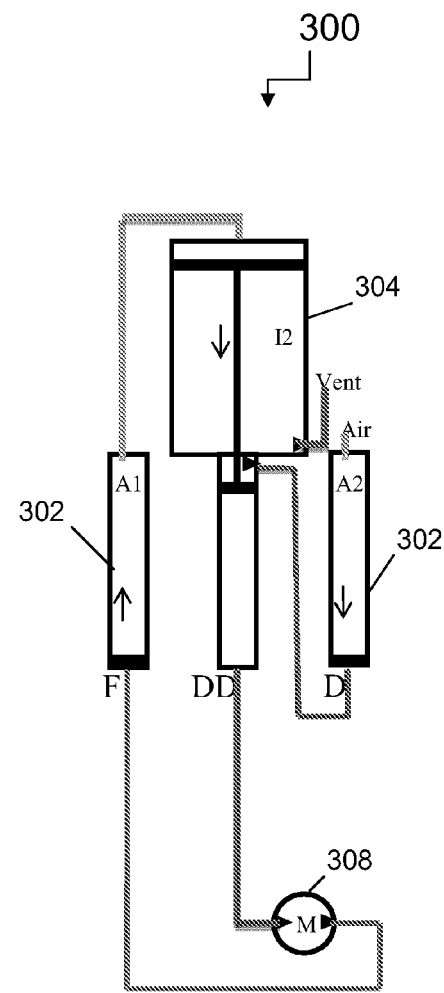
Figure 4:
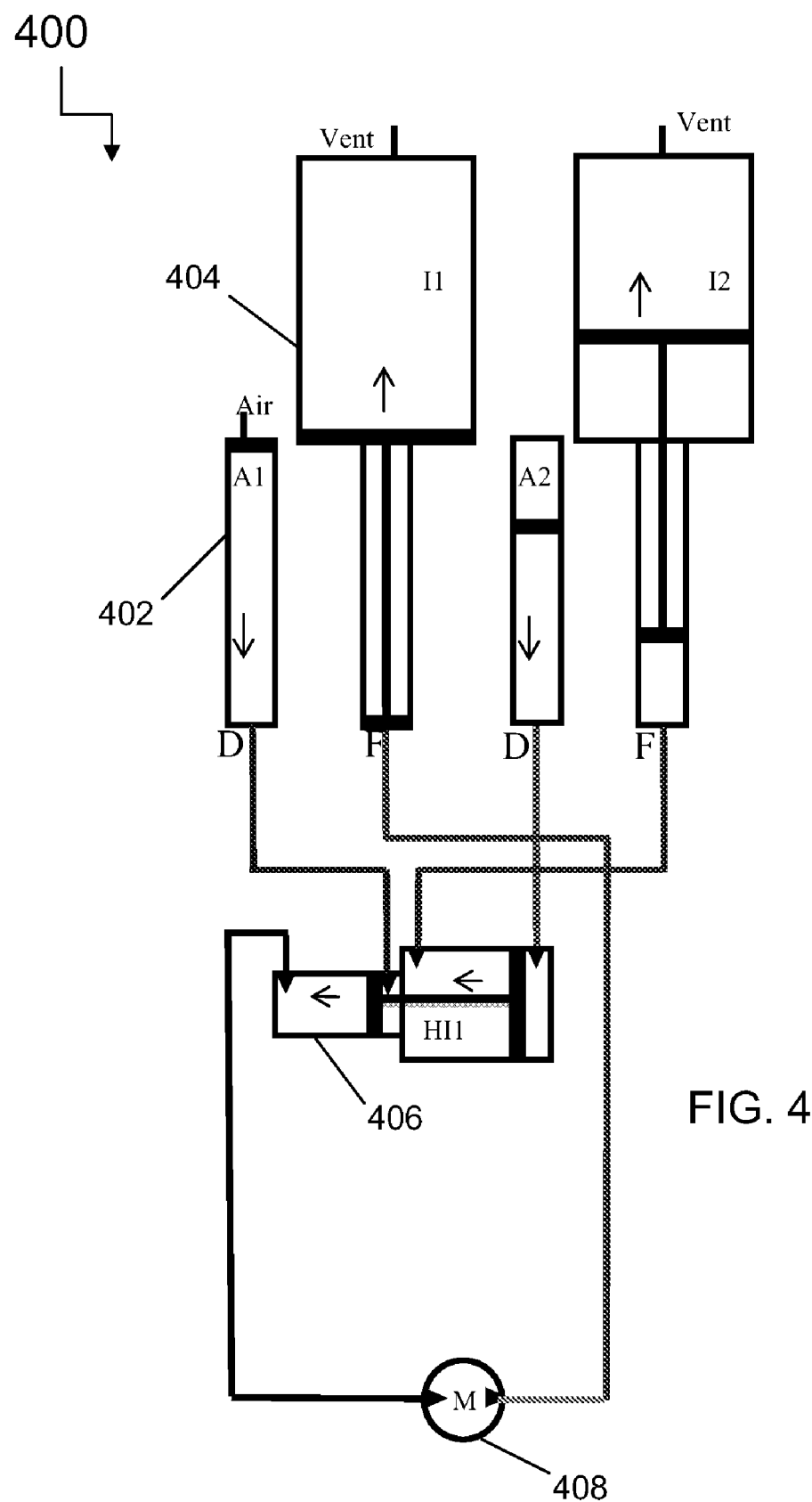
Figure 7:
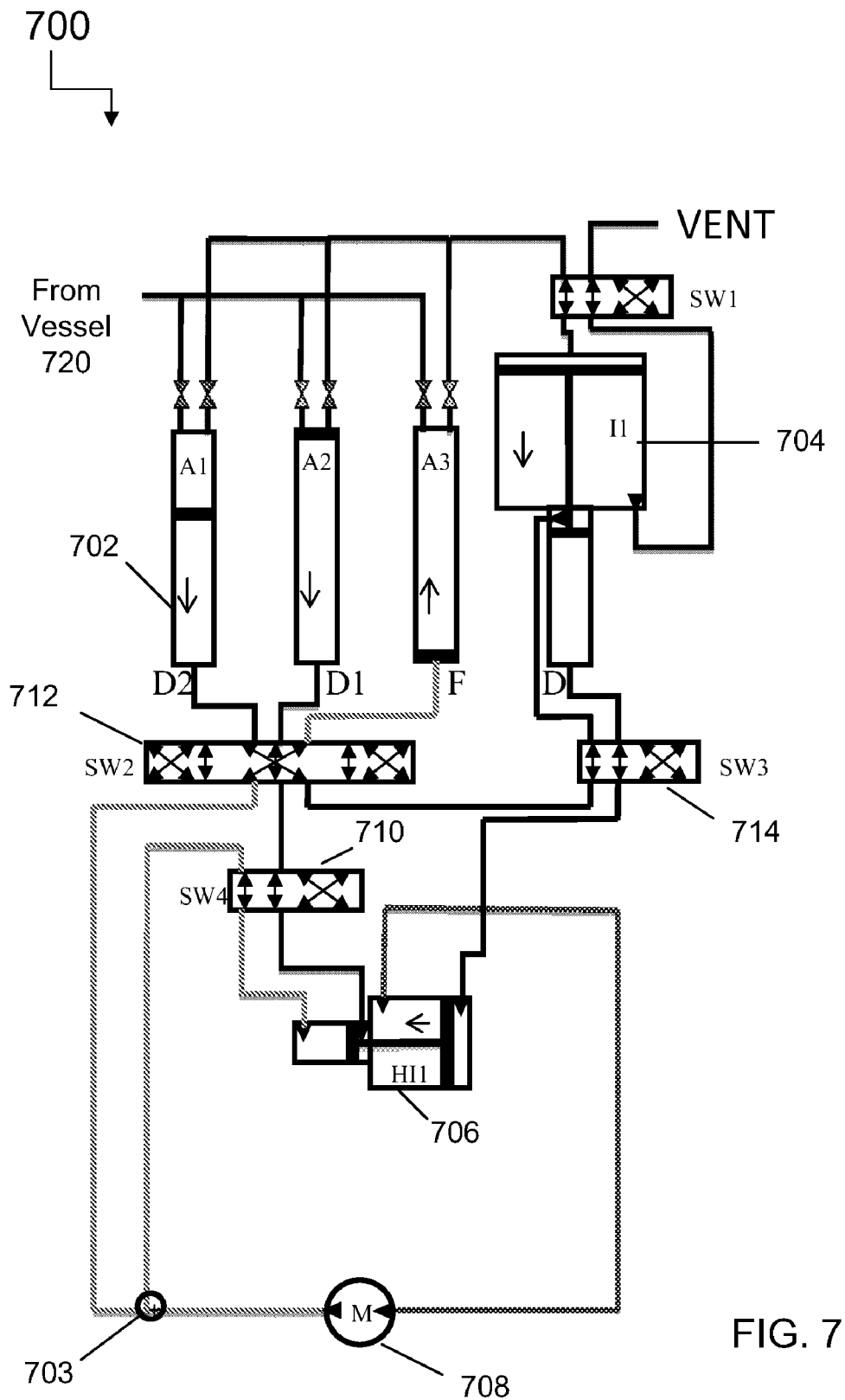
Figure 8:
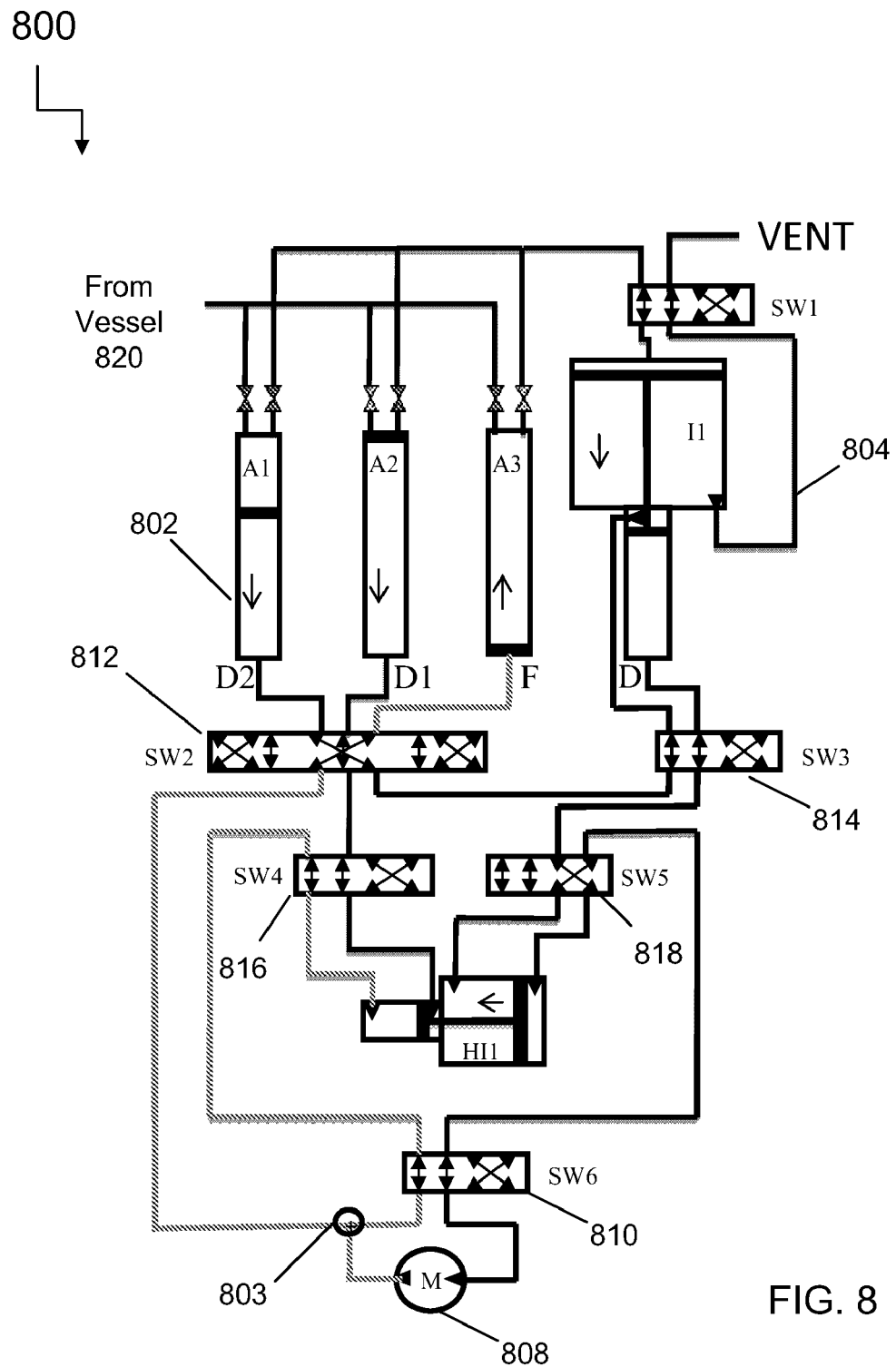
Figures 12A, 12B:
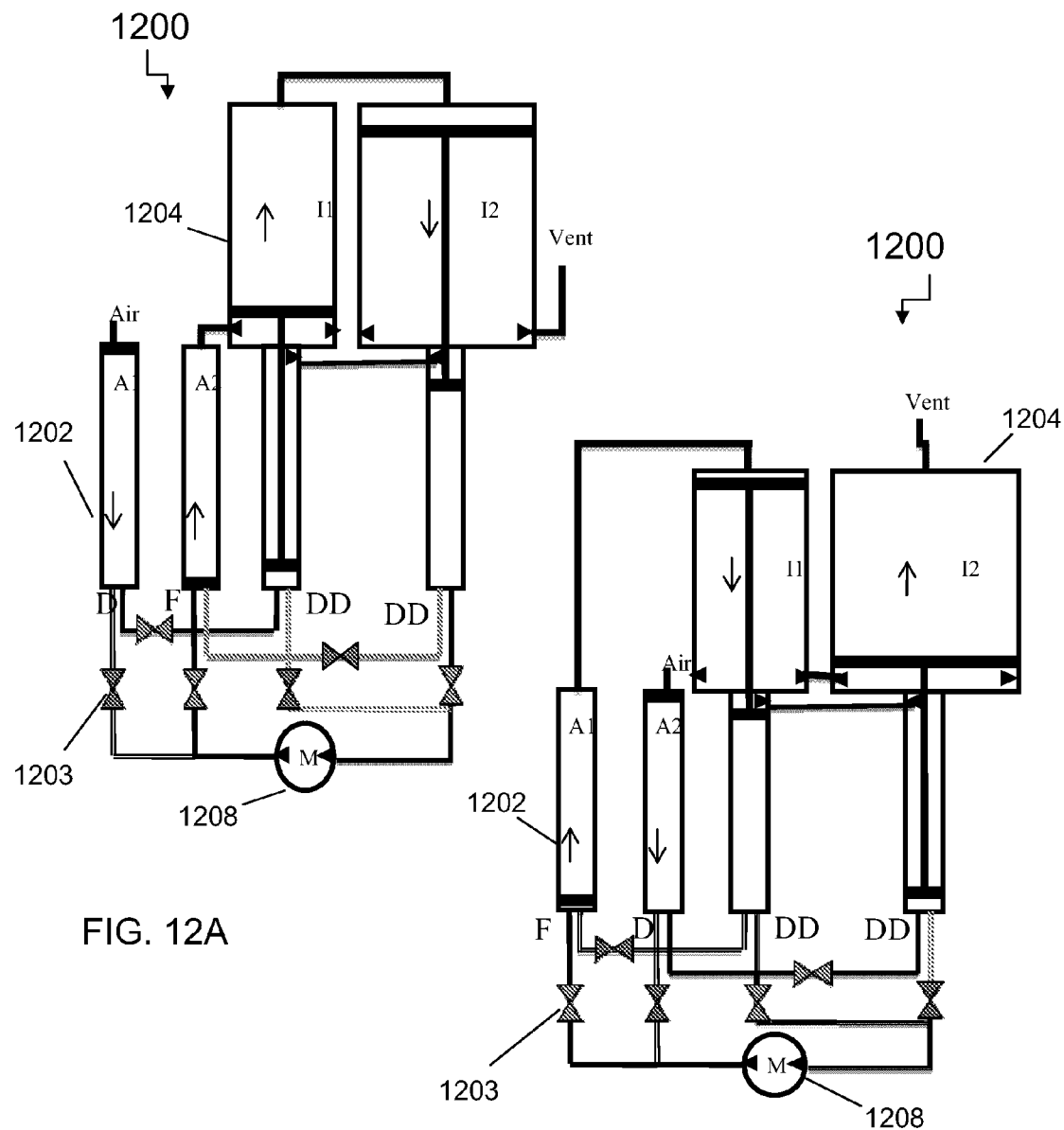
Figure 13:
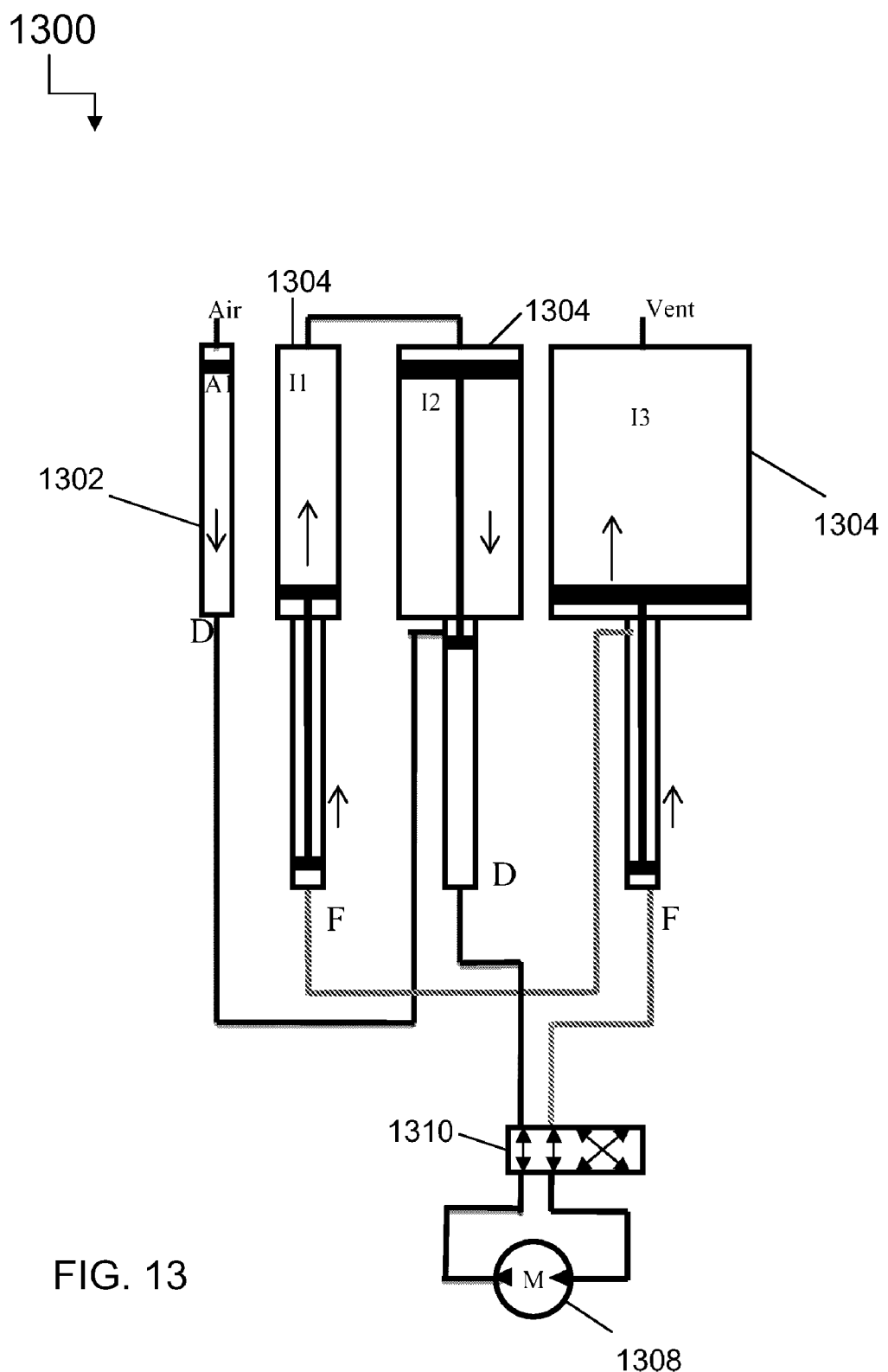
Figure 19:
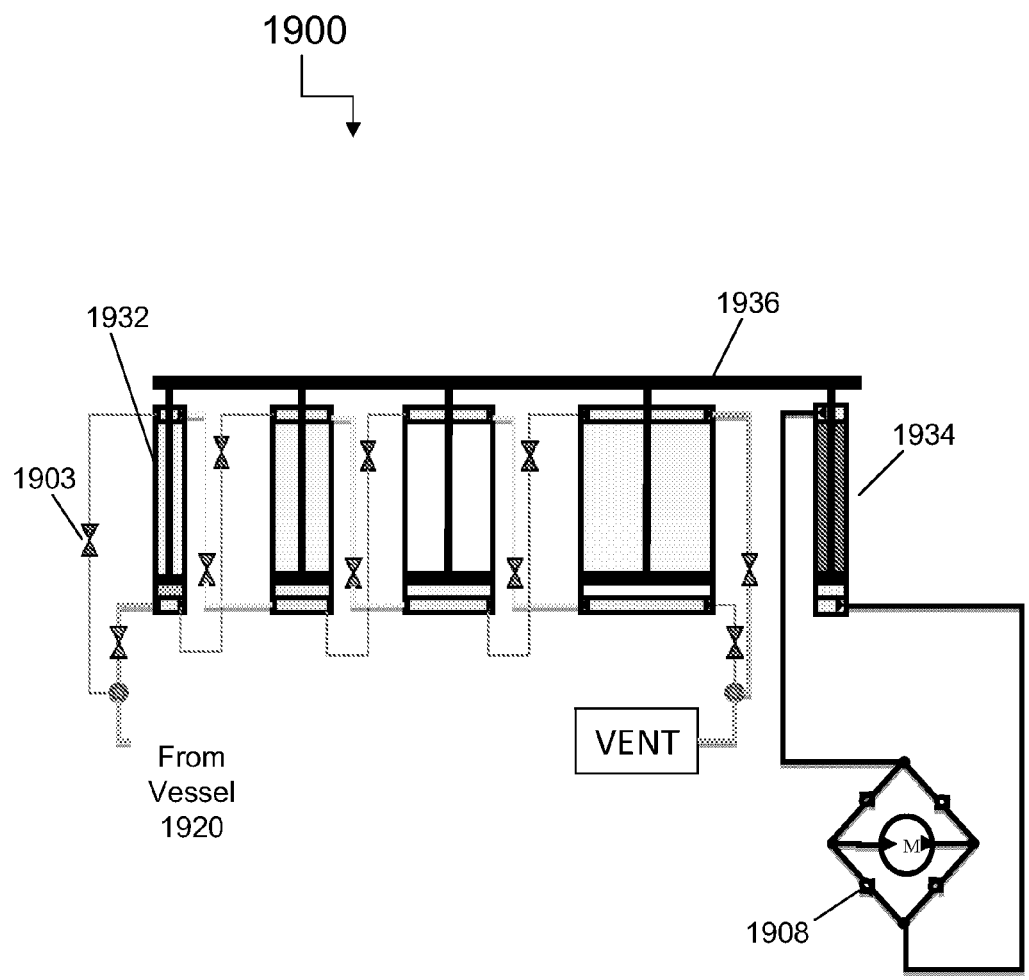
Figure 20:
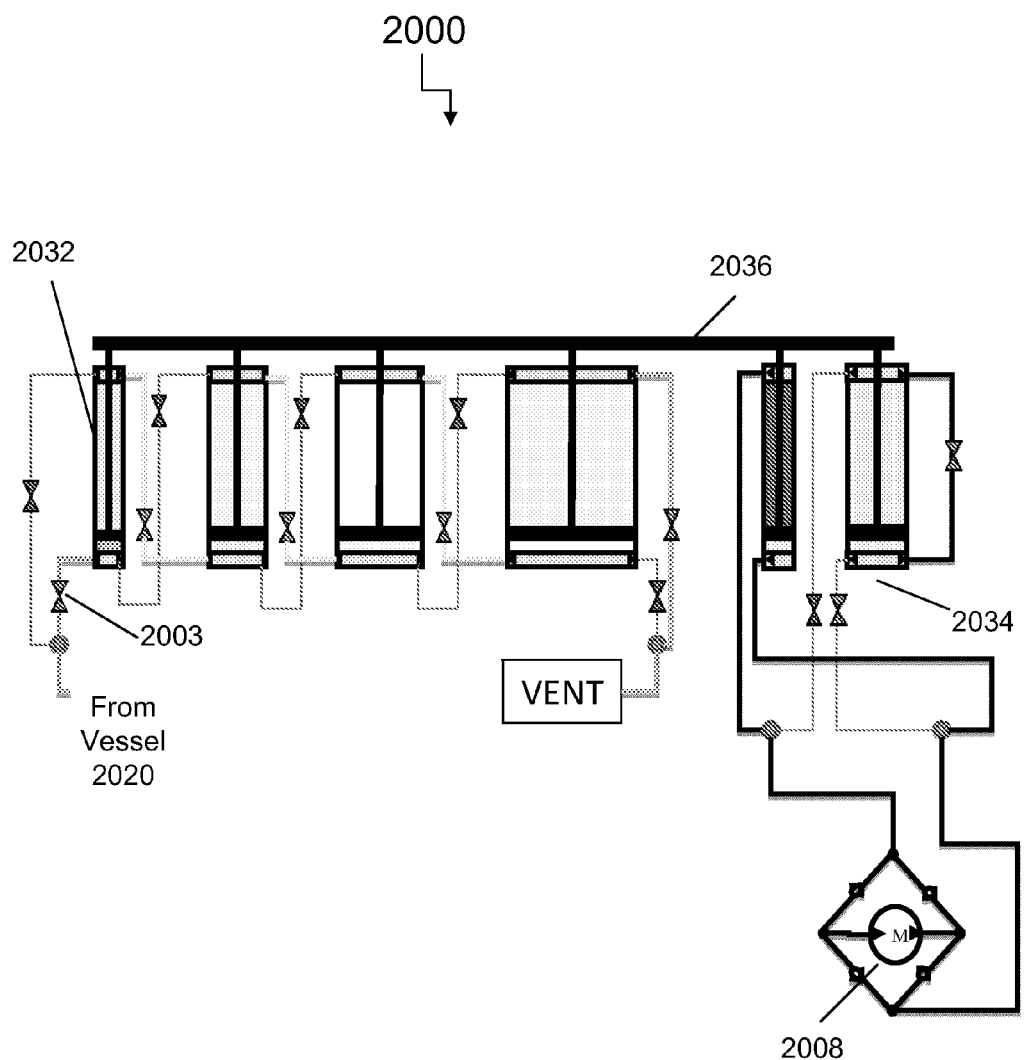
Figure 21:
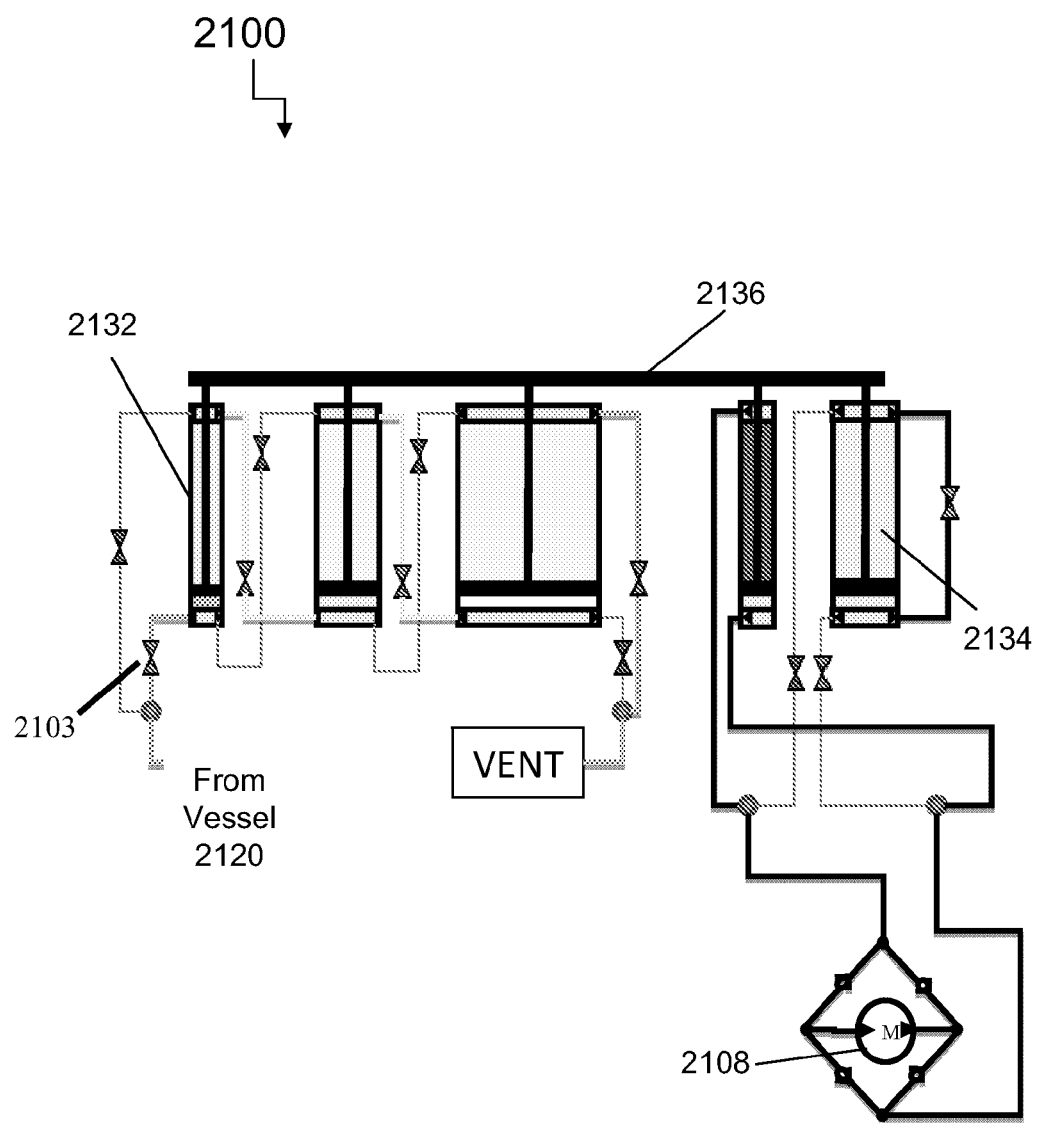
Figure 22A:
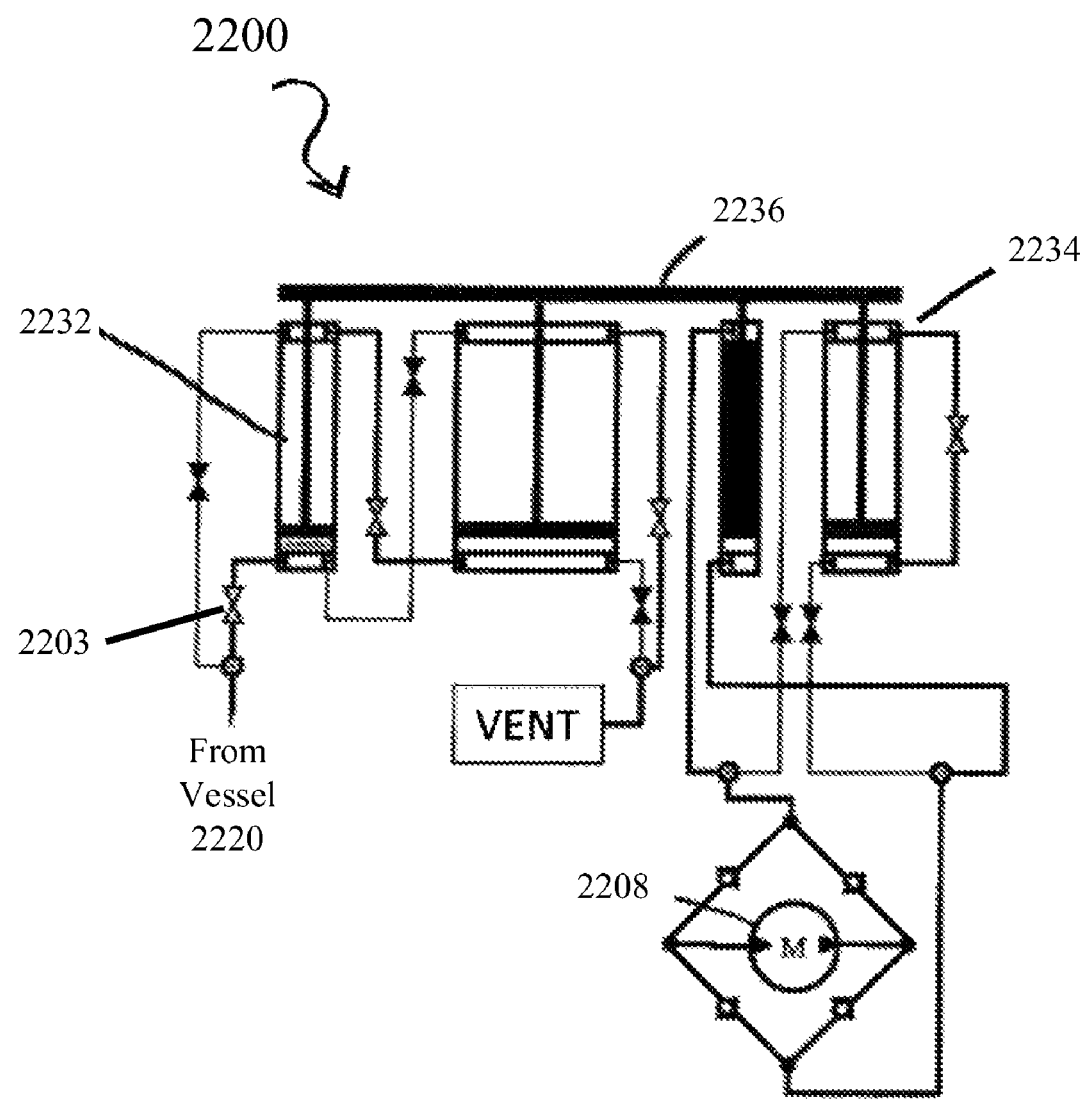
Figure 22B:
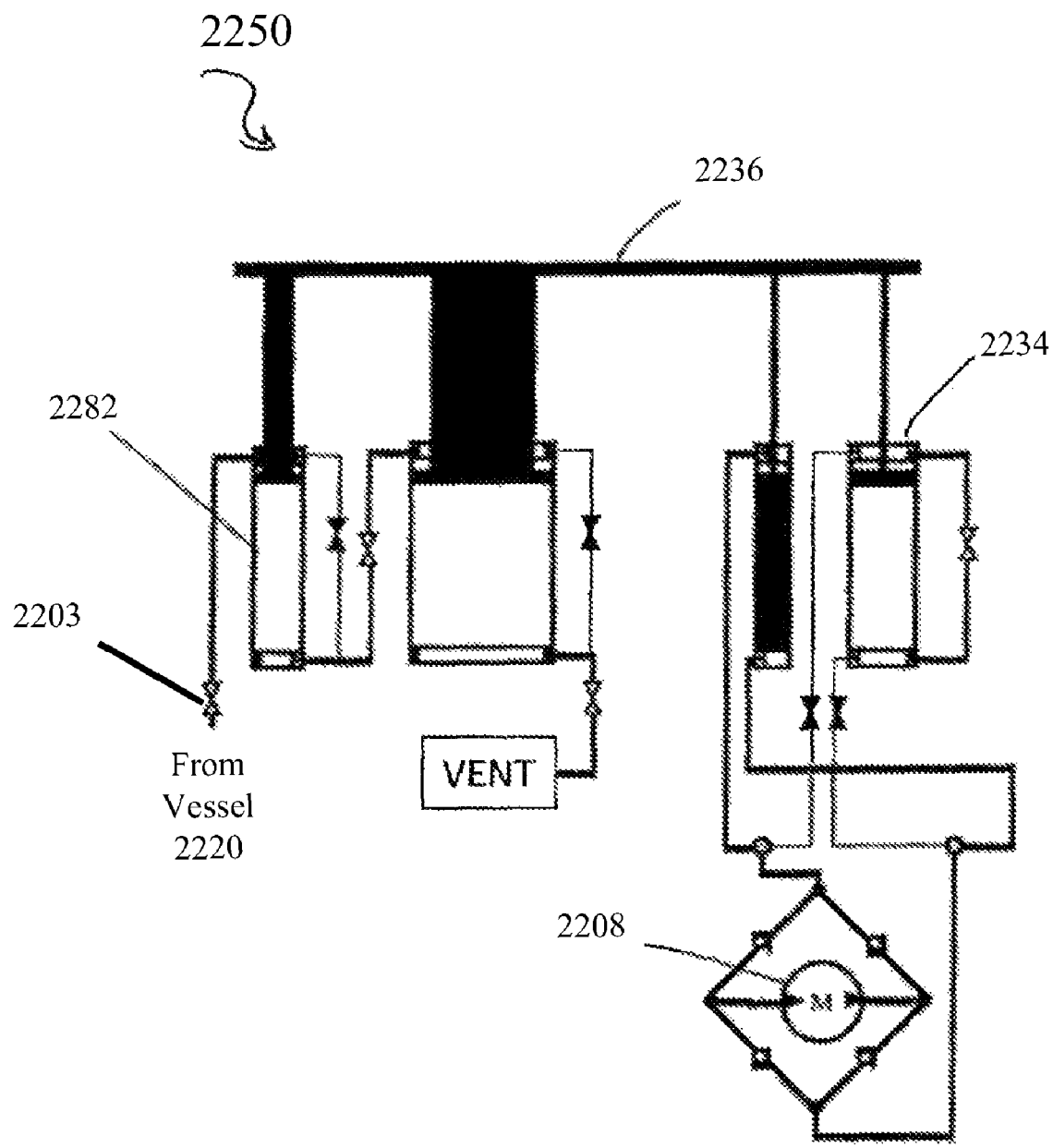

| Drivetrain Option | Number of hyd. switchovers per single expansion | Number of air switchovers per single expansion | Number of Cylinders Driving all the time | Number of Air Cylinders | Number of Hydraulic Cylinders | Number of Accumulators | Number of Intensifiers | Number of Boosters | Hydraulic Motor Pmax (psia) | Hydraulic Motor Pmin (psia) | Ratio |
|---|---|---|---|---|---|---|---|---|---|---|---|
| FIG. 2 | 1 | 1 | 1 | 0 | 0 | 1 | 1 | 0 | 3000 | 81 | 37.0 |
| FIG. 3 | 1 | 1 | 2 | 0 | 0 | 2 | 1* | 0 | 5950 | 325 | 18.3 |
| FIG. 4 | 3 | 1 | 2 | 0 | 0 | 2 | 2 | 1 | 4570 | 863 | 5.3 |
| FIG. 4 | 3 | 1 | 2 | 0 | 0 | 2 | 2 | 1 | 6000 | 970 | 6.2 |
| FIG. 4 | 3 | 1 | 2 | 0 | 0 | 2 | 2 | 1*** | 6000 | 970 | 6.2 |
| FIG. 7 | 2 | 1 | 3 | 0 | 0 | 3 | 1* | 1 | 4258 | 589 | 7.2 |
| FIG. 8 | 5 | 1 | 3 | 0 | 0 | 3 | 1* | 1 | 5935 | 1656 | 3.6 |
| FIG. 8 | 5 | 1 | 3 | 0 | 0 | 3 | 1* | 1 | 3000 | 1000 | 3.0 |
| FIG. 8 | 5 | 1 | 3 | 0 | 0 | 3 | 1** | 0 | 5935 | 1656 | 3.6 |
| FIG. 8 | 5 | 1 | 3 | 0 | 0 | 4 | 1** | 0 | 5935 | 1656 | 3.6 |
| FIG. 12 | 2 | 2 | 2 | 0 | 0 | 2 | 2* | 0 | 7250 | 1100 | 6.6 |
| FIG. 13 | 3 | 3 | 2 | 0 | 0 | 1 | 3 | 0 | 5945 | 1065 | 5.6 |
| FIG. 13 | 3 | 3 | 2 | 0 | 0 | 1 | 3 | 0 | 5945 | 1065 | 5.6 |
| FIG. 14 | 3 | 3 | 4 | 0 | 0 | 2 | 3* | 0 | 6440 | 1520 | 4.2 |
| FIG. 19 | 3 | 3 | 4 | 4**** | 1**** | 0 | 0 | 0 | 5050 | 1240 | 4.1 |
| FIG. 20 | 7 | 3 | 4 | 4**** | 2**** | 0 | 0 | 0 | 5000 | 2270 | 2.2 |
| FIG. 21 | 5 | 2 | 3 | 3**** | 2**** | 0 | 0 | 0 | 4970 | 1780 | 2.8 |
| FIG. 22A | 3 | 1 | 2 | 2**** | 2**** | 0 | 0 | 0 | 5000 | 1160 | 4.3 |
| FIG. 22B | 3 | 3 | 2 | 2**** | 2**** | 0 | 0 | 0 | 4424 | 1750 | 2.5 |

*Double-acting intensifiers
**Double-acting Double-ended intensifiers
***Double-ended Booster
****Double-acting cylinders Additional features, which will be discussed in greater detail with respect to a particular configuration, include: reducing the maximum hydraulic flow rate required by using additional air stages (e.g., multiple size intensifiers) and switching the air side more than once during each expansion from 3,000 psi to 15 psi; using additional hydraulic or mechanical add-ins with low air-pressure intensifiers or cylinders to prevent issues with low pressure air not being able to provide sufficient force; using an off-center spray rod for configurations using a horizontally oriented double-acting intensifier; using multiple motors and series-parallel switching with a higher maximum pressure to narrow the pressure range, e.g., 6,000 psi to 1,000 psi can be switched to 3,000 psi to 1,000 psi using series-parallel switching, but 3,000 psi to 500 psi cannot be switched to 3,000 psi to 1,000 psi using series-parallel switching.

FIG. 2 depicts a system/arrangement 200 using one accumulator 202 and one intensifier 204 and driving one cylinder of the accumulator 202 and the intensifier 204 at a time to drive the hydraulic motor 208. The system uses high pressure air stored in vessel 220. The arrangement 200 allows for dividing the energy evenly between the two stages (accumulator and intensifier), sets a switching point of approximately 330 psi, and requires the intensification ratio to be about 16:1 to match hydraulic volumes of the accumulator 202 and the intensifier 204. In a particular embodiment, the system 200 could have a 250 psi switching point (assuming a 20 psi venting pressure) or a 210 psi switching point (assuming a 15 psi venting pressure). The hydraulic fluid pressure profile would vary between approximately 3,000 psi and 80 psi, or a 37:1 change. The operating characteristics of this arrangement (20 psi venting pressure, isothermal expansion, and equal hydraulic fluid volumes between the accumulator 202 and the intensifier 204) are shown in Table 2 and represent one valve change per expansion from 3,000 psi to atmospheric pressure. In addition, the system 200 includes a series of valve arrangements 203 for controlling the operation of the system 200, as described, for example, in the '057 application incorporated herein.

FIGS. 3A and 3B depict a system/arrangement 300 using two accumulators 302 and one double-acting intensifier 304 and driving two cylinders of the accumulators 302 and the intensifier 304 at a time to drive the hydraulic motor 308. This arrangement includes an add-in to the intensifier 304 that would "pull" the hydraulic side of the intensifier 304, thus decreasing the likelihood of a piston stopping at low venting pressures. The arrangement 300 allows for dividing the energy evenly between two stages (accumulator and intensifier) and sets a switching point of approximately 330 psi and requires the intensification ratio to be about 16:1 to match hydraulic volumes of the accumulators 302 and the intensifier 304. In a particular embodiment, the system 300 could have a 260 psi switching point (assuming a 20 psi venting pressure) or 210 psi switching point (assuming a 15 psi venting pressure). The hydraulic fluid pressure profile would vary between about 6,000 psi and 330 psi, or an 18:1 change. The operating characteristics of this arrangement (20 psi venting pressure, isothermal expansion, and equal hydraulic fluid volumes between the accumulators 302 and the intensifier 304) are shown in Table 3 and represent one set of valve changes per expansion from 3,000 psi to atmospheric pressure. Typically, the system 300 will include at least one valve arrangement (not shown, but similar to those described herein) for controlling the operation of the system 300.

TABLE 2

Pressure and Volumes for One Accumulator, One Intensifier Arrangement.

| 1 Accumulator, 1 Intensifier Scheme | | | | | IntRatio | 12.5 | AccRatio | 1 |
|---|---|---|---|---|---|---|---|---|
| Input Air | Hydraulic Fluid pressures in cylinders (psi) | | | | Hydraulic Fluid pressures at motor (psi) | | | |
| Pressure | Accumulator | | Intensifier | | Stage 1 | | Stage2 | |
| (psi) | Start | End | Start | End | Start | End | Start | End |
| 3000 | 3000.0 | | | | 3000.0 | | | |
| 250 | | 250.0 | 2956.0 | | | 250.0 | 2706.0 | |
| 20 | | | | 81.0 | | | | 81.0 |
| VOLUMES | | | | | Max P | Min P | Max P | Min P |
| Initial Volume | | | | | 3000.0 | 250.0 | 2706.0 | 81.0 |
| 4 Liters (at max pressure) | | | | | | | | |
| Final Volume = air side of intensifier | | | | | | | | |
| 600 Liters | | | | | OVERALL | | | |
| | | | | | | Max | | Minimum |
| Volume of Accumulator | | | | | Min P | Max P | Ratio | Displacement |
| 48 Liters | | | | | 81.0 | 3000.0 | 37.1 | 3% |
| Intensifier fluid volume | | | | | | | | |
| 48 Liters | | | | | | | | |
| Intensifier ratio | | | | | | | | |
| 12.5 | | | | | | | | |

TABLE 3

Pressures and Volumes for Two Accumulators, One Double-Acting Intensifier Arrangement (with Add-In to Intensifier).

| 2 Accumulators, 1 double acting Intensifier Scheme with add-in but no booster | | | | Int. Ratio | 13 | Acc. Ratio | 1 | |
|---|---|---|---|---|---|---|---|---|
| Input Air | Hydraulic Fluid pressures in cylinders (psi) | | | Hydraulic Fluid pressures at motor (psi) | | | | |
| Pressure | Accumulator | | Intensifier | | Stage 1 | | Stage2 | |
| (psi) | Start | End | Start | End | Start | End | Start | End |
| 3000 | 3000.0 | | | | 3000.0 | | 3000.0 | |
| 260 | | 260.0 | 3203.6 | | 3203.6 | 260.0 | 3203.6 | 260.0 |
| 20 | | | | 83.6 | | 83.6 | | 83.6 |
| VOLUMES | | | | | Max P | Min P | Max P | Min P |
| Initial Volume | | | | | 5943.6 | 323.6 | 5943.6 | 323.6 |
| 4 Liters (at max pressure) | | | | | | | | |
| Final Volume = air side of intensifier | | | | | | | | |
| 600 Liters | | | | | OVERALL | | | |
| | | | | | | | Max | Minimum |
| Volume of Accumulator | | | | | Min P | Max P | Ratio | Displacement |
| 46.15 Liters | | | | | 323.6 | 5943.6 | 18.4 | 5% |
| Intensifier fluid volume | | | | | | | | |
| 46.15 Liters | | | | | | | | |
| Intensifier ratio | | | | | | | | |
| 13 | | | | | | | | |

FIG. 4 depicts a system/arrangement 400 using two accumulators 402 and two intensifiers 404. Two cylinders of the accumulators 402 and the intensifiers 404 are always driving and two are always filling in this arrangement. A hydraulic-hydraulic booster 406 is used to boost the pressure part-way through each accumulator and intensifier expansion, decreasing the pressure profile to a hydraulic motor 408. The arrangement 400 also allows for the addition of forces from the accumulators 402 and the intensifiers 404 in the hydraulic-hydraulic booster 406, sending greater pressure to the hydraulic motor 408 and allowing gas to expand to a lower pressure in the intensifiers 404. The arrangement 400 allows for dividing the energy evenly between two stages (accumulator and intensifier) and sets a switching point of approximately 330 psi and requires the intensification ratio to be about 16:1 to match the hydraulic volumes of the accumulators 402 and the intensifiers 404. In a particular embodiment, the system 400 could have a 250 psi switching point (assuming 20 psi venting pressure) or a 210 psi switching point (assuming a 15 psi venting pressure). The hydraulic fluid pressure profile would vary between approximately 4600 psi and 860 psi, or a 5.3:1.0 change. Other pressure profiles with alternate maximum to minimum pressure ratios can be accomplished by modifying switching pressures, especially by changing the pressure at which the booster 406 switches (e.g., the ¼ pressure (750 psi in the system 400)). In one embodiment, when switching pressures of 850 psi and 320 psi are utilized, the pressure profile is approximately 6,000 psi to 970 psi, or a 6.2:1.0 change. The operating characteristics of this arrangement (20 psi venting pressure, isothermal expansion, equal hydraulic fluid volumes between the volumes of the accumulators 402, the intensifiers 404, and the sum of two sides of the hydraulic booster 406) are shown in Table 4 and represent four hydraulic valve changes per expansion from 3000 psi to atmospheric pressure. System 400 will also typically include at least one valve arrangement for controlling the operation of the system.

TABLE 4

Pressures and Volumes for Two Accumulators, Two Intensifies Arrangement (with Booster).

| 2 Accumulator, 2 Intensifier Scheme with Booster | | | | | Int. Ratio | 12.25 | Booster Ratio 1 | 2.06 | Booster Ratio 2 | 1 | | |
|---|---|---|---|---|---|---|---|---|---|---|---|---|
| Input Air | Hydraulic Fluid pressures in cylinders (psi) | | | | Hydraulic Fluid pressures at motor (psi) | | | | | | | |
| Pressure | Accumulator | | Intensifier | | Stage 1 | | Stage2 | | Stage3 | | Stage 4 | |
| (psi) | Start | End | Start | End | Start | End | Start | End | Start | End | Start | End |
| 3000 | 3000.0 | | | | 2985.3 | | 2985.3 | | | | | |
| 750 | 1530.3 | 750.0 | | | | 735.3 | 1515.6 | 735.3 | 1515.6 | | | |
| 245 | | 489.4 | 2835.875 | | | | | 474.7 | 2590.9 | | 2590.9 | |
| 80 | | | 1663.525 | 814.625 | 1583.5 | | | | | 734.6 | 1583.5 | 734.6 |
| 20 | | | | 148.525 | | 128.5 | | | | | | 128.5 |
| VOLUMES | | | | | Max P | Min P | Max P | Min P | Max P | Min P | Max P | Min P |
| Initial Volume | | | | | 4568.8 | 863.8 | 4500.9 | 1210.0 | 4106.5 | 1224.0 | 4174.4 | 863.2 |
| 4 Liters (at max pressure) | | | | | 310.8 | 58.8 | 306.2 | 82.3 | 279.4 | 83.3 | 284.0 | 58.7 |

TABLE 4-continued

Pressures and Volumes for Two Accumulators, Two Intensifies Arrangement (with Booster).

| 2 Accumulator, 2 Intensifier Scheme with Booster | | | | Int. Ratio | 12.25 | Booster Ratio 1 | 2.06 | Booster Ratio 2 | 1 | | |
|---|---|---|---|---|---|---|---|---|---|---|---|
| Input Air | Hydraulic Fluid pressures in cylinders (psi) | | | | | Hydraulic Fluid pressures at motor (psi) | | | | | |
| Pressure | Accumulator | | Intensifier | | Stage 1 | | Stage2 | | Stage3 | | Stage 4 |
| (psi) | Start | End | Start | End | Start | End | Start | End | Start | End | Start | End |

Final Volume = air side of intensifier
600 Liters

Volume of Accumulator
48.98 Liters
Intensifier fluid volume
48.98 Liters
Intensifier ratio
12.25
Booster Small Side Volume
16 Liters
Booster Large Side Volume
32.98 Liters
Booster Ratio
2.06

| | OVERALL | | Max Ratio | Minimum Displacement |
|---|---|---|---|---|
| | Min P | Max P | | |
| | 863.2 | 4568.8 | 5.29 | 18.9% |

Figure 5A:
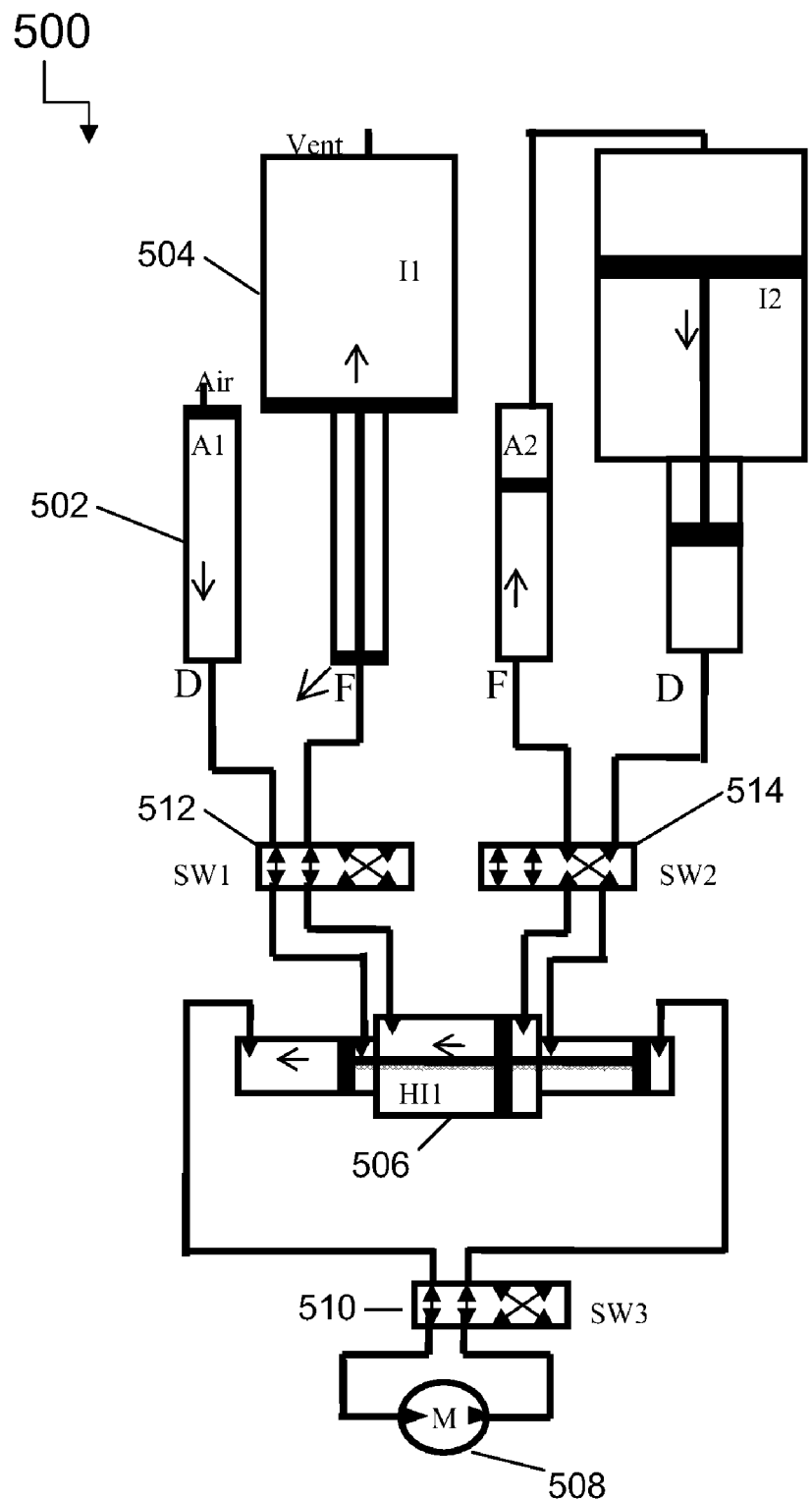
Figure 5B:
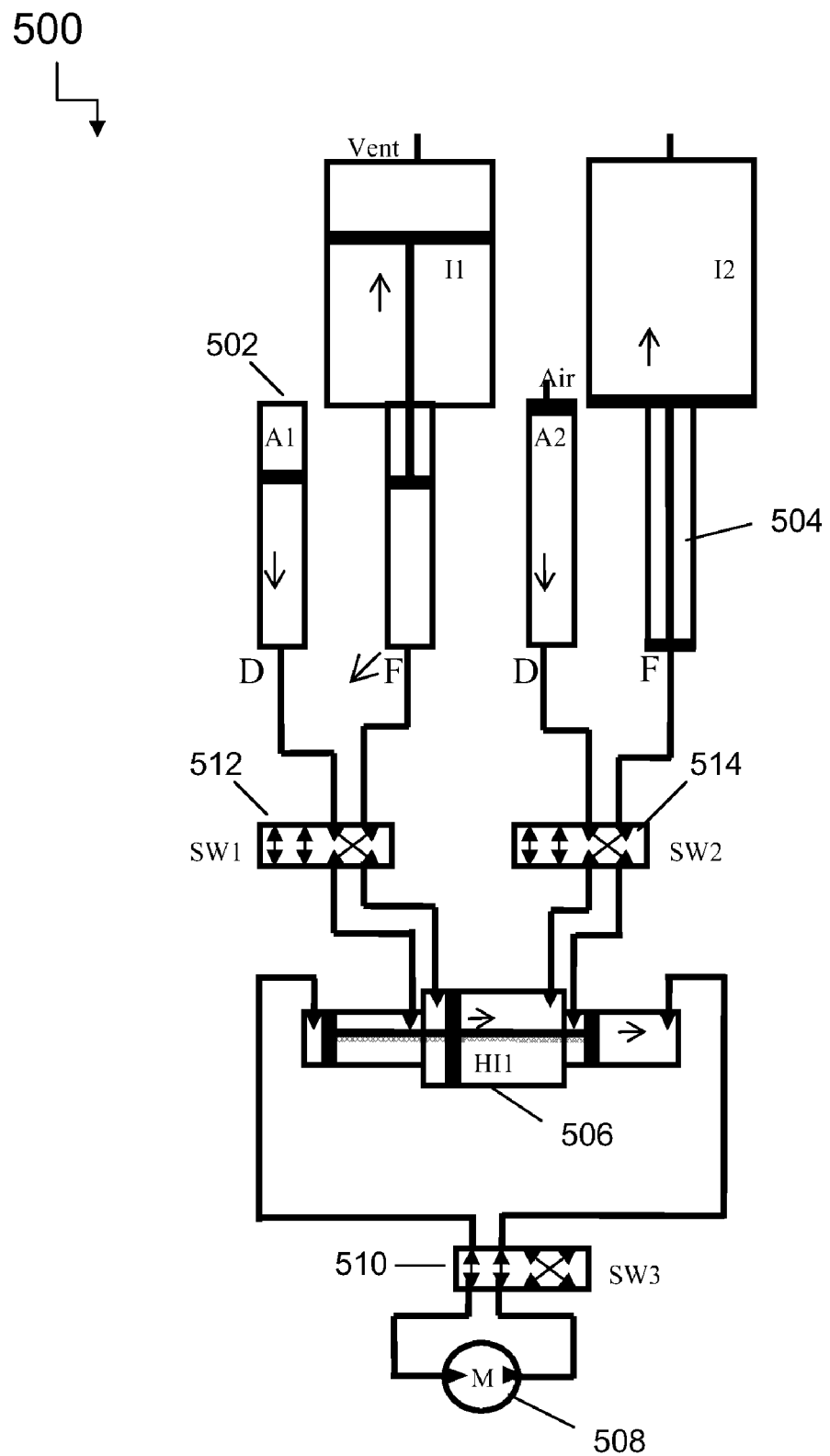
Figure 6:
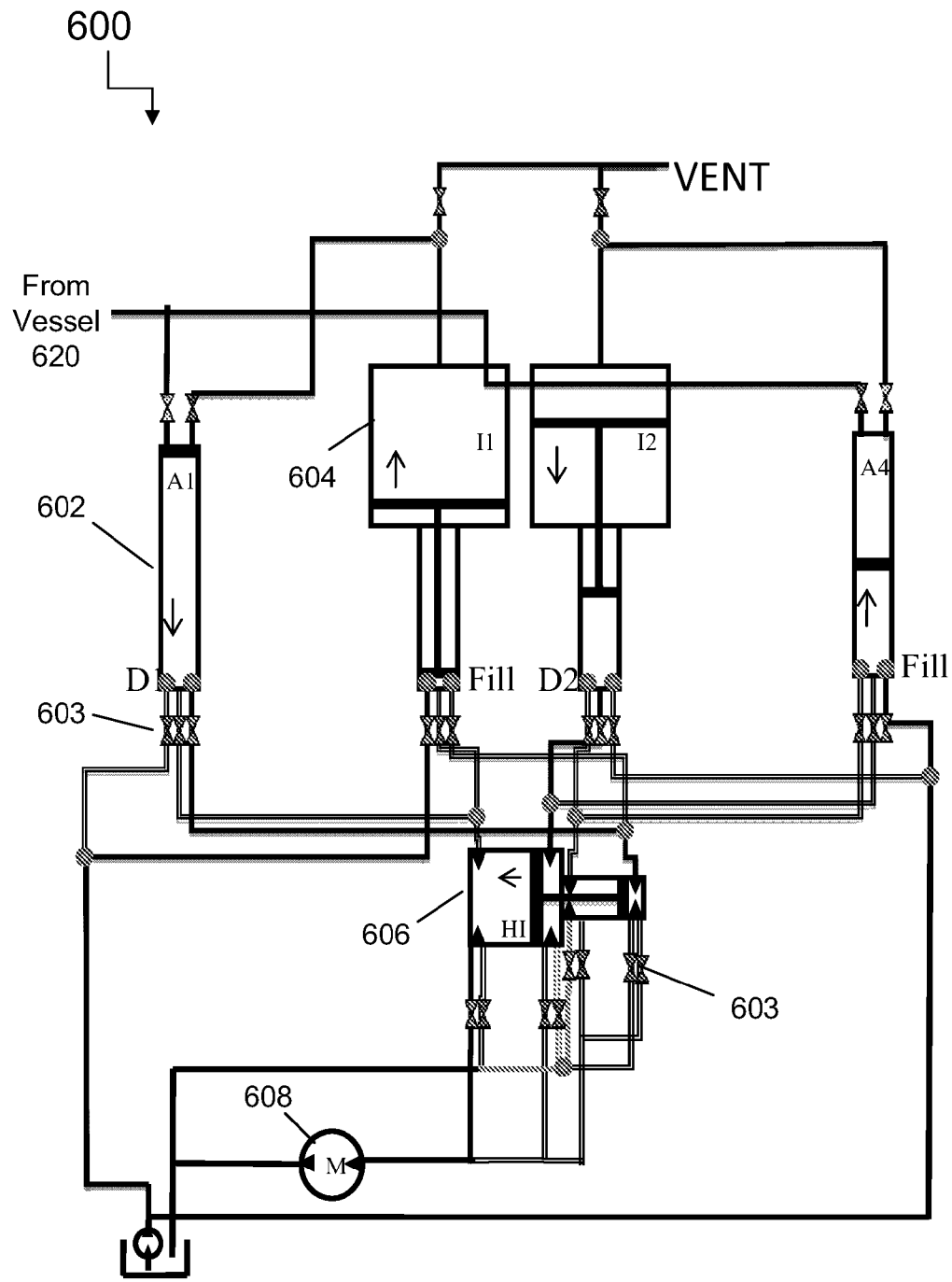

FIGS. 5A and 5B depict a system/arrangement 500 using two accumulators 502 and two intensifiers 504, with two cylinders of the accumulators 502 and the intensifiers 504 driving a hydraulic-hydraulic booster 506 at any given time. The accumulators 502, intensifiers 504, and hydraulic-hydraulic booster 506 are connected to a hydraulic motor 508 via directional control valves 510, 512, 514 that control the operation of the system (e.g., switching points). The arrangement 500 also utilizes a modified valve scheme (the additional directional valves 512, 514). The various directional valves can be simple shut-off valves or more complex multi-position and multi-directional valves that may be manually, electrically, or pneumatically operated to control the flow of fluid and/or air between the various components, as would be known to a person of ordinary skill and as described, for example, in the '057 and '703 applications incorporated herein. By pairing cylinders and changing the flow rates, the number of valves can be reduced on the hydraulic side. A similar system/arrangement 600 with an open hydraulic system and full valving is depicted in FIG. 6, where the system 600 includes two accumulators 602, two intensifiers 604, a hydraulic-hydraulic booster 606, and a hydraulic motor 608, all interconnected by a series of valves 603. In addition, the various systems described herein will typically be coupled to a compressed gas storage system, such as, for example, one or more pressure vessels indicated as 620, 720, 820, etc.

FIG. 7 depicts a system/arrangement 700 using three accumulators 702 and one double-acting intensifier 704 with a hydraulic-hydraulic booster 706. Three cylinders of the accumulators 702 and the intensifier 704 are always driving and one filling in this arrangement. The hydraulic-hydraulic booster 706 is used to boost the pressure part-way through each accumulator and intensifier expansion, decreasing the pressure profile to a hydraulic motor 708. The accumulators 702 and intensifiers 704 are coupled to the hydraulic-hydraulic booster 706 via a series of directional control valves 710, 712, 714 that control the operation of the system 700, which in turn is connected to a hydraulic motor 708, in this case via a three-way valve 703. The system 700 also allows for the addition of the forces from the accumulators 702 and the intensifier 704 in the hydraulic-hydraulic booster 706, sending greater pressure to the hydraulic motor 708, and allowing gas to expand to a lower pressure in the intensifier 704. The arrangement 700 allows for dividing the energy evenly between three stages (accumulator stage 1, accumulator stage 2, and intensifier). In a particular embodiment, the system 700 could have switching points of approximately 700 psi and 160 psi (controlled by the operation of the various directional control valves 710, 712, 714). While these switching points are acceptable for driving from a piston with a larger area within the booster 708, in another embodiment, the top pressure can be raised by utilizing switching points such as approximately 1100 psi and 260 psi (assuming a 20 psi venting pressure). The hydraulic fluid pressure profile would vary between approximately 4300 psi and 600 psi, or a 7.2:1.0 change. The operating characteristics of this arrangement (20 psi venting pressure, isothermal expansion, equal hydraulic fluid volumes between volumes of the accumulators 702 in the second stage of expansion and the intensifier 704, equal hydraulic fluid volumes between the sum of volumes of the first stage of the accumulators 702 and the intensifier 704 and the sum of volumes of two sides of the booster 706, and, for the double-acting intensifier 704 and the hydraulic-hydraulic booster 706, assumed negligible cross-sectional area of a connecting rod when compared with a cross-sectional area of the respective cylinders) are shown in Table 5 and represent three hydraulic valve changes per expansion from 3000 psi to atmospheric pressure. Again, other pressure profiles with alternate maximum to minimum pressure ratios can be achieved by modifying the switching pressures.

TABLE 5

Pressures and Volumes for Three Accumulators, One Intensifier Arrangement (with Booster).

| 3 Accumulator, 1 Double Acting Intensifier Scheme with Booster and Pressure added into Intensifer | | | | | Int. Ratio | 13 | Booster Ratio 1 | 4.2 | |
|---|---|---|---|---|---|---|---|---|---|
| Input Air | Hydraulic Fluid pressures in cylinders (psi) | | | | Hydraulic Fluid pressures at motor (psi) | | | | |
| Pressure | Accumulator | | Intensifier | | Stage 1 | | | | |
| (psi) | Start | End | Start | End | | Start | End | | |
| 3000 | 3000.0 | | | | | 720.3 | | | |
| 1100 | 1100.0 | 1100.0 | | | | 1100.0 | 271.2 | | |
| 260 | | 260.0 | 3203.6 | | | 2943.6 | 260.0 | | |
| 20 | | | | 83.6 | | | 83.6 | | |
| | | | | | Sum in Intensifier | 4043.6 | 343.6 | | |
| VOLUMES | | | | | Intensifier in Booster | 3798.3 | 338.3 | | |
| Input Air Volume at 3000 psi | | | 4.0 Liter | | | | | | |
| Intensifier Air Side | | | 600.0 Liters | | | | | | |
| Intensifier Hydraulic Side | | | 46.2 Liters | | | Max P | Min P | | |
| Accumulator Bottom Half Hyd | | | 46.2 Liters | | | 4258.6 | 589.5 | | |
| Accumulator Stage 1a Hyd | | | 10.9 Liters | | | 289.7 | 40.1 | | |
| Intensifier Ratio | | | 13.0 | | | | | | |
| | | | | | OVERALL | | | Max Ratio | Minimum Displacement |
| Booster Large Side Volume | | | 46.2 Liters | | | Min P | Max P | | |
| Booster Small Side Volume | | | 10.9 Liters | | | 589.5 | 4258.6 | 7.2 | 14% |
| Booster Ratio | | | 4.2 | | | | | | |

FIG. 8 depicts a system/arrangement 800 similar to the system 700 depicted in FIG. 7, except in the valve arrangement (812, 814, 816, 818) and the switching. The accumulators 802 and intensifiers 804 are coupled to the hydraulic-hydraulic booster 706 via a series of directional control valves 812, 814, 816, 818 that control the operation of the system 800, which in turn is connected to a hydraulic motor 808, via a four-way 2 position directional valve 810 and a three-way valve 803. In this arrangement 800, a chamber in a booster 806 that is driving a hydraulic motor 808 is changed in the middle of each cycle. This effectively halves the pressure profile over which expansion occurs, but increases the number of valve changes per expansion to five from two. This arrangement 800 allows for dividing the energy evenly between three stages (accumulator stage 1, accumulator stage 2, and intensifier). In a particular embodiment, the system 800 could have switching points of approximately 700 psi and 160 psi. In another embodiment, the system 800 could have switching points of approximately 830 psi and 240 psi (assuming a 20 psi venting pressure). The hydraulic fluid pressure profile would vary between approximately 5,950 psi and 1,650 psi, or a 3.6:1.0 change. The operating characteristics of this arrangement (20 psi venting pressure, isothermal expansion, equal hydraulic fluid volumes between volumes of the accumulators 802 in the second stage of expansion and the intensifier 804, equal hydraulic fluid volumes between the sum of volumes of the first stage of the accumulators 802 and the intensifier 804 and the sum of volumes of two sides of the booster 806, and, for the double-acting intensifier 804 and hydraulic-hydraulic booster 806, assumed negligible cross-sectional area of a connecting rod when compared with the cross-sectional area of the respective cylinders) are shown in Table 6 and represent five hydraulic valve changes per expansion from about 3,000 psi to atmospheric pressure.

TABLE 6

Pressures and Volumes for Three Accumulators, One Intensifier (with Booster and Switching During Each Cycle).

| 3 Accumulator, 1 Double Acting Intensifier Scheme with Booster and Pressure added into Intensifer | | | | | Int. Ratio | 12 | | | Booster Ratio 1 | 3.46 | | |
|---|---|---|---|---|---|---|---|---|---|---|---|---|
| Input Air | Hydraulic Fluid pressures in cylinders (psi) | | | | Hydraulic Fluid pressures at motor (psi) | | | | | | | |
| Pressure | Accumulator | | Intensifier | | Stage 1 | | | | Stage2 | | | |
| (psi) | Start | End | Start | End | Start | Mid1 | Mid2 | End | Start | Mid1 | Mid2 | |
| 3000 | 3000.0 | | | | 637.9 | | | | 637.9 | | | |
| 1546.1 | 1546.1 | 1546.1 | | | | 364.9 | 1546.1 | | | 364.9 | 1546.1 | |
| 830 | 830.0 | 830.0 | | | 830.0 | | | 830.0 | 830.0 | | | |
| 434.7 | 434.7 | 434.7 | | | | 434.7 | 434.7 | | | 434.7 | 434.7 | |
| 240 | | 240.0 | 2718.3 | | 2718.3 | | | 240.0 | 2718.3 | | | |
| 92.6 | | | 949.5 | 949.5 | | 949.5 | 949.5 | | | 949.5 | 949.5 | |
| 20 | | | | 78.3 | | | | 78.3 | | | | |
| | | | | | Sum in Intensifier | 3548.3 | 1384.2 | 1384.2 | 318.3 | 3548.3 | 1384.2 | 1384.2 |
| When to switch percent wise 0.33 | | | | | Intensifier in Booster | | 4481.5 | 1046.3 | | | | 4481.5 |
| Note: Anywhere between 0.35 and | | | | | | Max P | Min P | Max P | Min P | Max P | Min P | Max P |

TABLE 6-continued

Pressures and Volumes for Three Accumulators, One Intensifier (with Booster and Switching During Each Cycle).

| | | | | | | | | |
|---|---|---|---|---|---|---|---|---|
| 0.2 give the same pressure range | | | 3946.2 | 1656.5 | 5935.0 | 1856.3 | 3946.2 | 1656.5 | 5935.0 |
| | | | 268.5 | 112.7 | 403.7 | 126.3 | 268.5 | 112.7 | 403.7 |
| Input Air Volume at 3000 psi | 4 Liters | | | | | | | | |
| Intensifier Air Side | 600 Liters | | OVERALL | | | | | | |
| | | | | | Max | | Minimum | | |
| Intensifier Hydraulic Side | 50.0 Liters | | Min P | Max P | Ratio | | Displacement | | |
| Accumulator Bottom Half Hyd | 50.0 Liters | | 1656.5 | 5935.0 | 3.6 | | 27.91% | | |
| Accumulator Stage 1a Hyd | 14.5 Liters | | | | | | | | |
| Intensifier Ratio | 12.0 | | | | | | | | |
| Booster Small Side Volume | 14.5 Liters | | | | | | | | |
| Booster Large Side Volume | 50.0 Liters | | | | | | | | |
| Booster Ratio | 3.5 | | | | | | | | |

3 Accumulator, 1 Double Acting Intensifier Scheme with Booster and Pressure added into Intensifer

| Input Air Pressure (psi) | Hydraulic Fluid pressures in cylinders (psi) | | | | Hydraulic Fluid pressures at motor (psi) | | | | |
|---|---|---|---|---|---|---|---|---|---|
| | Accumulator | | Intensifier | | | Stage3 | | | |
| | Start | End | Start | End | End | Start | Mid1 | Mid2 | End |
| 3000 | 3000.0 | | | | | 637.9 | | | |
| 1546.1 | 1546.1 | 1546.1 | | | | | 364.9 | 1546.1 | |
| 830 | 830.0 | 830.0 | | | 830.0 | 830.0 | | | 830.0 |
| 434.7 | 434.7 | 434.7 | | | | | 434.7 | 434.7 | |
| 240 | | 240.0 | 2718.3 | | 240.0 | 2718.3 | | | 240.0 |
| 92.6 | | | 949.5 | 949.5 | | | 949.5 | 949.5 | |
| 20 | | | | 78.3 | 78.3 | | | | 78.3 |
| | | | | Sum in Intensifier | 318.3 | 3548.3 | 1384.2 | 1384.2 | 318.3 |
| When to switch percent wise 0.33 | | | | Intensifier in Booster | 1046.3 | | | 4481.5 | 1046.3 |
| Note: Anywhere between 0.35 and 0.2 give the same pressure range | | | | | Min P 1856.3 126.3 | Max P 3946.2 268.5 | Min P 1656.5 112.7 | Max P 5935.0 403.7 | Min P 1856.3 126.3 |

| | |
|---|---|
| Input Air Volume at 3000 psi | 4 Liters |
| Intensifier Air Side | 600 Liters |
| Intensifier Hydraulic Side | 50.0 Liters |
| Accumulator Bottom Half Hyd | 50.0 Liters |
| Accumulator Stage 1a Hyd | 14.5 Liters |
| Intensifier Ratio | 12.0 |
| Booster Small Side Volume | 14.5 Liters |
| Booster Large Side Volume | 50.0 Liters |
| Booster Ratio | 3.5 |

Additional pressure profiles with alternate maximum to minimum pressure ratios can be achieved by modifying the switching pressures. For example, in another embodiment, the switching pressures can be approximately 460 psi and 160 psi, resulting in a pressure profile of 3,000 psi to 1,000 psi, or a ratio of 3:1. A ratio of 2.9:1.0 is achievable over several pressure profiles such as 3,530 psi to 1,220 psi.

Figure 9:
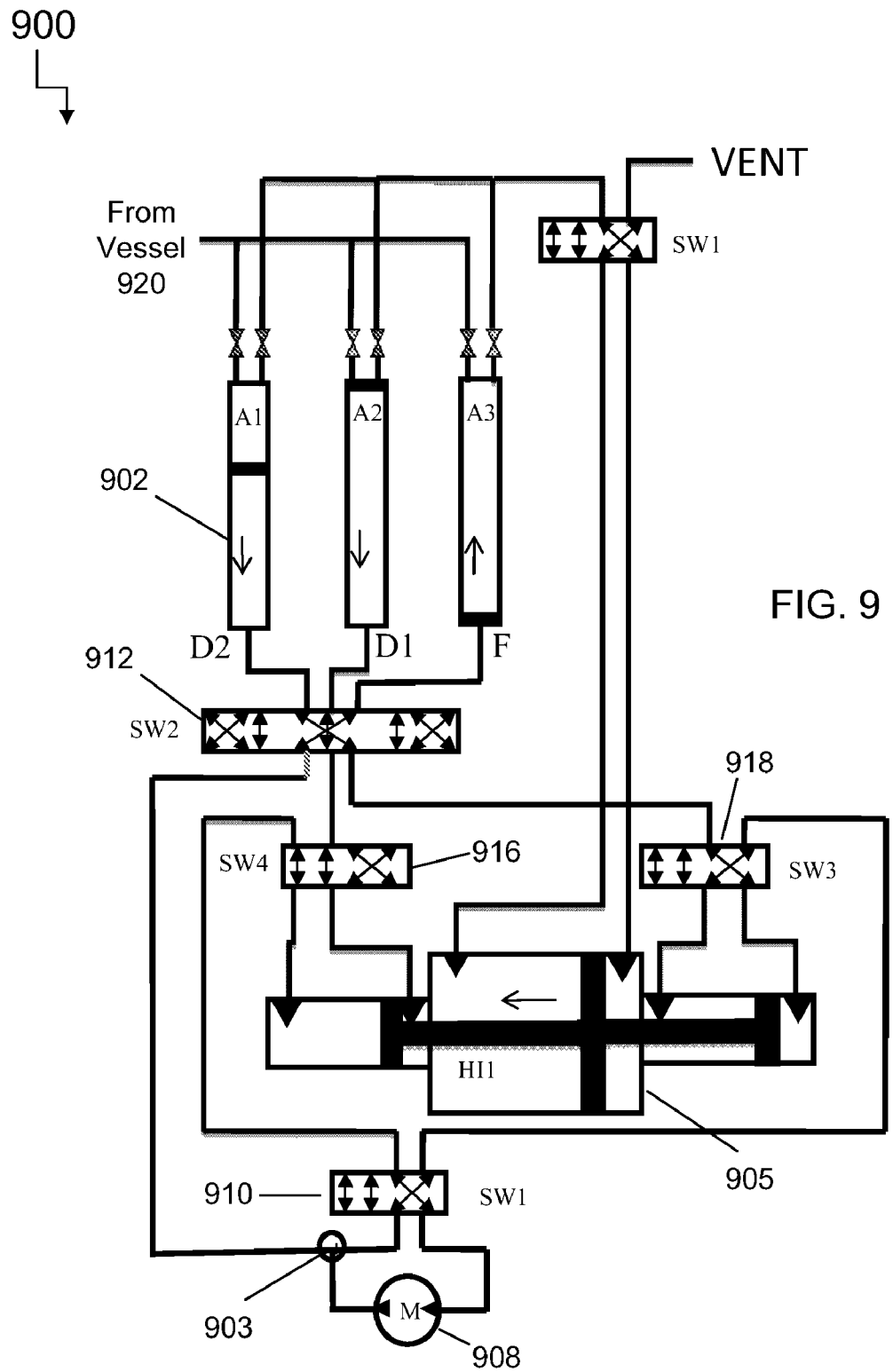

FIG. 9 depicts a system/arrangement 900 using three accumulators 902 and one double-acting, double-ended intensifier 905, wherein a driving chamber switches in the middle of each cycle. This arrangement 900 is similar to the arrangement 800 depicted in FIG. 8, although with a simpler valving arrangement (directional valves 910, 912, 916, 918, and 903) and the single double-ended, double-acting intensifier 905 in place of the intensifier 804 and the booster 806.

Figure 10:
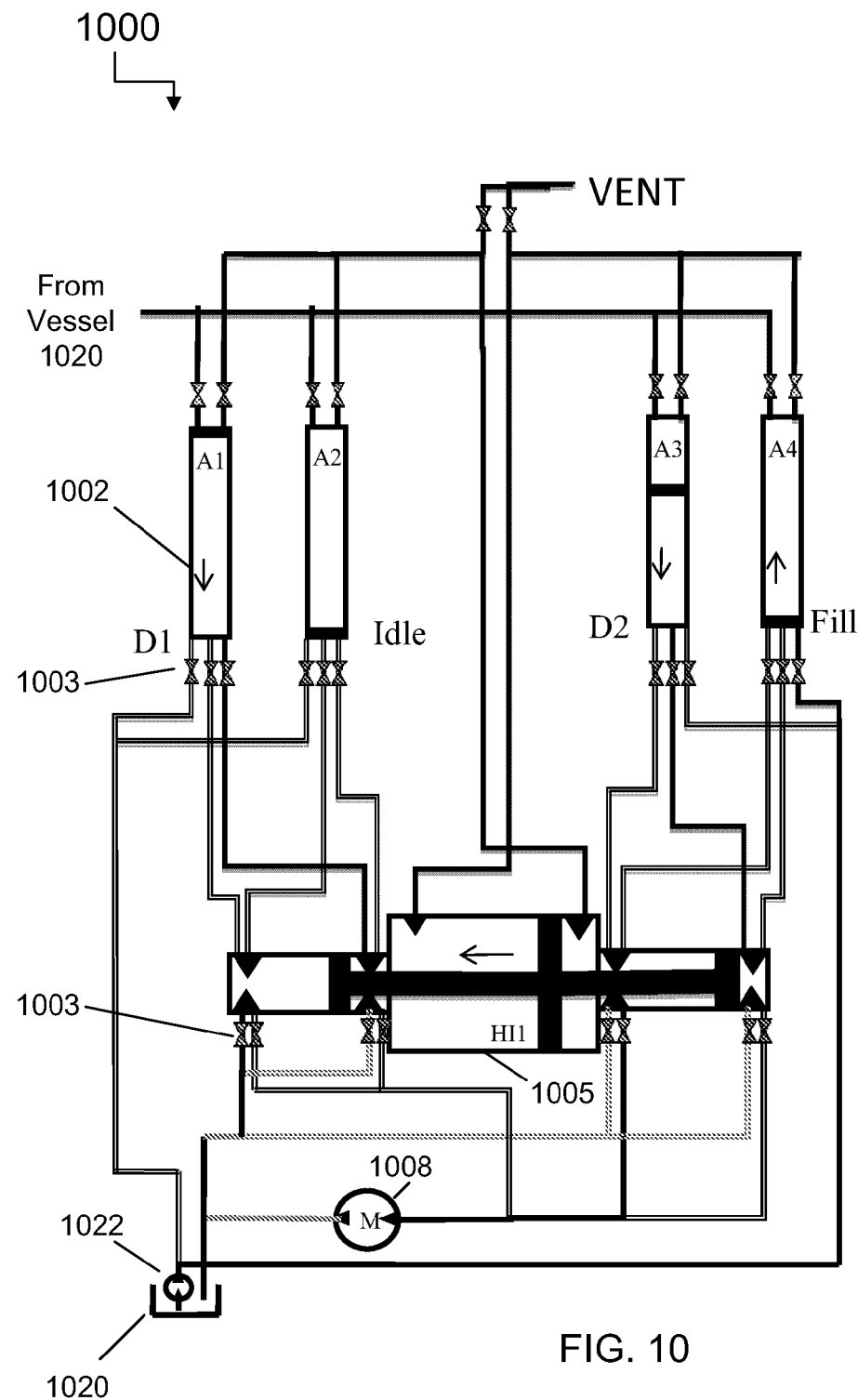

FIG. 10 depicts a system/arrangement 1000 using four accumulators 1002 and one double-acting, double-ended intensifier 1005, wherein a driving chamber switches in the middle of each cycle. This arrangement 1000 is similar to the arrangement 900 depicted in FIG. 9, although with an even simpler valving arrangement (1003) and one additional accumulator (A4). This allows for the pairing of accumulators 1002 and simplified valving. Additionally, since one accumulator 1002 is idle, there is no back pressure in this setup. As such, an open hydraulic fluid system 1022 can be made with a tank system 1024 allowing for filtering and de-aerating of the hydraulic fluid.

Figure 11:
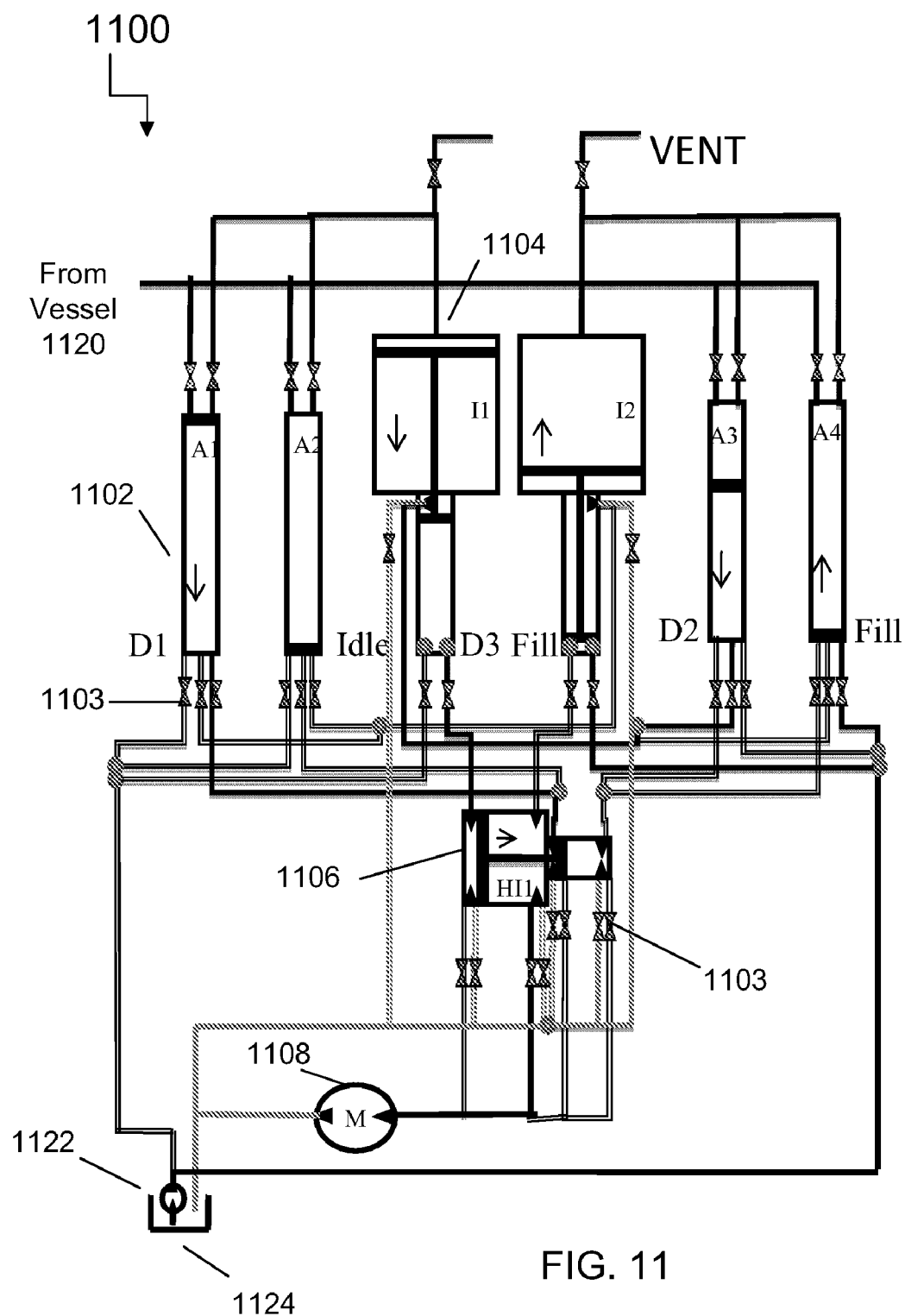

FIG. 11 depicts a system/arrangement 1100 using four accumulators 1102, two single acting intensifiers 1104, and one hydraulic-hydraulic booster 1106, wherein a driving chamber switches in the middle of each cycle. This achieves a similar result as the arrangement 1000 depicted in FIG. 10. Again, since one accumulator 1102 is idle, there is no back pressure in this setup and an open hydraulic fluid system 1122 can be made with a tank system 1124 allowing for filtering and de-aerating of the hydraulic fluid. As previously described, the system 1100 can include a series of valve arrangements 1103 to control the operation of the system 1100.

FIGS. 12A-14B depict various systems/arrangements utilizing multiple sizes of intensifiers, where more than one valve change occurs on an air side during each expansion cycle. The addition of multiple sizes (i.e., different pressure intensification ratios) of intensifiers allows for the reduction of maximum hydraulic fluid flow by increasing the minimum hydraulic fluid pressure found anywhere in the system.

FIGS. 12A and 12B depict a system/arrangement 1200 using two accumulators 1202 and two double-acting intensifiers (of different pressure intensification ratios) 1204, with add-ins to the intensifiers 1204. Three cylinders of the accumulators 1202 and the intensifiers 1204 are always driving in this arrangement 1200. The two double-acting intensifiers 1204 allow for a higher minimum hydraulic pressure, thus lowering the maximum flow rate. Adding the forces from the accumulators 1202 and the intensifiers 1204 sends greater pressure to the hydraulic motor 1208, allowing gas to expand to a lower pressure in the intensifiers 1204. In a particular embodiment, the system 1200 could have switching points of approximately 500 psi and 120 psi (assuming a 20 psi venting pressure). The hydraulic fluid pressure profile would vary between approximately 7,200 psi and 1,100 psi, or a 6.6:1.0 change. The operating characteristics of this arrangement 1200 are shown in Table 7 and represent two hydraulic valve changes per expansion from 3,000 psi to atmospheric pressure. The minimum hydraulic fluid pressure is 500 psi. Again, additional pressure profiles with alternate maximum to minimum pressure ratios can be achieved by modifying the switching pressures. As previously described, the system 1200 can utilize a series of valve arrangements 1203 to control the operation of the system 1200.

motor 1308 via a directional control valve 1310. Two cylinders of the accumulators/intensifiers are always driving in this arrangement 1300. The three single-acting intensifiers 1304 allow for a higher minimum hydraulic pressure, thus lowering the maximum flow rate. Adding the forces from the accumulator 1302 and the intensifiers 1304 sends greater pressure to the hydraulic motor 1308, allowing gas to expand to a lower pressure in the intensifiers 1304. In a particular embodiment, the system 1300 could have switching points of approximately 850 psi, 310 psi, and 100 psi (assuming a 20 psi venting pressure). The hydraulic fluid pressure profile would vary between approximately 5,000 psi and 860 psi, or a 5.8:1.0 change. The operating characteristics of this arrangement

TABLE 7

Pressures and Volumes for Two Accumulators, Two-Double-Acting Intensifiers of Different Ratios (with Intensifier Adding).

| 2 Accumulator, 2 Double Acting Intensifier Scheme with Pressure added into Intensifier | | | | Int. 1 Ratio | 4.2 | Int. 2 Ratio | 25.0 | Adding Ratio | 1 |
|---|---|---|---|---|---|---|---|---|---|
| Input Air | Hydraulic Fluid pressures in cylinders (psi) | | | Hydraulic Fluid pressures at motor (psi) | | | | | |
| Pressure | Accumulator | | | Stage 1 | | | | | |
| (psi) | Start | End | | Start | End | | | | |
| 3000 | 3000.0 | | | 3000.0 | | | | | |
| 500 | 500.0 | 500.0 | | 1598.0 | 494.7 | | | | |
| 120 | 120.0 | 120.0 | | 2647.2 | 453.5 | | | | |
| 20 | | 20.0 | | | 147.2 | | | | |
| | | | Sum in Intensifier | 7245.2 | 1095.4 | | | | |
| VOLUMES | | | | | | | | | |
| Input Air Volume at 3000 psi | 4.0 Liter | | | | | | | | |
| Intensifier2 Air Side | 600.0 Liters | | | | | | | | |
| Intensifier1 Air Side | 100.0 Liters | | | Max P | Min P | Motor Pressure | | | |
| Accumulator Hyd | 24.0 Liters | | | 7245.2 | 1095.4 | 6745.2 | | 975.4 | 6.9 |
| Intensifier 1 Ratio | 25.0 | | | 492.9 | 74.5 | | | | |
| Intensifier 2 Ratio | 4.2 | | | | | | | | |
| | | | | OVERALL | | | | | |
| | | | | Min P | Max P | Max Ratio | | Minimum Displacement | |
| | | | | 1095.4 | 7245.2 | 6.6 | | 15% | |

FIG. 13 depicts a system/arrangement 1300 using one accumulator 1302 and three single-acting intensifiers (of different ratios) 1304 with add-ins coupled to a hydraulic

1300 are shown in Table 8 and represent three hydraulic valve changes per expansion from 3,000 psi to atmospheric pressure. The minimum hydraulic fluid pressure is about 860 psi.

TABLE 8

Pressures and Volumes for One Accumulator, Three Single-Acting Intensifiers (with Add-In).

| 1 Accumulator, 3 Intensifier Scheme with add-in | | | | | | | | Booster Ratio 2 | 1 | | |
|---|---|---|---|---|---|---|---|---|---|---|---|
| Input Air | Air pressures in cylinders (psi) | | Hyd. Fluid pressures in cylinders (psi) | | | | | Back pressure | | | |
| Pressue | Accumulator | | Stage 1 | | Stage2 | | Stage3 | | Stage 4 | | |
| (psi) | Start | End | Start | End | Start | End | Start | End | Start | End | |
| 3000 | 3000.0 | | 3000.0 | | | | | | 950.0 | | |
| 950 | 950.0 | 950.0 | | 950.0 | 4053.5 | | 901.2 | | | 220.0 | |
| 220 | 220.0 | 220.0 | 2800.9 | | | 901.2 | | 253.5 | | | |
| 70 | 70 | 70.0 | | 765.2 | 2641.5 | | 29.0 | | 765.2 | | |
| 20 | 15 | 20 | | | | 266.5 | | 29.0 | | 86.6 | |
| | | 15 | | | | | | | | | |
| VOLUMES | | | Max P | Min P | Max P | Min P | Max P | Min P | Max P | Min P | |
| Initial Volume | | | 4870.7 | 1432.8 | 4979.7 | 861.0 | 930.2 | 282.4 | 1715.2 | 306.6 | |
| 4 Liters (at max pressure) | | | 331.3 | 97.5 | 338.8 | 58.6 | 63.3 | 19.2 | 116.7 | 20.9 | |
| Final Volume = air side of intensifier | | | | | | | | | | | |

TABLE 8-continued

Pressures and Volumes for One Accumulator, Three Single-Acting Intensifiers (with Add-In).

| 1 Accumulator, 3 Intensifier Scheme with add-in | | | | | | | Booster Ratio 2 | 1 | | |
|---|---|---|---|---|---|---|---|---|---|---|
| Input Air | Air pressures in cylinders (psi) | | Hyd. Fluid pressures in cylinders (psi) | | | | Back pressure | | | |
| Pressue | Accumulator | | Stage 1 | | Stage2 | | Stage3 | | Stage 4 | |
| (psi) | Start | End | Start | End | Start | End | Start | End | Start | End |
| 600 Liters | | | OVERALL | | | | | | | |
| | | | | | Max | | Minimum | | | |
| Volume of Accumulator and all fluid sides | | | Min P | Max P | Ratio | | Displacement | | | |
| 12.63 Liters | | | 861.0 | 4979.7 | 5.78 | | 17.3% | | | |
| Intensifier1 air volume | | 54.55 Liters | | | | | | | | |
| Intensifier1 ratio | | 4.32 | | | | | | | | |
| Intensifier2 air volume | | 171.43 Liters | | | | | | | | |
| Intensifier2 ratio | | 13.57 | | | | | | | | |
| Intensifier3 air volume | | 600.00 Liters | | | | | | | | |
| Intensifier3 ratio | | 47.50 | | | | | | | | |

Figure 14A:
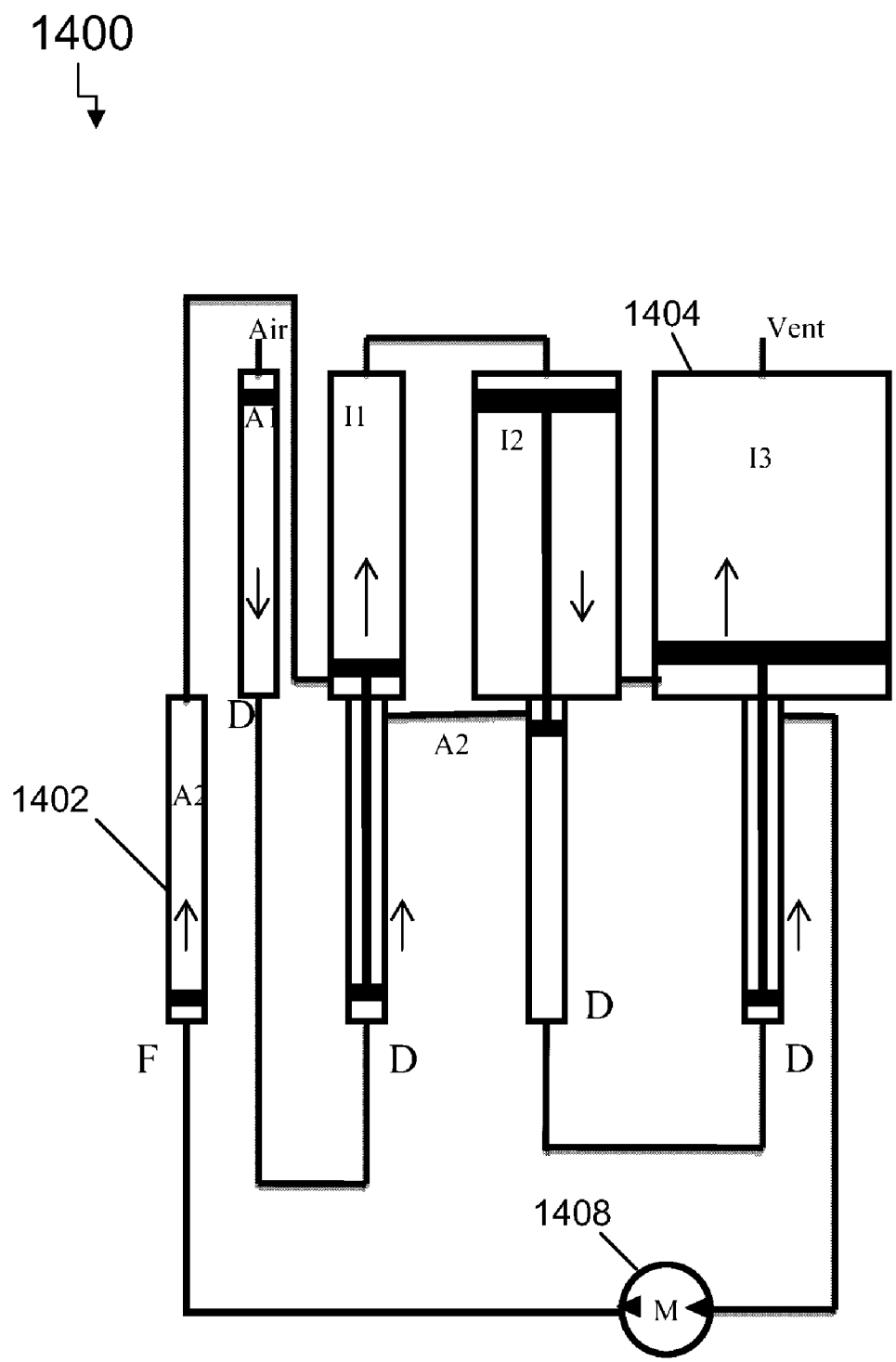
Figure 14B:
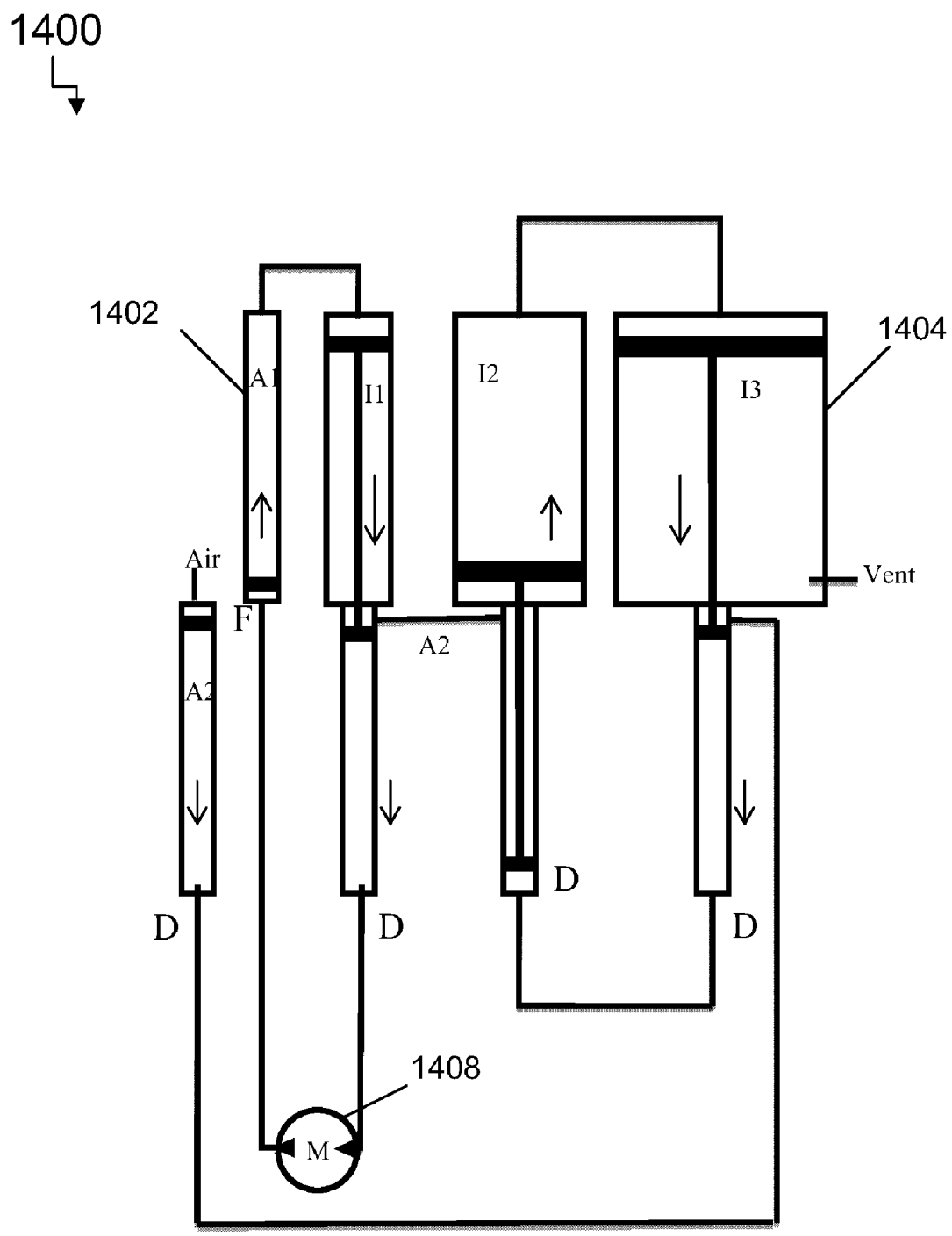
Figures 15A, 15B:
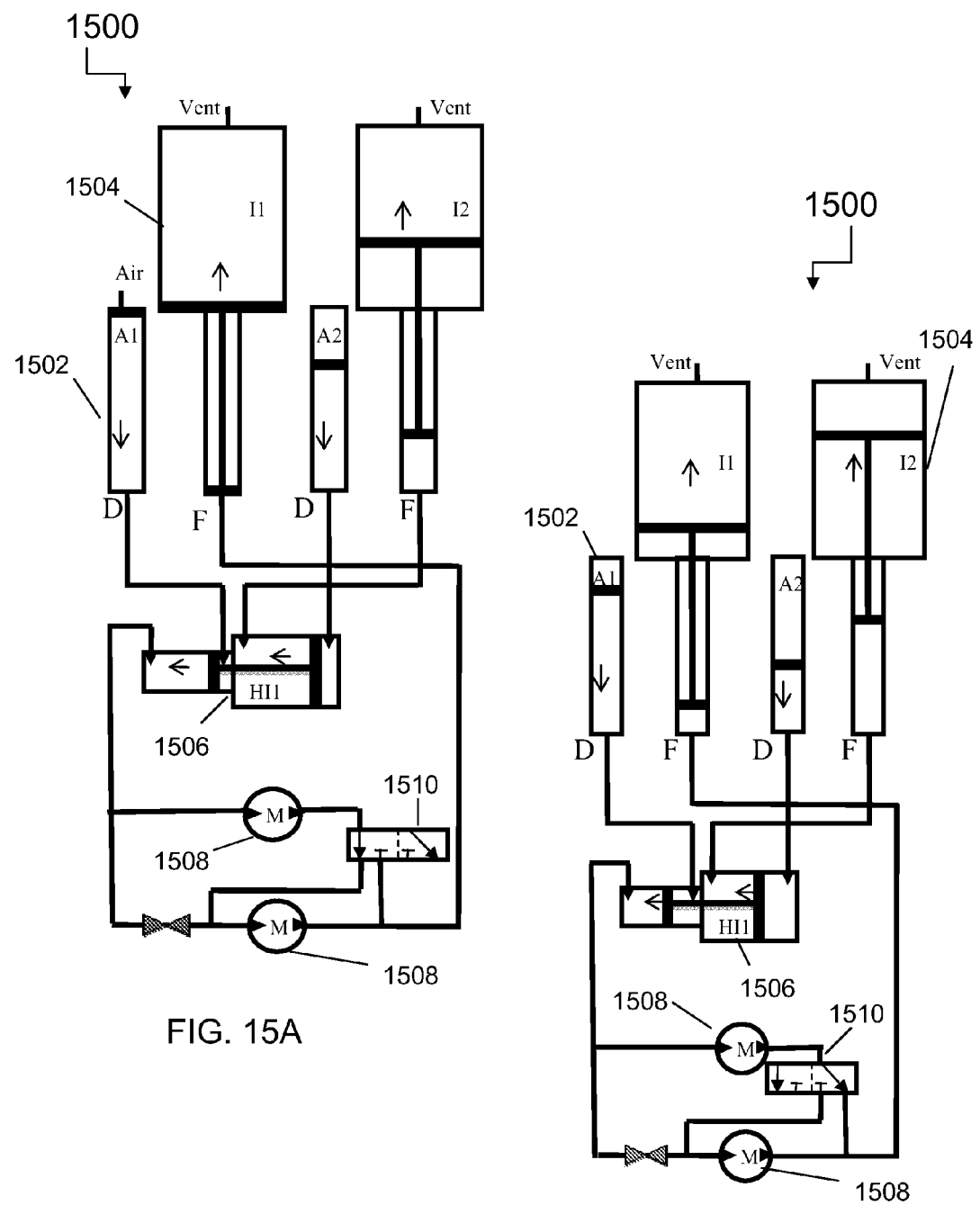

FIGS. 14A and 14B depict a system/arrangement 1400 using two accumulators 1402 and three double-acting intensifiers (of different ratios) 1404 with add-ins coupled to a hydraulic motor 1408. Four cylinders of the accumulators/intensifiers are always driving in this arrangement 1400. The three double-acting intensifiers 1404 allow for a higher minimum hydraulic pressure, thus lowering the maximum flow rate. The operating characteristics in one embodiment of this arrangement 1400 are shown in Table 9.

allel operation, the pressure profile seen by the motors 1508 can be cut in half. For example, in the system 1500, the pressure profile seen by each motor 1508 can range from about 3,000 psi to 1,000 psi, with a 6,000 psi to 2,000 psi operating range for the system in series operation (FIG. 15A for high pressure operation) and 3,000-1,000 psi operating range for the system in parallel operation (FIG. 15B for lower pressure operation).

TABLE 9

Pressures and Volumes for Two Accumulators, Three Double-Acting Intensifiers (with Add-In).

| 1 Accumulator, 3 Intensifier Scheme with add-in | | | | | | | Booster Ratio 2 | 1 |
|---|---|---|---|---|---|---|---|---|
| Input Air | Air pressures in cylinders (psi) | | | Hyd. Fluid pressures in cylinders (psi) | | | Back pressure | |
| Pressure | Accumulator | | | Stage 1 | | | | |
| (psi) | Start | End | | Start | End | | | |
| 3000 | 3000.0 | | | 643.5 | | | | |
| 1438.42 | 1438.4 | 1438.4 | | 2526.51 | 485.37 | | | |
| 269.54 | 269.5 | 269.5 | | 1561.82 | 436.13 | | | |
| 73.42 | 73.42 | 73.4 | | 1706.6 | 436.1 | | | |
| 20 | 15 | 20 | | | 159.5 | | | |
| | | 15 | | | | | | |
| VOLUMES | | | | Max P | Min P | | | |
| Initial Volume | | | | 6438.4 | 1517.1 | | | |
| 4 Liters (at max pressure) | | | | 438.0 | 103.2 | | | |
| Final Volume = air side of intensifier | | | | 5000.0 | 1247.6 | 4.01 | 25.0% | |
| 600 Liters | | | | 340.1 | 84.9 | | | |
| Volume of Accumulator and all fluid sides | | | | | | | | |
| 20.72 Liters | | | | OVERALL | | | | |
| | | | | | | Max | Minimum | |
| Volume of Rod | | 0 Liters | | Min P | Max P | Ratio | Displacement | |
| Volume 12, 13 large fluid side | | 20.72 Liters | | 1517.1 | 6438.4 | 4.24 | 23.6% | |
| Intensifier 0 air volume | | 8.34 Liters | | | | | | |
| Intensifier 0 ratio | | 0.40 | | | | | | |
| Intensifier 1 air volume | | 44.52 Liters | | | | | | |
| Intensifier 1 ratio | | 2.15 | | | | | | |
| Intensifier 2 air volume | | 163.44 Liters | | | | | | |
| Intensifier 2 ratio | | 7.89 | | | | | | |
| Intensifier 3 air volume | | 600 Liters | | | | | | |
| Intensifier 3 ratio | | 28.96 | | | | | | |

Figure 16:
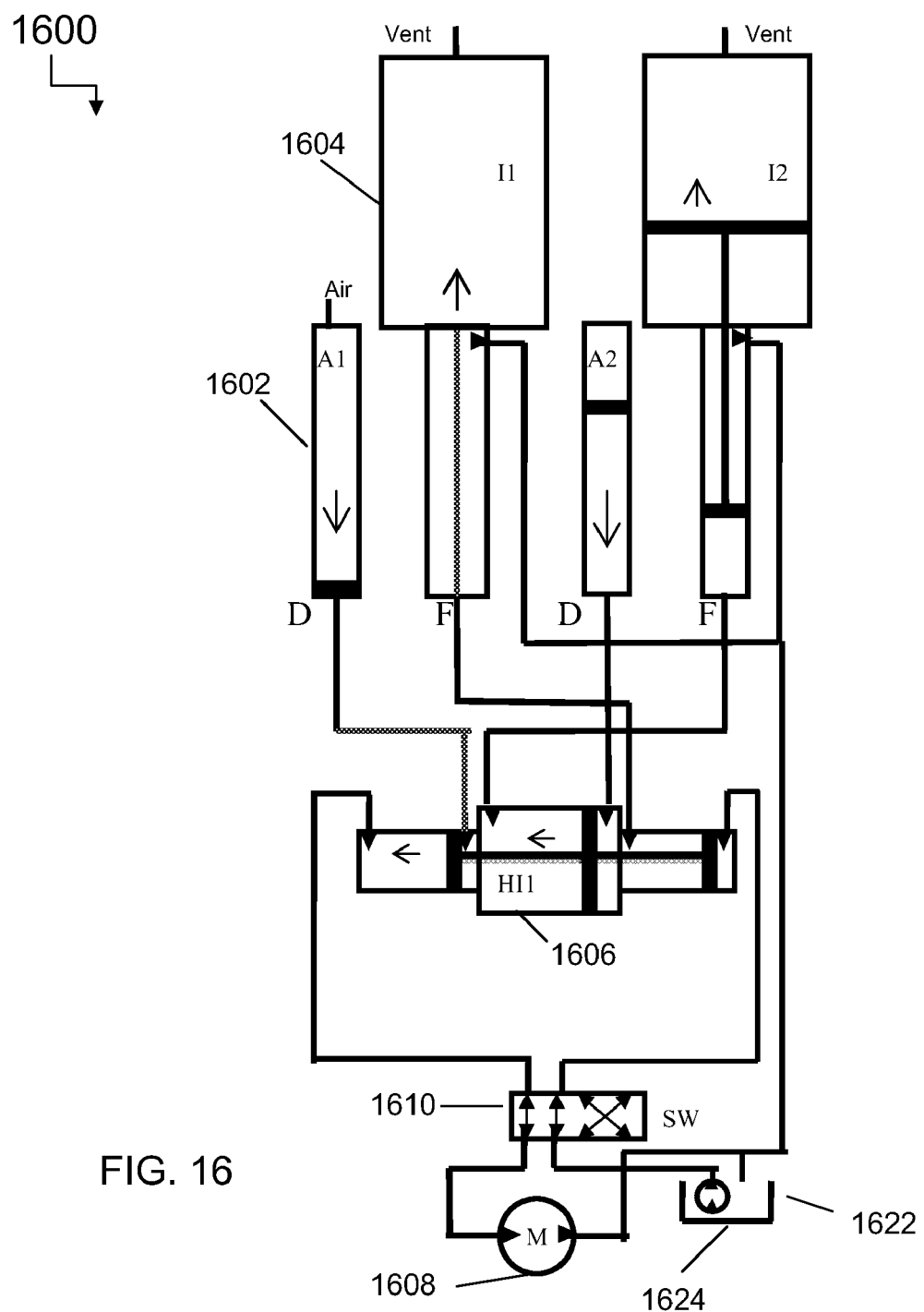

FIGS. 15A and 15B depict a system/arrangement 1500 using two pumps/motors 1508, wherein the motors 1508 are switched from running in series to running in parallel by a directional valve 1510. By switching between serial and par- FIG. 16 depicts a system/arrangement 1600, similar to the system 100 depicted in FIGS. 1A-1D, where hydraulic fluid is added into intensifiers 1604 at only certain intervals, which requires another valve change. Generally, the system 1600 includes two accumulators 1602 and two intensifiers 1604 coupled to a hydraulic-hydraulic booster 1606, which in turn is coupled to a hydraulic motor 1608 via a directional control valve 1610. Again, since one accumulator 1602 is idle, there is no back pressure in this setup and an open hydraulic fluid system 1622 can be made with a tank system 1624 allowing for filtering and de-aerating of the hydraulic fluid. As previously described, the system 1600 can include a series of valve arrangements (not shown) to control the operation of the system 1600.

Figure 17:
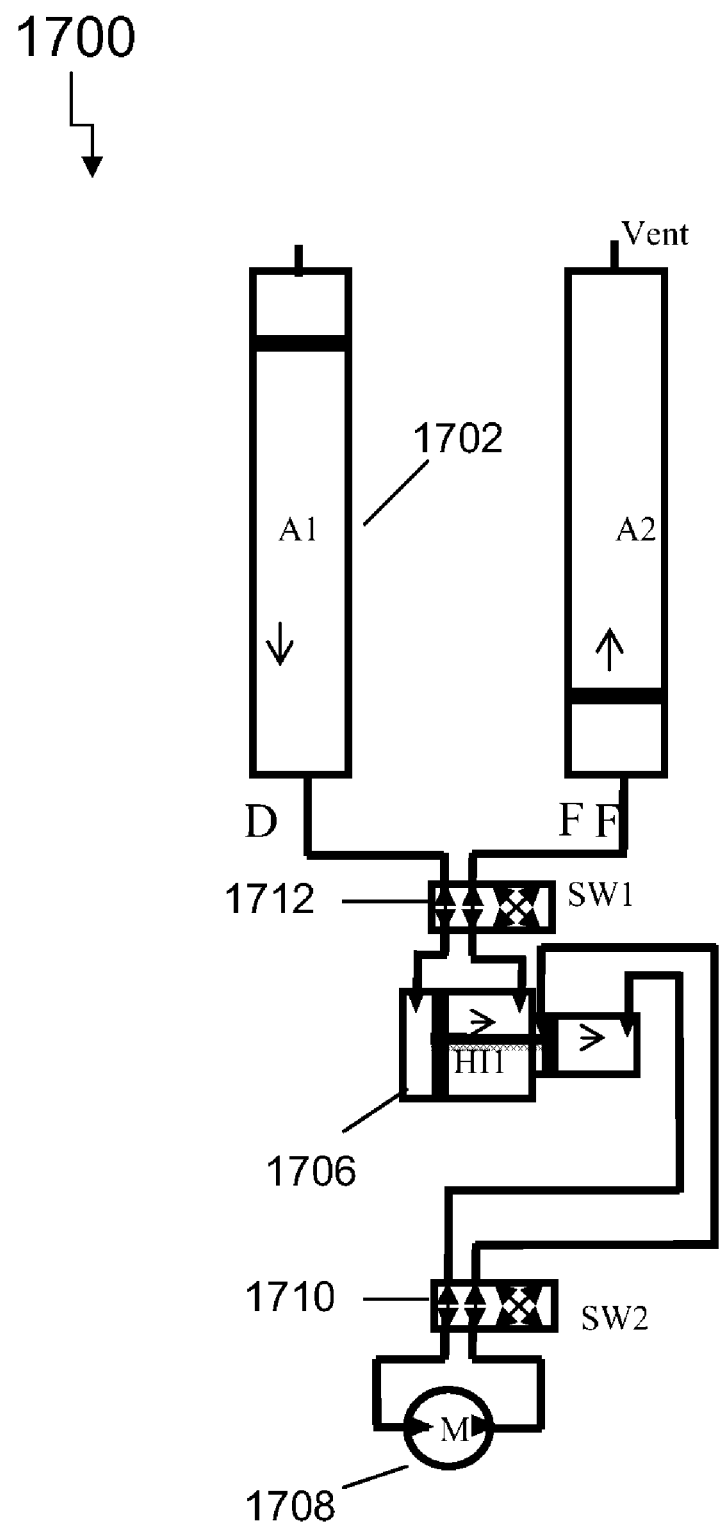

In other embodiments, the air-to-hydraulic fluid accumulators and intensifiers may be replaced with a single large pneumatic accumulator and a hydraulic booster (hydraulic-hydraulic intensifier). FIG. 17 depicts a system/arrangement 1700 analogous to the one accumulator and one intensifier scheme depicted in FIGS. 1A-1D, except that air is expanded in one of two large accumulators 1702 and intensification is provided by the hydraulic booster 1706, as opposed to an air-hydraulic intensifier. This allows for the potential reduction in size of the intensifiers, since they can be reciprocated during one air expansion. The accumulators 1702 are coupled to the booster 1706 via a directional control valve 1712, and the booster 1706 is coupled to a hydraulic motor 1708 via another directional control valve 1710. Any of the other previously described embodiments can also be implemented using this arrangement.

FIG. 18 depicts a system/arrangement 1800 using three accumulators 1802, one double-acting intensifier 1805, and two vertical, low-pressure accumulators 1826. The three accumulators 1802 are coupled to the intensifier 1805 via directional control valves 1812, 1816, 1818, which are in turn coupled to a hydraulic motor via valves 1803, 1810. By including the low pressure accumulators 1826 with the high pressure accumulators 1802, costs can be reduced. Also, by orienting the low pressure accumulators 1826 vertically the overall dimensions of the systems can be reduced, since their length is half that of an intensifier of the same air volume. This arrangement 1800 requires very high fluid flow rates at the end of low pressure expansion.

Other arrangements may be implemented for varying power generated during an expansion cycle by using multiple motors. By using multiple motors on a single shaft, in one embodiment, the power output of each motor can be different as long as the sum of the powers remains at a constant value (e.g., 50 kW). A constant sum power can be obtained by running multiple fixed displacement motors (or less variable displacement motors) at constant RPM as the pressure varies, and by running the cylinders out of phase. For example, if the pressure profile varied by a factor of 4 for two different cylinder pairings, operating two variable displacement motors over a displacement change of 2 at a constant RPM, could allow the power output to fall. But, by adding the two motor powers on a single shaft, the total power could remain the same if the pressure expansions were out-of-phase and constant expansion power was not maintained.

Additional embodiments include arranging air cylinders and hydraulic cylinders on a common rail to create a separated intensifier scheme. By separating an intensifier into an air cylinder and a hydraulic cylinder, maintenance of gland seals is easier and heat transfer fluids and hydraulic fluids may be separated. Additionally, by mechanically coupling multiple cylinders, forces (and practically air pressure at different intensification ratios) may be added to narrow the hydraulic pressure profile. Such embodiments are described with respect to FIGS. 19-22. Additional examples of these arrangements are described in the '703 application incorporated herein.

FIG. 19 depicts a system/arrangement 1900 using four double-acting air cylinders 1932 and one hydraulic cylinder 1934 attached via a common bar 1936. The four air cylinders 1932 are always driving in this arrangement 1900. In the embodiment shown, the pneumatic cylinders are each of a different size. The forces from the air cylinders 1932 are mechanically coupled to drive the single hydraulic cylinder 1934. There are four air stages, but no computer-actuated hydraulic valving is necessary; however, the system 1900 can still include a series of valve arrangements 1903 for controlling the operation of the system. In one embodiment, 3,000 psi air cylinders are used as opposed to 3,000 psi accumulators. If 3,000 psi accumulators are needed, a single air cylinder 1932 could be replaced by a hydraulic cylinder and two accumulators. In a particular embodiment, the system 1900 could have switching points of approximately 1,100 psi, 290 psi, and 80 psi (assuming a 20 psi venting pressure). The hydraulic fluid pressure profile would vary between approximately 5,050 psi and 1,240 psi, or a 4.1:1.0 change. The operating characteristics of this arrangement are shown in Table 10 and represent four air stages per expansion from 3,000 psi to atmospheric pressure. The minimum hydraulic fluid pressure is 1,240 psi.

TABLE 10

Pressures and Volumes for Four Double-Acting Air Cylinders and One Hydraulic Cylinder Attached via Common Bar.

| | 1 double acting Oil Cylinder, 4 double acting Air Cylinders Scheme | | | | | | Booster Ratio 2 | 1 |
|---|---|---|---|---|---|---|---|---|
| Input Air | Air pressures in cylinders (psi) | | | | Hyd. Fluid pressures in cylinders (psi) | | | |
| Pressure | Accumulator | | | | Stage 1 | | Forces (lbs) | |
| (psi) | Start | End | | | Start | End | AirCyl0 | AirCyl1 |
| 3000 | 3000.0 | | | | 843.8 | | 37417.6 | |
| 1100 | 1100.0 | 1100.0 | 2.75 | 2.73 | 1355.39 | 368.2 | 13603.1 | 51598.0 |
| 290 | 290.0 | 290.0 | 3.94 | 3.79 | 1274.7 | 362.29 | | 13088.5 |
| 80 | 80 | 80.0 | 4.22 | 3.625 | 1574.7 | 374.7 | | |
| 20 | 15 | 20 | 12.32 | 4 | | 134.7 | | |
| | | 15 | | | | | | |
| VOLUMES | | | | | Max P | Min P | | |
| Initial Volume | | | | | 5048.6 | 1239.8 | | |
| 4 Liters (at max pressure) | | | | | 343.4 | 84.3 | | |

TABLE 10-continued

Pressures and Volumes for Four Double-Acting Air Cylinders
and One Hydraulic Cylinder Attached via Common Bar.

Final Volume = air side of last air cylinder
600 Liters    OVERALL

| | | Min P | Max P | Max Ratio | Minimum Displacement |
|---|---|---|---|---|---|
| Volume of hydraulic cylinder | | 1239.8 | 5048.6 | 4.07 | 24.6% |
| 25 Liters | | | | | |
| Air Cylinder 0 Air Volume | 10.91 Liters | | | | |
| Air Cylinder 0 ratio | 0.44 | | | | |
| Air Cylinder 1 air volume | 41.38 Liters | | | | |
| Air Cylinder 1 ratio | 1.66 | | | | |
| Air Cylinder 2 air volume | 150 Liters | | | | |
| Air Cylinder 2 ratio | 6 | | | | |
| Air Cylinder 3 air volume | 600 Liters | | | | |
| Air Cylinder 3 ratio | 24 | | | | |

1 double acting Oil Cylinder,
4 double acting Air Cylinders Scheme

| Input Air Pressure (psi) | Air pressures in cylinders (psi) | | | | | |
|---|---|---|---|---|---|---|
| | Accumulator | | | | | |
| | Start | End | | | AirCyl2 | AirCyl3 | Hydraulic Forces |
| 3000 | 3000.0 | | | | | | 181477.1 lbs |
| 1100 | 1100.0 | 1100.0 | 2.75 | 2.73 | | | 41599.2 lbs |
| 290 | 290.0 | 290.0 | 3.94 | 3.79 | 47445.7 | | |
| 80 | 80 | 80.0 | 4.22 | 3.625 | 11253.9 | 45015.7 | |
| 20 | 15 | 20 | 12.32 | 4 | | 3653.7 | |
| | | 15 | | | | | |

VOLUMES    *rod diameter calculated from parker cylinder
Initial Volume    table (assuming stroke factor of .50)
4 Liters (at max pressure)
Final Volume = air side of last air cylinder    Diameter for X length
600 Liters    X =    1.45    meters
Volume of hydraulic cylinder    (m)    (in)    Max Force (lbs)    rod (in)

| | | (m) | (in) | Max Force (lbs) | rod (in) | |
|---|---|---|---|---|---|---|
| 25 Liters | | 0.14816 | 6.0 | 181477.1 | 4.5 | Hydraulic Cylinder |
| Air Cylinder 0 Air Volume | 10.91 Liters | 0.09787 | 4.0 | 37417.6 | 2.5 | Air Cylinder #0 |
| Air Cylinder 0 ratio | 0.44 | | | | | |
| Air Cylinder 1 air volume | 41.38 Liters | 0.19062 | 7.8 | 51598.0 | 3 | Air Cylinder #1 |
| Air Cylinder 1 ratio | 1.66 | | | | | |
| Air Cylinder 2 air volume | 150 Liters | 0.36292 | 14.8 | 47445.7 | 3 | Air Cylinder #2 |
| Air Cylinder 2 ratio | 6 | | | | | |
| Air Cylinder 3 air volume | 600 Liters | 0.72585 | 29.6 | 45015.7 | 3 | Air Cylinder #3 |
| Air Cylinder 3 ratio | 24 | | | | | |

FIG. 20 depicts a system/arrangement 2000 using four double-acting air cylinders 2032 and two hydraulic cylinders 2034 attached via a common bar 2036. The four air cylinders 2032 are always driving in the arrangement 2000. In the embodiment shown, the system 2000 uses pneumatic and hydraulic cylinders of different sizes. The forces from the air cylinders 2032 are mechanically coupled to drive the two hydraulic cylinders 2034 and controlled via valves 2003, to vary the intensification ratio by varying effective piston area. There are four air stages and three computer-actuated hydraulic valves 203. In one embodiment, 3,000 psi air cylinders are used as opposed to 3,000 psi accumulators. If 3,000 psi accumulators are needed, a single air cylinder could be replaced by a hydraulic cylinder and two accumulators. In a particular embodiment, the system 2000 could have switching points of approximately 830 psi, 275 psi, and 75 psi (assuming a 20 psi venting pressure). The hydraulic fluid pressure profile would vary between approximately 5,000 psi and 2,270 psi, or a 2.2:1.0 change. The operating characteristics of this arrangement are shown in Table 11 and represent four air stages per expansion from 3000 psi to atmospheric pressure. The minimum hydraulic fluid pressure is 2,270 psi. In another embodiment, the two hydraulic cylinders 2034 could be replaced by a single telescoping cylinder having two stages.

TABLE 11

Pressures and Volumes for Four Double-Acting Air Cylinders and Two Hydraulic Cylinders Attached via Common Bar.

| 2 double acting Oil Cylinders, 4 double acting Air Cylinders Scheme | | | | | | | | Booster Ratio 2 | 1 |
|---|---|---|---|---|---|---|---|---|---|
| Input Air | Air pressures in cylinders (psi) | | | | Hyd. Fluid pressures in cylinders (psi) | | | | |
| pressure | Accumulator | | Gauge | Absolute | Stage 1 | | Stage 2 | | Forces (lbs) |
| (psi) | Start | End | Ratios | Ratios | Start | End | | | AirCyl0 |
| 3000 | 3000.0 | | | | 1269.0 | | | | 49589.6 |
| 1610 | 1610.0 | 1610.0 | | | | 637.0 | 1219.4 | | 26500.0 |
| 830 | 830.0 | 830.0 | 3.66 | 3.61 | 982.9 | | | 635.8 | |
| 533.43 | 533.4 | 533.4 | | | | 691.5 | 1325.0 | | |
| 275 | 275.0 | 275.0 | 3.13 | 3.02 | 1294.1 | | | 690.2 | |
| 145.48 | 145.5 | 145.5 | | | | 697.2 | 1335.9 | | |
| 75 | 75 | 75.0 | 4.32 | 3.67 | 1454.0 | | | 695.8 | |
| 33.80 | 38.8 | 38.8 | | | | 585.5 | 1119.7 | | |
| 20 | 15 | 20 | 11.38 | 3.75 | | | | 246.9 | |
| | 15 | 15 | | | | | | | |
| VOLUMES | | 15 | | | Max P | Min P | Max P | Min P | |
| Initial Volume | | | | | 5000.0 | 2611.2 | 5000.0 | 2268.7 | |
| 4 Liters (at max pressure) | | | | | 340.1 | 177.6 | 340.1 | 154.3 | |
| Final Volume = air side of last air cylinder | | | | | | | | | |
| 600 Liters | | | | | OVERALL | | | | |
| | | | | | | | Max | Minimum | |
| Volume of hydraulic cylinder #1 | | | | | Min P | Max P | Ratio | Displacement | |
| 12.92 Liters | | | | | 2268.7 | 5000.0 | 2.20 | 45.4% | |
| Volume of hydraulic cylinder #2 | | | | | | | | | |
| 12.09 Liters | | | | | | | | | |
| Air Cylinder0 Air Volume | | 14.46 Liters | | | | | | | |
| Air Cylinder0 ratio | | 1.12 | | | | | | | |
| AC0 ratio2 | | 0.58 | | | | | | | |
| Air Cylinder1 air volume | | 43.64 Liters | | | | | | | |
| Air Cylinder1 ratio | | 3.38 | | | | | | | |
| AC1 ratio2 | | 1.74 | | | | | | | |
| Air Cylinder2 air volume | | 160 Liters | | | | | | | |
| Air Cylinder2 ratio | | 12.38 | | | | | | | |
| AC2 ratio2 | | 6.40 | | | | | | | |
| Air Cylinder3 air volume | | 600 Liters | | | | | | | |
| Air Cylinder3 ratio | | 46.44 | | | | | | | |
| AC3 ratio2 | | 23.99 | | | | | | | |

| 2 double acting Oil Cylinders, 4 double acting Air Cylinders Scheme | | | | | | | | | |
|---|---|---|---|---|---|---|---|---|---|
| Input Air | Air pressures in cylinders (psi) | | | | | | | | |
| pressure | Accumulator | | Gauge | Absolute | | | | | |
| (psi) | Start | End | Ratios | Ratios | AirCyl1 | | AirCyl2 | | AirCyl3 |
| 3000 | 3000.0 | | | | | | | | |
| 1610 | 1610.0 | 1610.0 | | | 26500.0 | | | | |
| 830 | 830.0 | 830.0 | 3.66 | 3.61 | 13543.2 | 40875.8 | | | |
| 533.43 | 533.4 | 533.4 | | | | 26007.2 | 26007.2 | | |
| 275 | 275.0 | 275.0 | 3.13 | 3.02 | | 13050.4 | 47851.3 | | |
| 145.48 | 145.5 | 145.5 | | | | | 24041.8 | 24041.8 | |
| 75 | 75 | 75.0 | 4.32 | 3.67 | | | | 11085.0 | 41568.9 |
| 33.80 | 38.8 | 38.8 | | | | | | | 16610.4 |
| 20 | 15 | 20 | 11.38 | 3.75 | | | | | |
| | 15 | 15 | | | | | | | |
| VOLUMES | | 15 | | | | | | | |
| Initial Volume | | | | | | | *rod diameter calculated from parker cylinder table (assuming stroke factor of .50) | | |
| 4 Liters (at max pressure) | | | | | | | | | |
| Final Volume = air side of last air cylinder | | | | | Diameter for X length | | 57.0866 | in | |
| 600 Liters | | | | | X = | | 1.45 | meters | |
| Volume of hydraulic cylinder #1 | | | | | (m) | (in) | Max Force (lbs) | | rod (in) |
| 12.92 Liters | | | | | 0.10651 | 4.3 | 0.0 | | 4 |
| Volume of hydraulic cylinder #2 | | | | | | | | | |
| 12.09 Liters | | | | | 0.10305 | 4.2 | 0.0 | | 4 |

TABLE 11-continued

Pressures and Volumes for Four Double-Acting Air Cylinders and Two Hydraulic Cylinders Attached via Common Bar.

| | | | | | |
|---|---|---|---|---|---|
| Air Cylinder0 Air Volume | 14.46 Liters | 0.11267 | 4.6 | 0.0 | 2.5 |
| Air Cylinder0 ratio | 1.12 | | | | |
| AC0 ratio2 | 0.58 | | | | |
| Air Cylinder1 air volume | 43.64 Liters | 0.19575 | 8.0 | 0.0 | 3 |
| Air Cylinder1 ratio | 3.38 | | | | |
| AC1 ratio2 | 1.74 | | | | |
| Air Cylinder2 air volume | 160 Liters | 0.37483 | 15.3 | 0.0 | 3 |
| Air Cylinder2 ratio | 12.38 | | | | |
| AC2 ratio2 | 6.40 | | | | |
| Air Cylinder3 air volume | 600 Liters | 0.72585 | 29.6 | 0.0 | 3 |
| Air Cylinder3 ratio | 46.44 | | | | |
| AC3 ratio2 | 23.99 | | | | |

2 double acting Oil Cylinders, 4 double acting Air Cylinders Scheme

| Input Air pressure (psi) | Air pressures in cylinders (psi) | | Gauge Ratios | Absolute Ratios | | Stage #1 Hydraulic Forces | | Stage #2 Hydraulic Forces | |
|---|---|---|---|---|---|---|---|---|---|
| | Accumulator Start | End | | | | | | | |
| 3000 | 3000.0 | | | | | 179885.6 | lbs | 93159.4 | lbs |
| 1610 | 1610.0 | 1610.0 | | | | 93159.4 | lbs | 41332.2 | lbs |
| 830 | 830.0 | 830.0 | 3.66 | 3.61 | | | | | |
| 533.43 | 533.4 | 533.4 | | | Ratio | 1.93 | | 2.25 | |
| 275 | 275.0 | 275.0 | 3.13 | 3.02 | | | | | |
| 145.48 | 145.5 | 145.5 | | | | | | | |
| 75 | 75 | 75.0 | 4.32 | 3.67 | | | | | |
| 33.80 | 38.8 | 38.8 | | | 16610.4 | | | | |
| 20 | 15 | 20 | 11.38 | 3.75 | 3653.7 | | | | |
| | 15 | 15 | | | | | | | |
| VOLUMES | | 15 | | | | | | | |
| Initial Volume | | | | *rod diameter calculated from parker cylinder table (assuming stroke factor of .50) | | | | | |

4 Liters (at max pressure)
Final Volume = air side of last air cylinder
600 Liters
Volume of hydraulic cylinder #1
12.92 Liters                                    Hydraulic Cylinder #1
Volume of hydraulic cylinder #2
12.09 Liters                                    Hydraulic Cylinder #2
Air Cylinder0 Air Volume      14.46 Liters     Air Cylinder #0
Air Cylinder0 ratio            1.12
AC0 ratio2                     0.58
Air Cylinder1 air volume      43.64 Liters     Air Cylinder #1
Air Cylinder1 ratio            3.38
AC1 ratio2                     1.74
Air Cylinder2 air volume       160 Liters      Air Cylinder #2
Air Cylinder2 ratio           12.38
AC2 ratio2                     6.40
Air Cylinder3 air volume       600 Liters      Air Cylinder #3
Air Cylinder3 ratio           46.44
AC3 ratio2                    23.99

FIG. 21 depicts a system/arrangement 2100 using three double-acting air cylinders 2132 and two hydraulic cylinders 2134 attached via a common bar 2136. The three air cylinders 2132 are always driving in this arrangement 2100. The forces from the air cylinders 2132 are mechanically coupled to drive the two hydraulic cylinders 2134 and controlled via valves 2103 to vary the intensification ratio by varying effective piston area. There are three air stages and three computer-actuated hydraulic valves 2103. In one embodiment, 3,000 psi air cylinders are used as opposed to 3,000 psi accumulators. If 3,000 psi accumulators are needed, a single air cylinder could be replaced by a hydraulic cylinder and two accumulators. In a particular embodiment, the system 2100 could have switching points of approximately 750 psi and 160 psi (assuming a 20 psi venting pressure). The hydraulic fluid pressure profile would vary between approximately 4,970 psi and 1,780 psi, or a 2.8:1.0 change. The operating characteristics of this arrangement 2100 are shown in Table 12 and represent three air stages per expansion from 3,000 psi to atmospheric. The minimum hydraulic fluid pressure is 1,780 psi. In another embodiment, the two hydraulic cylinders 2134 can be replaced by a single telescoping cylinder having two stages.

TABLE 12

Pressures and Volumes for Three Double-Acting Air Cylinders and Two Hydraulic Cylinders Attached via Common Bar.

| 2 double acting Oil Cylinders, 3 double acting Air Cylinders Scheme | | | | | | | Booster Ratio 2 | 1 | | | |
|---|---|---|---|---|---|---|---|---|---|---|---|
| Input Air | Air pressures in cylinders (psi) | | Hyd. Fluid pressures in cylinders (psi) | | | | | | | | Total |
| Pressures | Accumulator | | Stage 1 | | Stage 2 | | | | Forces (lbs) | | Force |
| (psi) | Start | End | Start | End | Start | End | | | AirCyl0 | AirCyl1 AirCyl2 | (lbs) |
| 3000 | 3000.0 | | 1073.5 | | | | | | 26655.6 | | 111203.7 |
| 1600 | 1600.0 | 1600.0 | | 607.0 | 1692.9 | | | | 14216.3 | | 42648.9 |
| 750 | 750.0 | 750.0 | 1316.2 | | | 801.4 | | | 6663.9 | 31237.0 | 18325.7 |
| 341.33 | 341.3 | 341.3 | | 673.5 | 1881.4 | | | | | 14216.3 | |
| 160 | 160 | 160.0 | 2573.5 | | | 889.7 | | | | 6663.9 53311.1 | |
| 42.67 | 42.7 | 42.7 | | 502.9 | 1398.0 | | | | | 14216.3 | |
| 20 | 15 | 20 | | | | 264.7 | | | | 4997.9 | |
| | 15 | 15 | | | | | | | | | |
| VOLUMES | | 15 | Max P | Min P | Max P | Min P | | | | | |
| Initial Volume | | | 4963.2 | 1783.5 | 4972.3 | 1955.8 | | | | | |
| 4 Liters (at max pressure) | | | 337.6 | 121.3 | 338.3 | 133.0 | | | | | |
| Final Volume = air side of last air cylinder | | | | | | | | | | | |
| 600 Liters | | | OVERALL | | | | | | | | |
| | | | | | Max | | Minimum | | | | |
| Volume of hydraulic cylinder #1 | | | Min P | Max P | Ratio | | Displacement | | | | |
| 12 Liters | | | 1783.5 | 4972.3 | 2.79 | | 35.9% | | | | |
| Volume of hydraulic cylinder #2 | | | | | | | | | | | |
| 22 Liters | | | Diameter ( | (in) | | | | | | | |
| Air Cylinder0 Air Volume | | 16 Liters | 0.08241 | 3.4 | | | | | | | |
| Air Cylinder0 ratio | | 1.33 | | | | | | | | | |
| AC0 ratio2 | | 0.47 | | | | | | | | | |
| Air Cylinder2 air volume | | 75 Liters | 0.17841 | 7.3 | | | | | | | |
| Air Cylinder2 ratio | | 6.25 | | | | | | | | | |
| AC2 ratio2 | | 2.21 | | | | | | | | | |
| Air Cylinder3 air volume | | 600 Liters | 0.50463 | 20.6 | | | | | | | |
| Air Cylinder3 ratio | | 50 | | | | | | | | | |
| AC3 ratio2 | | 17.65 | | | | | | | | | |

FIG. 22A depicts a system/arrangement 2200 using two double-acting air cylinders 2232 and two hydraulic cylinders 2234 attached via a common bar 2236. The two air cylinders 2232 are always driving in this arrangement 2200. The forces from the air cylinders 2232 are mechanically coupled to drive the two hydraulic cylinders 2234 and controlled via valves 2203 to vary the intensification ratio by varying effective piston area. There are two air stages and three computer-actuated hydraulic valves 2203. In one embodiment, 3,000 psi air cylinders are used as opposed to 3,000 psi accumulators. If 3,000 psi accumulators are needed, a single air cylinder could be replaced by a hydraulic cylinder and two accumulators. In a particular embodiment, the system could have a switching point of approximately 225 psi (assuming a 20 psi venting pressure). The hydraulic fluid pressure profile would vary between approximately 5,000 psi and 1,160 psi, or a 4.3:1.0 change. The operating characteristics of this arrangement 2200 are shown in Table 13 and represent two air stages per expansion from 3,000 psi to atmospheric pressure. The minimum hydraulic fluid pressure is 1,160 psi. In another embodiment, the two hydraulic cylinders 2234 could be replaced by a single telescoping cylinder having two stages.

TABLE 13

Pressures and Volumes for Two Double-Acting Air Cylinders and Two Hydraulic Cylinders Attached via Common Bar.

| 2 Air Cylinders, 2 hydraulic cylinders | | | Int. Ratio | 48 | Acc. Ratio | 1 | | |
|---|---|---|---|---|---|---|---|---|
| Input Air | Air pressures in cylinders (psi) | | | | Hydraulic Fluid pressures at motor (psi) | | | |
| Pressure | Accumulator | | Stage 1a | | Stage 1b | | Forces (lbs) | |
| (psi) | Start | End | Start | End | | | AirCyl0 | AirCyl1 |
| 3000 | 3000.0 | | 2363.4 | | | | 106383.5 | |
| 785 | 785.0 | 785 | | 633.7 | 2738.2 | | 27450.2 | |
| 255 | 255.0 | 255.0 | 2636.2 | | | 899.4 | 8563.3 | 109181.8 |
| 61.57 | 61.6 | 61.6 | | 526.0 | 2264.4 | | | 21295.0 |
| 20 | 20 | | | | | 269.1 | | 2408.1 |

TABLE 13-continued

Pressures and Volumes for Two Double-Acting Air Cylinders and Two Hydraulic Cylinders Attached via Common Bar.

| VOLUMES | Max P | Min P | Max P | Min P | | | Diameter for X length |  |
|---|---|---|---|---|---|---|---|---|
| Initial Volume | 4999.5 | 1159.7 | 5002.6 | 1168.5 | | | | |
| 4 Liters (at max pressure) | 340.1 | 78.9 | 340.3 | 79.5 | | | X = | 2.2 |
| Final Volume = air side of | | | | | | | (m) | (in) |
| Air Cylinder #2 | | | | | | | | |
| 600 Liters | OVERALL | | | | Minimum | | 0.58928 | 24.1 |
| Air Side of Air Cylinder #1 | Min P | Max P | Max Ratio | | Displacement | | | |
| 47.1 Liters | 1159.7 | 5002.6 | 4.3 | | 23% | | 0.16503 | 6.7 |
| Volume of Hydraulic Cylinder #1 | | | | | | | | |
| 12.5 Liters | | | | | | | 0.08505 | 3.5 |
| Volume of Hydraulic Cylinder #2 | | | | | | | | |
| 42.5 Liters | | | | | | | 0.15683 | 6.4 |
| Intensifier ratio a | 3.76 | | | | | | | |
| Intensifier ratio a | 48.00 | | | | | | | |
| Intensifier ratio a | 0.86 | | | | | | | |
| Intensifier ratio a | 10.91 | | | | | | | |

| 2 Air Cylinders, 2 hydraulic cylinders | | | | | | | | | |
|---|---|---|---|---|---|---|---|---|---|
| Input Air Pressure | Air pressures in cylinders (psi) Accumulator | | | Forces (lbs) | | | | | |
| (psi) | Start | End | Total Force (lbs) | HydCyl1 | HydCyl2 | | Newtons | Power | vel (m/s) |
| 3000 | 3000.0 | | 215565.3 | 48992.1 | 166573.2 | Stage1a start | 957109.8 | 1.10E+05 | 0.11 |
| 785 | 785.0 | 785 | 48745.3 | 11078.47 | 37666.81 | Stage1a end | Newtons | Power | vel (m/s) |
| 255 | 255.0 | 255.0 | | 48745.3 | | Stage1b start | 48712.86 | 1.10E+05 | 2.26 |
| 61.57 | 61.6 | 61.6 | 10971.4 | 10971.4 | | Stage1b end | | | |
| 20 | 20 | | | | | | | | |
| VOLUMES | | | 7.22 ft | | | | | | |
| Initial Volume | | | 86.61 in | *stroke factor 0.7 used | | | | | |
| 4 Liters (at max pressure) | | | meters | 60.6 | | | | | |
| Final Volume = air side of | | | | rod | Area | | | | |
| Air Cylinder #2 | | | | (in) | ratio | | | | |
| 600 Liters | | | | 4 | 0.97 | | | | |
| Air Side of Air Cylinder #2 | | | | | | | | | |
| 47.1 Liters | | | | 4 | 0.65 | | | | |
| Volume of Hydraulic Cylinder #1 | | | | | | | | | |
| 12.5 Liters | | | | 3 | 0.25 | | | | |
| Volume of Hydraulic Cylinder #2 | | | | | | | | | |
| 42.5 Liters | | | | 4.5 | 0.51 | | | | |
| Intensifier ratio a | 3.76 | | | | | | | | |
| Intensifier ratio a | 48.00 | | | | | | | | |
| Intensifier ratio a | 0.86 | | | | | | | | |
| Intensifier ratio a | 10.91 | | | | | | | | |

FIG. 22B depicts a system/arrangement 2250 using two double-acting air cylinders 2282 with non-trivial rod diameters and two hydraulic cylinders 2234 attached via a common bar 2236. The two air cylinders 2282 bore diameter and rod diameter are selected such that they act as four air stages and are always driving in this arrangement 2250. The forces from the air cylinders 2282 are mechanically coupled to drive the two hydraulic cylinders 2234 and controlled via valves 2203 to vary the intensification ratio by varying effective piston area. There are four air stages and three computer-actuated hydraulic valves 2203. In one embodiment, a 3,000 psi air cylinder is used. If 3,000 psi accumulators are needed, a single air cylinder could be replaced by a hydraulic cylinder and one accumulator. In a particular embodiment, the system could have switching points of approximately 855, 325, and 80 psi (assuming a 20 psi venting pressure). The hydraulic fluid pressure profile would vary between approximately 5,000 psi and 1,750 psi, or a 2.5:1.0 change. The operating characteristics of this arrangement 2250 are shown in Table 14 and represent four air stages per expansion from 3,000 psi to atmospheric pressure. The minimum hydraulic fluid pressure is 1,750 psi. In another embodiment, the two hydraulic cylinders 2214 could be replaced by a single telescoping cylinder having two stages.

TABLE 14

Pressures and Volumes for Two Double-Acting Air Cylinders serving as four air stages
and Two Hydraulic Cylinders Attached via Common Bar.

| 2 double acting Oil Cylinder, 2 double acting Air Cylinders Scheme (with 4 air pressure ranges) | | | | | | | | | | | Booster Ratio 2 | 1 |
|---|---|---|---|---|---|---|---|---|---|---|---|---|
| | Air pressures in cylinders (psi) | | | Hyd. Fluid pressures in cylinders (psi) | | | | | | | | |
| Input Air | Accumulator | | | Stage 1 | | Stage 2 | | Stage 3 | | Stage 4 | | |
| Pressures (psi) | Start | End | | Start | End | Start | End | Start | End | Start | End | |
| 3000 | 3000.0 | | | 1896.3 | | | | | | | | |
| 1600 | 1600.0 | 1600.0 | | | 884.7 | 2003.3 | | | | | | |
| 855 | 855.0 | 855.0 | | | | | 1077.4 | 1237.8 | | | | |
| 608.19 | 608.2 | 608.2 | | | | | | | 1072.7 | 2433.1 | | |
| 325 | 325.0 | 325.0 | | 2311.6 | | | | | | | 1307.0 | |
| 149.71 | 149.7 | 149.7 | | | 1067.3 | 2420.7 | | | | | | |
| 80 | 80 | 80.0 | | | | | 1300.4 | 2452.2 | | | | |
| 37.43 | 37.4 | 37.4 | | | | | | | 855.7 | 1937.0 | | |
| 20 | 15 | 20 | | | | | | | | | 443.3 | |
| | | 15 | 15 | | | | | | | | | |
| VOLUMES | | 15 | | Max P | Min P | Max P | Min P | Max P | Min P | Max P | Min P | |
| Initial Volume | | | | 4207.9 | 1952.0 | 4424.0 | 2377.8 | 3690.0 | 1928.4 | 4370.1 | 1750.3 | |
| 4 Liters (at max pressure) | | | | 286.2 | 132.8 | 301.0 | 161.8 | 251.0 | 131.2 | 297.3 | 119.1 | |
| Final Volume = air side of last air cylinder | | | | | | | | | | | | |
| 600 Liters | | | | OVERALL | | | | | | | | |

| | | | | | | | Minimum | | |
|---|---|---|---|---|---|---|---|---|---|
| Volume of hydraulic cylinder #1 | | | Min P | Max P | Max Ratio | | Displacement | | |
| 7 Liters | | | 1750.3 | 4424.0 | 2.53 | | 39.6% | | |
| Volume of hydraulic cylinder #2 | | | | | | | | | |
| 9 Liters | | | Length | | Diameter of cylinder | | | Diameter of Rod | |
| Air Cylinder0 Air Volume | 14.04 | Liters | 3.0 meters | | | | | 0.0986 m | 3.88 in |
| Air Cylinder0 ratio | 2.01 | | | | | | | | |
| AC0 ratio2 | 0.88 | | | | | | | | |
| Air Cylinder1 air volume | 36.92 | Liters | 3.0 meters | | 0.13 m | | 4.93 in | | |
| Air Cylinder1 ratio | 5.27 | | | | | | | | |
| AC1 ratio2 | 2.31 | | | | | | | | |
| Air Cylinder1 air volume | 150 | Liters | 3.0 meters | | | | | 0.437 m | 17.21 in |
| Air Cylinder2 ratio | 21.43 | | | | | | | | |
| AC2 ratio2 | 9.38 | | | | | | | | |
| Air Cylinder3 air volume | 600 | Liters | 3.0 meters | | 0.50 m | | 19.87 in | | |
| Air Cylinder3 ratio | 85.71 | | | | | | | | |
| AC3 ratio2 | 37.5 | | | | | | | | |

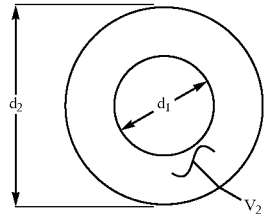

$V_1 = \pi * d_1^2/4 * L$
$V_2 = \pi * d_2^2/4 * L$
$V_3 = V_2 - V_1$
$V_3 = V_2 - (\pi * d_1^2/4 * L)$
$d_1^2 = 4(V_2 - V_3)/\pi L$

Additional alternative embodiments of compressed air energy storage and recovery systems are described with respect to FIGS. 23-30. Generally, the systems depicted are two-stage systems with two different size accumulators; however, any of these systems could be easily modified to have more than two stages by adding additional accumulator circuits (see, for example, FIGS. 2-22).

Figure 23:
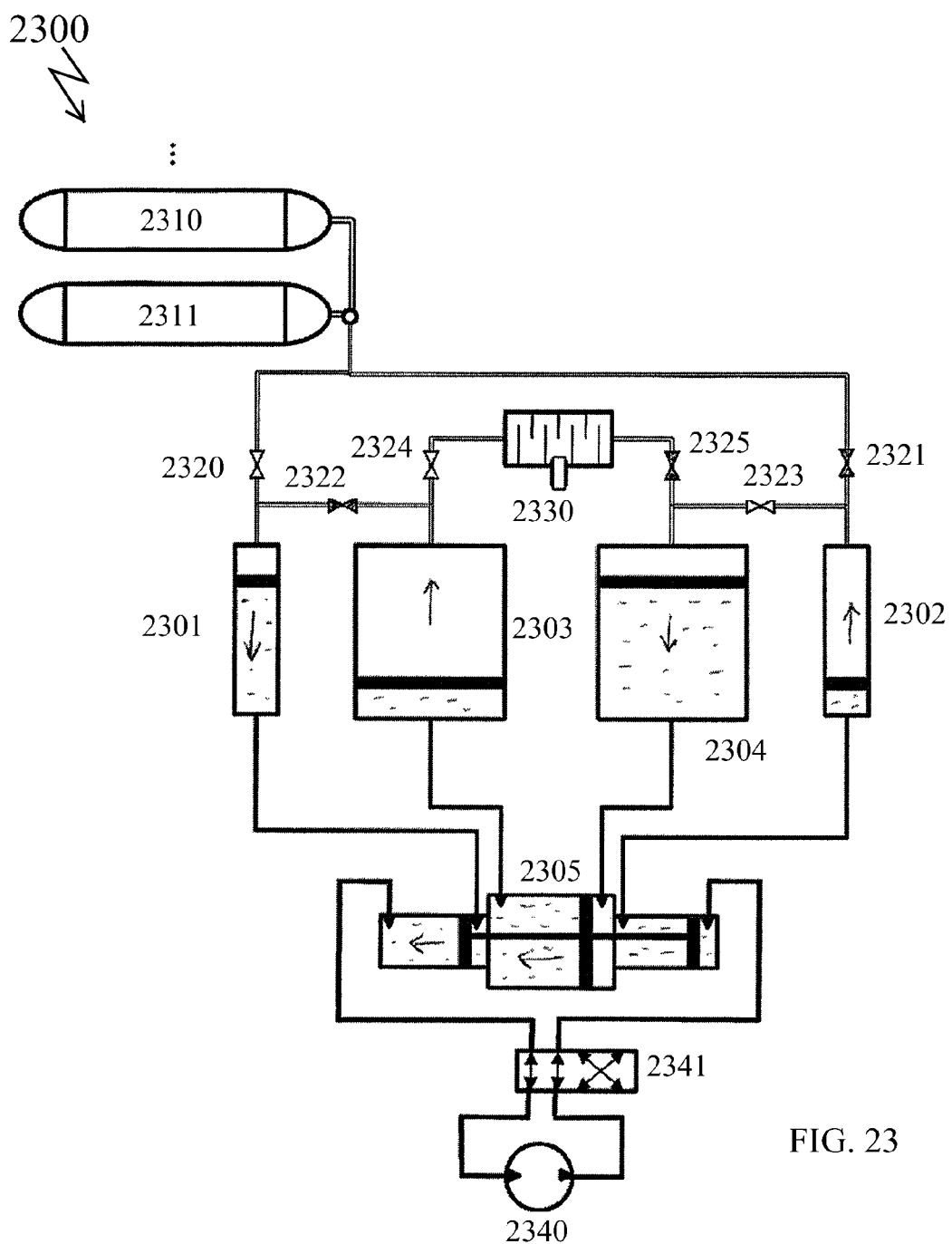
FIG. 23 is a schematic diagram of the major components of an alternative system for compressed gas energy storage and recovery using staged hydraulic conversion.

FIG. 23 is a schematic diagram of the major components of another system 2300 for compressed gas energy storage and recovery using staged hydraulic conversion. The system 2300 includes two high pressure (e.g., 3,000 to 300 psi) accumulators 2301, 2302 and two low pressure (e.g., 300 to 30 psi) accumulators 2303, 2304. In this example, the accumulators are shown as piston-based; however, other accumulator separation means, such as bladders and bellows may also be used. The low pressure accumulators 2303, 2304 are volumetrically larger than the high pressure accumulators 2301, 2302 such that a small volume of high pressure compressed air admitted into high-pressure accumulators 2301, 2302, will be able to subsequently expand to nearly atmospheric pressure in the low pressure accumulators 2303, 2304. In the example pressure ranges above (3,000 to 300 psi and 300 to 30 psi) the low pressure accumulators 2303, 2304 would be 10 times larger than high-pressure accumulators 2301, 2302. The accumulators 2301-2304 have an air side and hydraulic fluid side, with the hydraulic fluid indicated with dashed lines. The hydraulic input/output ports of the accumulators 2301-2304 are all connected to different ports of a double-ended hydraulic booster 2305. The relative volume of the larger center cylinder as compared with each of the two end cylinders of the hydraulic booster 2305 is the same as the relative volume of the low pressure accumulators 2303, 2304 to the high pressure accumulators 2301, 2302. In the example pressure ranges above (3,000 to 300 psi and 300 to 30 psi), the center cylinder of the hydraulic booster 2305 would have a volume (and cross-sectional area, since the lengths are equal) 10 times larger than one of the end cylinders. The compressed gas energy storage and recovery system also consists of high pressure gas storage vessels 2310, 2311 that are connected to the high pressure accumulators 2301, 2302 via pneumatic lines with computer controlled valves 2320, 2321. In addition, high pressure accumulator 2301 is connected to low pressure accumulator 2303 via pneumatic lines with a computer controlled valve 2322 and high pressure accumulator 2302 is connected to low pressure accumulator 2304 via pneumatic lines with a computer controlled valve 2323. Low pressure accumulators 2303 and 2304 are both connected to a vent to the environment via pneumatic lines with computer controlled valves 2324 and 2325, respectively. The two ends of the hydraulic booster 2305 are connected to a fixed displacement hydraulic pump/motor 2340 via directional valve 2341 that may be attached to an electric motor generator and power electronics (not shown).

The system 2300 for compressed gas energy storage and recovery using staged hydraulic conversion shown in FIG. 23 is designed to operate both as a compressor and expander. In compression mode, gas is drawn in from the environment at atmospheric pressure and compressed in batches up to a storage pressure, where it is forced into storage vessels 2310, 2311 until a maximum pressure/storage capacity is reached (e.g., 3,000 psi). In expansion mode, small batches of high pressure gas from the storage vessels are expanded within the system, generating usable power. The expanded gas is vented to the environment.

The system 2300 as shown in FIG. 23 is in an expansion state where a small batch of high pressure air is being admitted to accumulator 2301 through the momentarily opened valve 2320. In this figure, valves with no shading are indicated as open (fluid flow allowed), while shaded valves are indicated as closed. Valve 2320 is opened for an amount of time sufficient to admit a specific volume of high pressure air from the high pressure gas storage vessels 2310, 2311, such that when this batch of air expands fully in low pressure accumulator 2303 (after first expanding in high pressure accumulator 2301) it will reach the near atmospheric minimum system pressure (e.g., <30 psi). As the high pressure gas in the high pressure accumulator 2301 expands, high pressure hydraulic fluid is forced into the smaller cylinder of the hydraulic booster 2305, driving the piston assembly leftward as indicated by the arrows. In addition, high pressure air that was admitted to high pressure accumulator 2302 has now reached a mid-pressure (e.g., 300 psi) and is now allowed to expand from the high pressure accumulator 2302 into the low pressure accumulator 2304 through valve 2323. Expanding gas into low pressure accumulator 2304 forces fluid at mid-pressure into the larger cylinder of the hydraulic booster 2305, intensifying and adding its force to that provided by the expansion in high pressure accumulator 2301. As the piston assembly in the hydraulic booster 2305 moves leftward, fluid is forced out of the cylinder as indicated into the high pressure accumulator 2302, refilling it, and into the low pressure accumulator 2303, refilling it. As fluid refills the low pressure accumulator 2303, the fully expanded atmospheric air in the low pressure accumulator 2303 is vented to the environment through valve 2324 and the vent 2330. Additionally, as the piston assembly in the hydraulic booster 2305 moves leftward, high pressure hydraulic fluid is forced through a hydraulic pump/motor 2340 generating useful power. When the high pressure accumulator 2301 and the low pressure accumulator 2304 reach the bottom of their stroke, and likewise the high pressure accumulator 2302 and the low pressure accumulator 2303 reach the top of their stroke, the direction of all cylinders, including booster 2305, is reversed. At that time, valves 2324 and 2323 are closed (valve 2320 is already closed) and valves 2322, 2325, and 2321 are opened, allowing a new batch of gas into the high pressure accumulator 2302, allowing now mid-pressure gas to expand from high pressure accumulator 2301 to the low pressure accumulator 2303, and allowing the low pressure accumulator 2304 to vent to the atmosphere. At that time, a hydraulic four-way two-position valve 2341 is shifted such that as hydraulic booster 2305 drives in the opposite direction, the pump/motor 2340 continues to rotate in the same direction. In this way, compressed gas is expanded in batches in a cyclical fashion generating useful power through the pump/motor 2340. In a similar fashion, the system 2300 can be run in reverse in compression mode, pressurizing and forcing gas into pressure vessels 2310 and 2311.

Figure 24:
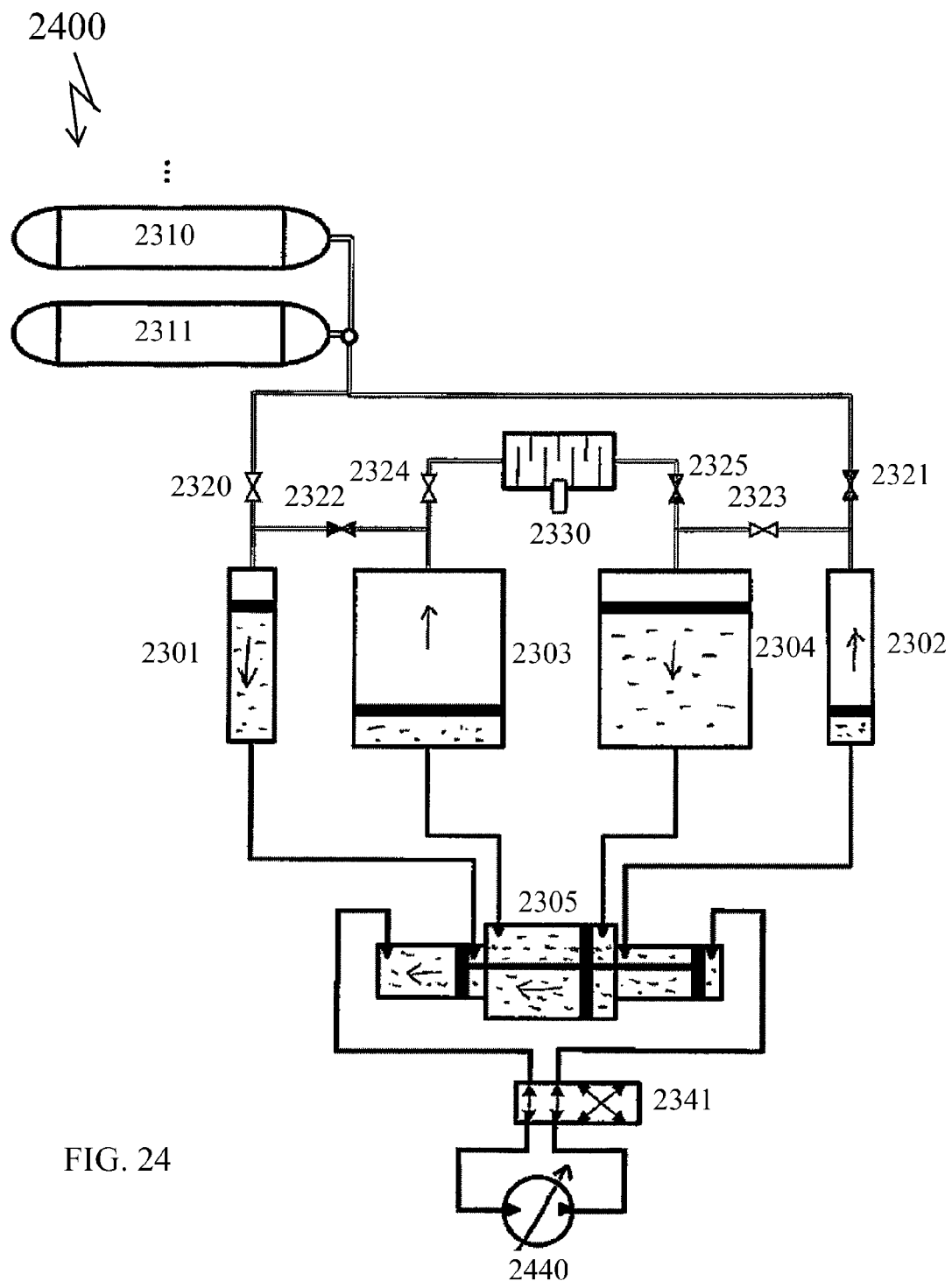
FIG. 24 is an alternative embodiment of the system of FIG. 23, illustrating the implementation of a variable displacement hydraulic pump/motor.

FIG. 24 is a substantially the same arrangement as the system of FIG. 23, but illustrating the implementation of a variable displacement hydraulic pump/motor 2440 in place of the fixed displacement pump/motor 2340 in FIG. 23. The system 2300 illustrated in FIG. 23 provides a varying pressure profile to the hydraulic pump/motor 2340. For the fixed-displacement pump/motor shown in FIG. 23, torque is proportional to pressure. With active control through power electronics, as torque decreases the load can be altered such that hydraulic flow rate and pump/motor RPM increase, keeping a constant power output (i.e., as torque decreases, RPM is increased proportionally, keeping power constant). In this fixed displacement pump/motor design, the electric motor/generator operates over a range of torque and RPM, lowering efficiency a few percentage points and requiring full power electronics for grid connection.

As detailed in the '084 application incorporated herein, the use of a variable displacement pump/motor, as shown in FIG. 24, in combination with a system for compressed gas energy storage and recovery with staged hydraulic conversion allows for operation over a broad pressure range while maintaining nearly constant RPM, torque, and power. With a constant shaft speed set by line frequency (e.g., an 1800 RPM synchronous motor/generator), a feedback control loop governing the hydraulic pump/motor displacement allows a user to target and control the output power. By operating at constant RPM and torque, the electric motor/generator efficiency is maximized. Additionally, the motor/generator can be coupled directly to the utility grid, removing the need for full power electronics.

Figure 25:
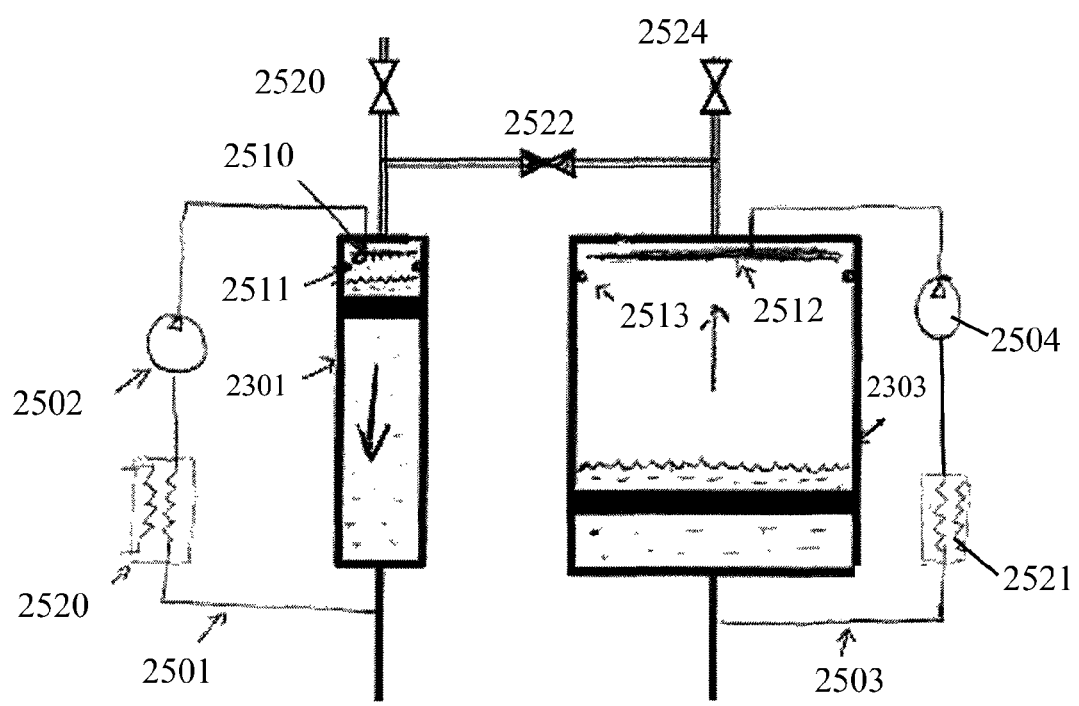
FIG. 25 is a schematic diagram of the low and high pressure accumulator portion of the systems of FIGS. 23 and 24, illustrating a method for expediting heat transfer to the low pressure and high pressure accumulators.

FIG. 25 is an enlarged schematic diagram of the low and high pressure accumulator portion of the systems shown in FIGS. 23 and 24, illustrating a system 2501 for expediting heat transfer to the low pressure and high pressure accumulators 2301-2304, where the heat transfer fluid is the same as the hydraulic fluid. In this figure, only accumulators 2301 and 2303 are shown for illustrative purposes. In this system 2501 for expediting heat transfer, a portion of the hydraulic fluid from the high pressure accumulator 2301 and low pressure accumulator 2303 is pumped using a fluid circulator 2502, 2504 into the gas side of the respective accumulator. The fluid circulators 2502, 2504 must be able to withstand high and mid-pressures respectively, but need only provide a small change in pressure, enough to circulate the fluid, thus requiring relatively low power. The hydraulic fluid is sprayed throughout the gas volume of the gas side of the accumulator through the use of a spray head 2510, 2512, in order to maintain the temperature of the expanding or compressing gas at nearly the temperature of the sprayed fluid. The sprayed fluid accumulates within the cylinder on top of the piston (or bladder or bellows) during the spray and is removed at low pressure at the end of the return stroke. For a piston based accumulator, as illustrated, a stop (or lip) 2511, 2513, within the cylinder prevents the piston from contacting the spray head 2510, 2512 at the end of the return stroke. To maintain the hydraulic fluid at a nearly constant temperature, the fluid is passed through a heat exchanger 2520, 2521. The other side of the heat exchanger may be attached to an environmental heat exchanger at ambient temperature, or to some other source of thermal energy (e.g., waste heat from a power plant).

Figure 26:
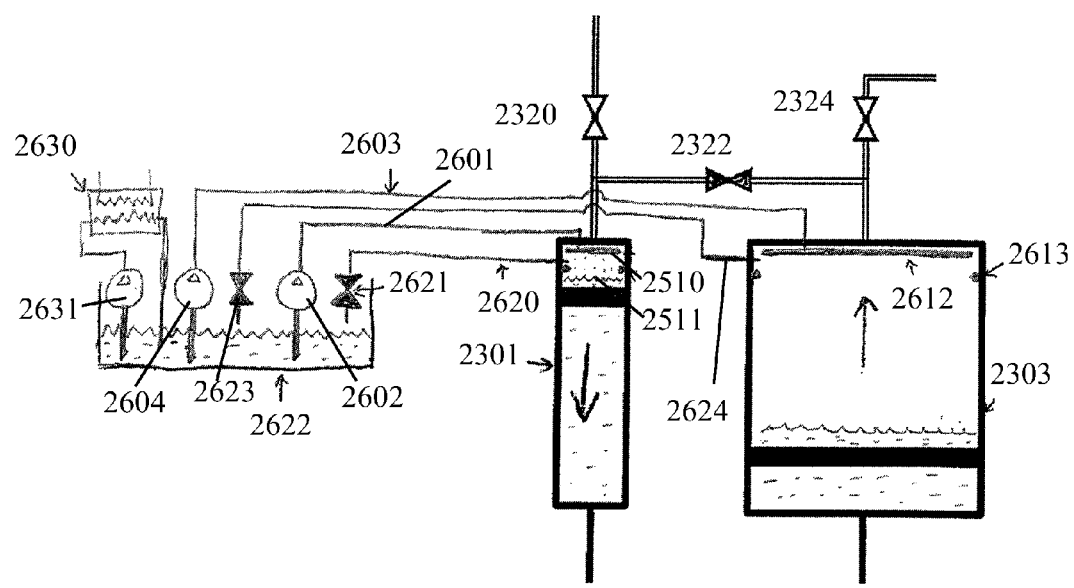
FIG. 26 is a schematic diagram of the low and high pressure accumulator portion of the systems of FIGS. 23 and 24, illustrating an alternative method for expediting heat transfer to the low pressure and high pressure accumulators.

FIG. 26 is an enlarged schematic diagram of the low and high pressure accumulator portion of the systems shown in FIGS. 23 and 24, illustrating an alternative system 2601 for expediting heat transfer to the low pressure and high pressure accumulators 2301-2304, where the heat transfer fluid is not the same as the hydraulic fluid. In this figure, only accumulators 2301 and 2303 are shown for illustrative purposes. In this system 2601 for expediting heat transfer, the heat exchange fluid is kept separate from the hydraulic fluid via the accumulator separation method (e.g., piston). Heat exchange fluid from a reservoir 2622, is pumped into the gas sides of the high pressure accumulator 2301 and the low pressure accumulator 2303 using fluid pumps 2602, 2604. The fluid pumps 2602, 2604 provide pumping power to raise the heat transfer fluid to high and mid-pressures respectively; the pumping power, however, is substantially offset because the fluid takes up volume in the gas space of the accumulators 2301, 2303. (In compression mode, the fluid being pumped into the gas side effectively compresses the gas, whereas in expansion mode, the fluid being pumped into the gas side increases the amount of fluid being forced through the motor for a given volume of gas.) The heat transfer fluid is sprayed throughout the volume of the accumulator through the use of the spray heads 2510, 2512, in order to maintain the temperature of the expanding or compressing gas at nearly the temperature of the sprayed fluid. The sprayed fluid accumulates within the cylinder on top of the piston (or bladder or bellows) during the spray and is removed at low pressure at the end of the return stroke. Removal of the liquid at the end of the stroke can be achieved through the spray heads 2510, 2512, or, as illustrated here, through additional ports and return lines 2620, 2624 controlled via valves 2621 and 2623, respectively. For a piston based accumulator, as illustrated, the stops (or lips) 2511, 2513, within the cylinders prevent the pistons from contacting the spray heads 2510, 2512 at the end of the return stroke. To maintain the hydraulic fluid at nearly constant temperature, the fluid may be circulated at low pressure through a heat exchanger 2630 using a low pressure circulation pump 2631. The other side of the heat exchanger 2630 may be attached to an environmental heat exchanger at ambient temperature, or to some other source of thermal energy (e.g., waste heat from a power plant).

Figure 27:
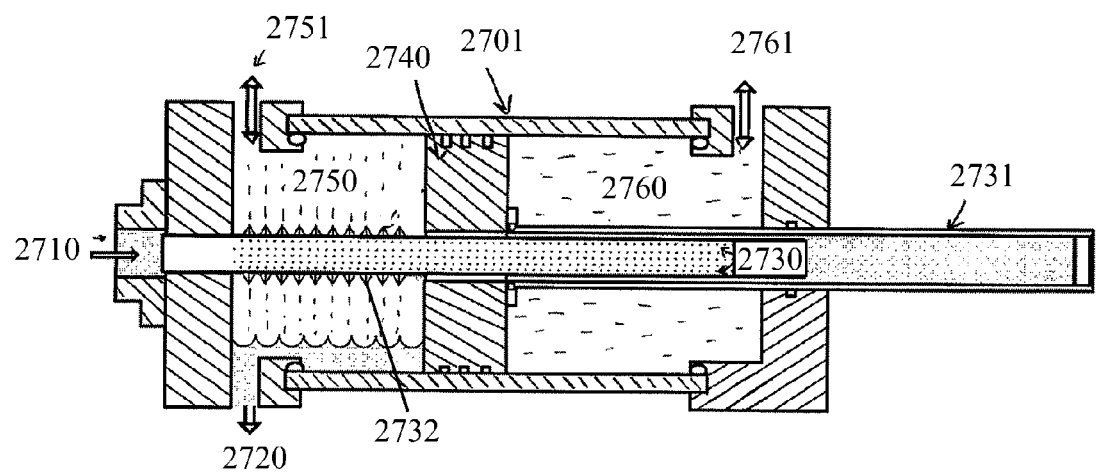
FIG. 27 is a schematic diagram of an alternative accumulator for use in the systems of FIGS. 23 and 24, illustrating another alternative method for expediting heat transfer to the accumulator.

FIG. 27 is a schematic diagram of an alternative accumulator for use in the systems shown in FIGS. 23 and 24, illustrating a method for expediting heat transfer to the accumulator utilizing a spray rod such that the accumulator can be oriented arbitrarily (i.e., horizontally, vertically or any orientation in between). The accumulators 2301-2304 shown in FIGS. 23-26 must be oriented vertically for effective heat transfer using a spray head. By replacing each accumulator with a cylinder with an integral spray rod, the accumulators 2301-2304 can be oriented in any manner, including, horizontally. As detailed in the '703 application incorporated herein, a spray rod 2730 (e.g., a hollow stainless steel tube with many holes) directs a spray radially outward throughout the air side of the cylinder. The example illustrated here utilizes the common practice of center drilling piston rods 2731 (e.g., for position sensors). As shown in FIG. 27, the spray rod cylinder 2701 consists of a heat transfer fluid injection port 2710 and a removal port 2720. Compressed gas is removed or admitted through an additional port 2751 into the gas side 2750 of the cylinder 2701. The gas side 2750 is separated from the hydraulic fluid side 2760 via the piston 2740. The spray rod 2730 is stationary in the center of the cylinder passing through the center-drilled piston 2740. A center-drilled piston rod 2731 completes the separation of the gas 2750 and hydraulic 2760 sides. Hydraulic fluid is removed or admitted through port 2761. Not shown in FIG. 27 is the heat transfer fluid injection/heat exchange loop, where the heat transfer fluid (e.g., water) is injected at a pressure slightly higher than the gas pressure, through port 2710, and then removed and passed through a heat exchanger. Heat transfer fluid can be continuously removed from the liquid return port 2720 of the air side at pressure, or can be removed at the end of the return stroke at ambient pressure.

Figure 28:
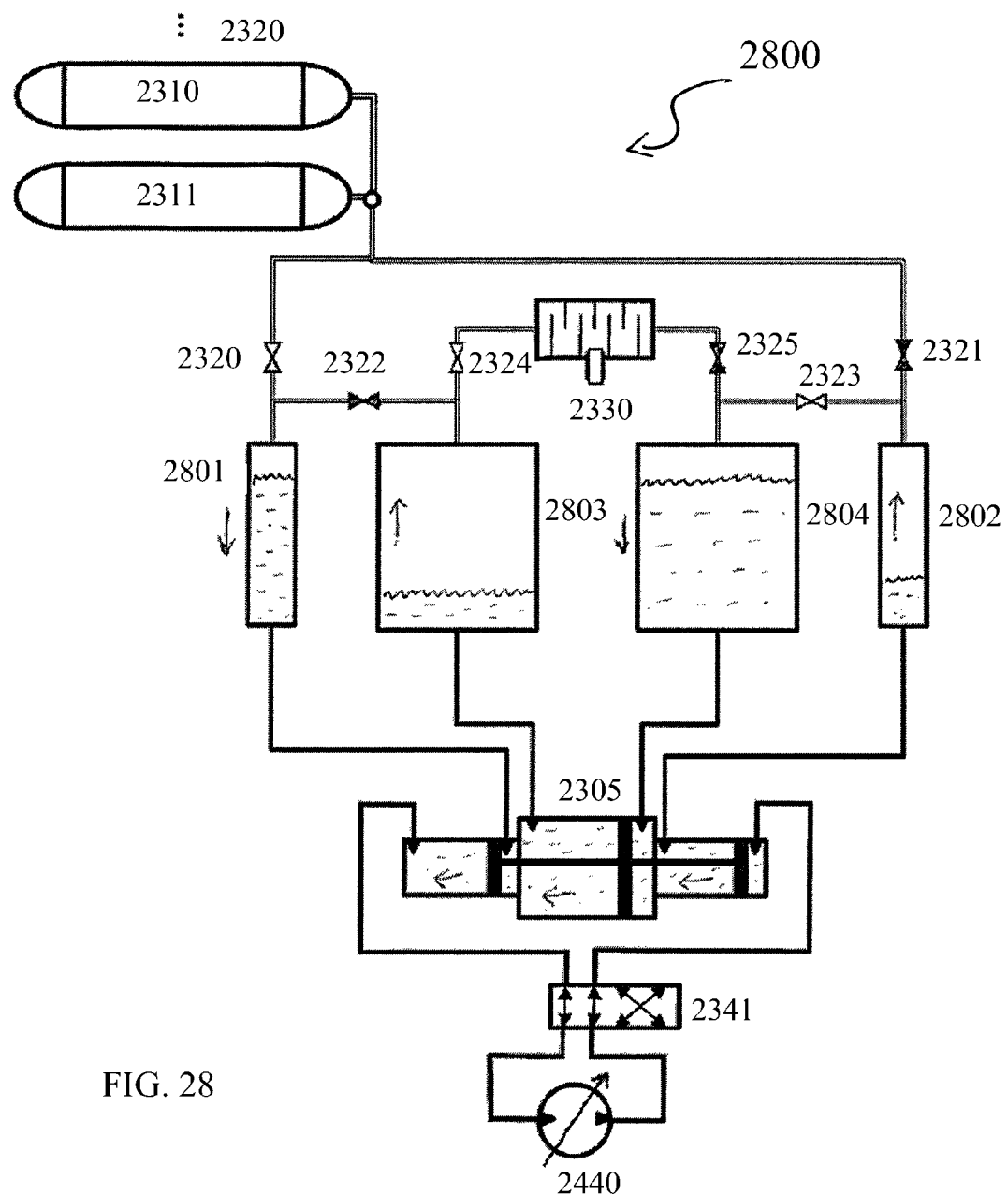
FIG. 28 is another alternative embodiment of the system of FIG. 23, illustrating the use of pistonless accumulators and a variable displacement hydraulic pump/motor.

FIG. 28 is an alternative embodiment of the system of FIG. 24 using pistonless accumulators (i.e., liquid-piston cylinder assemblies) and a variable displacement hydraulic pump/motor. The system shown in FIG. 28 is substantially similar to the system in FIG. 24, except that the two high pressure (e.g., 3000 to 300 psi) accumulators 2801, 2802 and two low pressure (e.g., 300 to 30 psi) accumulators 2803, 2804 are pistonless; that is, the gas is in direct contact with the hydraulic fluid in the pistonless accumulators. This type of accumulator is also called a liquid piston accumulator, where the compressed gas is in direct contact with the hydraulic fluid. Unlike piston-based accumulators, the pressure vessel of liquid piston-based accumulators do not need to be honed cylinders, providing a cost savings advantage. The operation of the system shown in FIG. 28 is otherwise identical to the operation of the systems shown in FIGS. 23 and 24.

Figure 29:
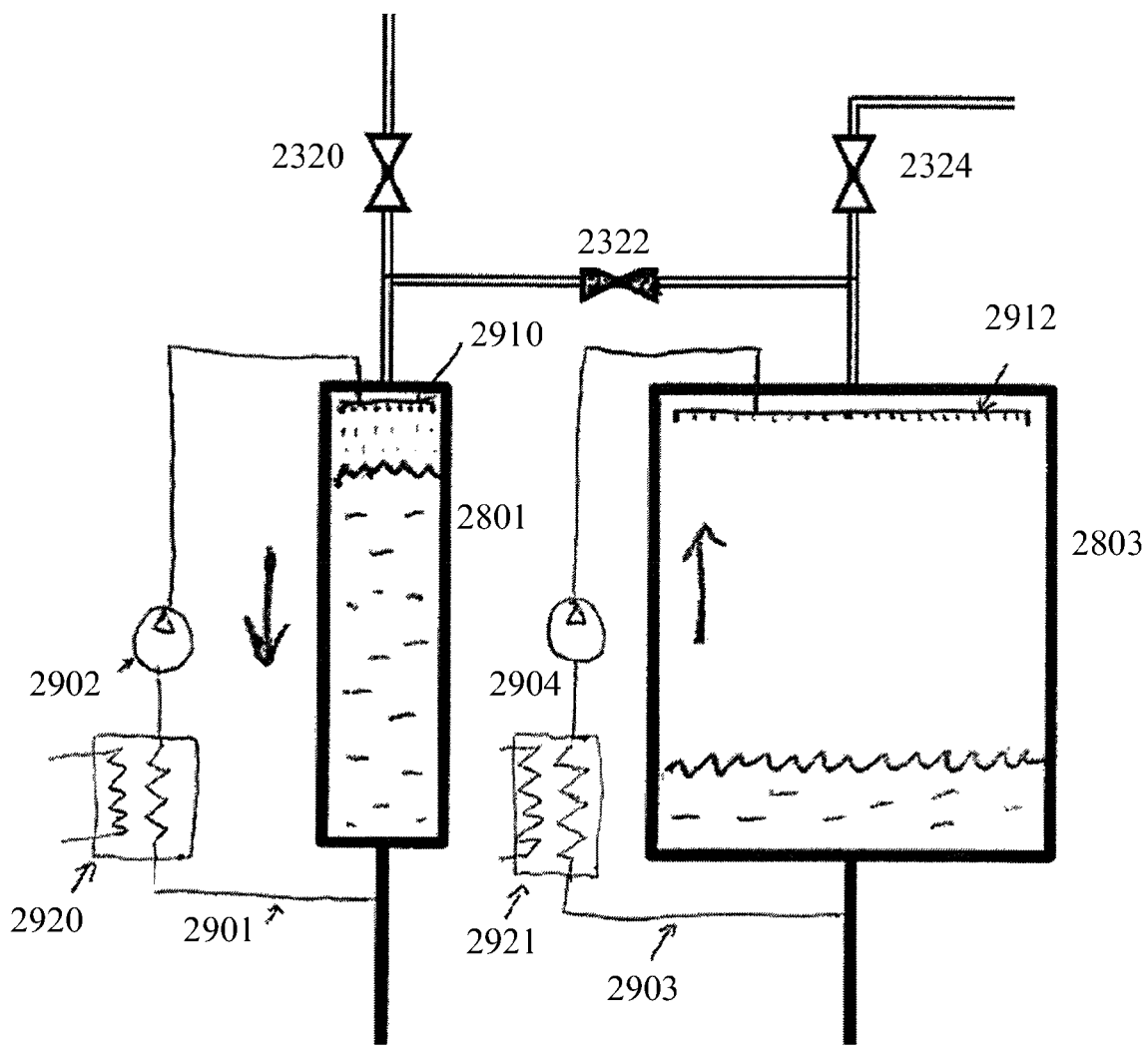
FIG. 29 is a schematic diagram of the low and high pressure accumulator portion of the system of FIG. 28, illustrating a method for expediting heat transfer to the low pressure and high pressure accumulators.

FIG. 29 is an enlarged schematic diagram of the low and high pressure accumulator portion of the system shown in FIG. 28, illustrating a method for expediting heat transfer to the low pressure and high pressure accumulators 2801-2804. In this example, only accumulators 2801 and 2803 are shown for illustrative purposes. In this method for expediting heat transfer, a portion of the hydraulic fluid from the high pressure pistonless accumulator 2801 and the low pressure pistonless accumulator 2803 is circulated using a circulation apparatus such as fluid circulators 2902, 2904 into the gas sides of the accumulators. The fluid circulators 2902, 2904 must be able to withstand high and mid-pressures respectively, but need only provide a small change in pressure, enough to circulate the fluid, thus requiring relatively low power. The hydraulic fluid is sprayed throughout the volume of the accumulator through the use of spray mechanisms such as spray heads 2910, 2912 in order to maintain the temperature of the expanding or compressing gas at nearly the temperature of the sprayed fluid. The sprayed fluid mixes back with the hydraulic fluid in the pistonless accumulators 2801, 2803. To maintain the hydraulic fluid at nearly constant temperature, the fluid is passed through heat exchangers 2920, 2921. The heat exchangers 2920, 2921 may be located in the pump loop as indicated or elsewhere in the circuit. The other side of the heat exchangers 2920, 2921 may be attached to an environmental heat exchanger at ambient temperature, or to some other source of thermal energy (e.g., waste heat from a power plant).

Figure 30:
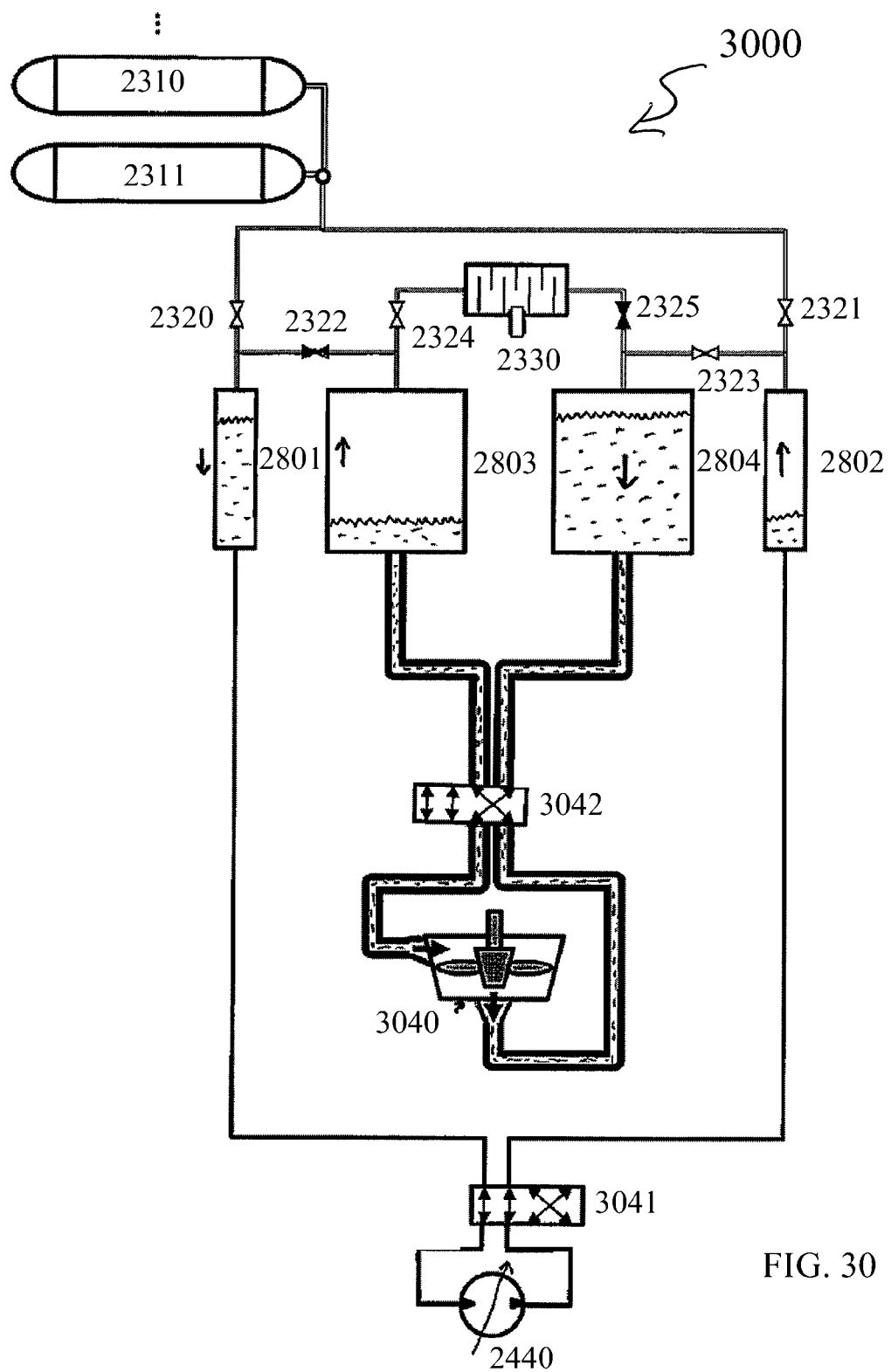
FIG. 30 is an alternative embodiment of the system of FIG. 28, illustrating the use of a low pressure hydraulic turbine in addition to the high pressure variable displacement hydraulic pump/motor.

FIG. 30 is an alternative embodiment of the system of FIG. 28 using pistonless accumulators with a low pressure hydraulic turbine in addition to the high pressure variable displacement hydraulic pump/motor. The system 3000 includes two high pressure (e.g., 3000 to 300 psi) pistonless accumulators 2801, 2802 and two low pressure (e.g., 300 to 30 psi) pistonless accumulators 2803, 2804. In this example, the accumulators 2801-2804 could be pistonless as shown or another form of accumulator such as piston-based or bladder-type. The low pressure accumulators 2803, 2804 are volumetrically larger than the high pressure accumulators 2801, 2802, such that a small volume of high pressure compressed air admitted into the high pressure accumulators 2801, 2802, will be able to expand to nearly atmospheric pressure in the low pressure accumulators 2803, 2804. In the example pressure ranges above (3000 to 300 psi and 300 to 30 psi) the low pressure accumulators 2803, 2804 would be 10 times larger than the high pressure accumulators 2801, 2802. The accumulators 2801-2804 have an air side and a hydraulic fluid side in direct contact with the hydraulic fluid indicated by dashed lines. Hydraulic input/output ports of the high pressure accumulators 2801, 2802 are connected to a variable displacement hydraulic pump/motor 2440 via directional control valve 3041; the variable displacement hydraulic pump/motor operates efficiently at higher pressures (e.g., 300 to 3000 psi) and low to moderate flow (e.g., 50 to 500 gpm). While a variable displacement hydraulic pump/motor is shown in this example, a fixed displacement hydraulic pump/motor could also be used. Hydraulic input/output ports of the low pressure accumulators 2803, 2804 are connected to a low pressure hydraulic turbine 3040, such as a Francis or Kaplan type turbine, via directional control valve 3042. The low pressure hydraulic turbine operates efficiently at lower pressures (e.g., 30 to 300 psi) and moderate to high flow (e.g., 500 to 5000 gpm). The compressed gas energy storage and recovery system 3000 also consists of high pressure gas storage vessels 2310, 2311 that are connected to accumulators 2801 and 2802 via pneumatic lines with computer controlled valves 2320 and 2321. In addition, accumulator 2801 is connected to accumulator 2803 via pneumatic lines with computer controlled valve 2322 and accumulator 2802 is connected to accumulator 2804 via pneumatic lines with computer controlled valve 2323. The low pressure accumulators 2803 and 2804 are both connected to a vent 2330 to the environment via pneumatic lines with computer controlled valves 2324 and 2325, respectively. The hydraulic variable displacement pump/motor 2440 and low pressure hydraulic turbine 3040 may be attached on a single shaft to an electric motor/generator (not shown).

The system for compressed gas energy storage and recovery using staged hydraulic conversion shown in FIG. 30 is designed to operate as both a compressor and expander. In compression mode, gas is drawn in from the environment at atmospheric pressure and compressed in batches up to a storage pressure, where it is forced into storage vessels 2310, 2311 until a maximum pressure/storage capacity is reached (e.g., 3000 psi). In expansion mode, small batches of high pressure gas from the storage vessels are expanded within the system, generating usable power. The expanded gas is then vented to the environment. The system 3000 in FIG. 30 is illustrated in an expansion state where a small batch of high pressure air is being admitted to pistonless accumulator 2801 through the momentarily opened valve 2320. In this schematic, valves with no shading are indicated as open, while shaded valves are indicated as closed. Valve 2320 is opened for an amount of time sufficient to admit a specific volume of high pressure air from the high pressure gas storage vessels 2310, 2311, such that when this batch of air expands fully in the low pressure pistonless accumulator 2803 (after first expanding in accumulator 2801) it will reach the near atmospheric minimum system pressure (e.g., <30 psi). As the high pressure gas in the high pressure pistonless accumulator 2801 expands, high pressure hydraulic fluid is forced through the variable displacement hydraulic pump/motor 2440; this hydraulic fluid at near-atmospheric pressure after passing through the hydraulic pump/motor 2440 is directed to refill the high pressure pistonless accumulator 2802 as indicated by the arrows. In addition, high pressure air that was admitted to the high pressure pistonless accumulator 2802 has now reached a mid-pressure (e.g., 300 psi) and is now allowed to expand from the high pressure pistonless accumulator 2802 into the low pressure pistonless accumulator 2804 through valve 2323. This expanding gas into the low pressure pistonless accumulator 2804 forces fluid at mid-pressure through low pressure from the low pressure pistonless accumulator 2804 through the hydraulic turbine 3040; this hydraulic fluid at near-atmospheric pressure after the hydraulic turbine 3040 is directed to refill the low pressure pistonless accumulator 2803 as indicated by the arrows. As fluid refills the low pressure pistonless accumulator 2803, the fully expanded atmospheric air in the low pressure pistonless accumulator 2803 is vented to the environment through valve 2324 and the vent 2330. When the high pressure pistonless accumulator 2801 and the low pressure pistonless accumulator 2804 reach the bottom of their stroke, and likewise the high pressure pistonless accumulator 2802 and the low pressure pistonless accumulator 2803 reach the top of their stroke, the direction of all cylinders is reversed. At that time, valves 2324 and 2323 are closed (valve 2320 is already closed) and valves 2322, 2325, and 2321 are opened, allowing a new batch of gas into the high pressure pistonless accumulator 2802, allowing now mid-pressure gas to expand from the high pressure pistonless accumulator 2801 to the low pressure pistonless accumulator 2803, and allowing the low pressure pistonless accumulator 2804 to vent to the atmosphere. At that time, a hydraulic four-way two-position valve 3041 is shifted such that as fluid pressure comes from the opposite pressurized line (i.e., accumulator 2802 as opposed to accumulator 2801), the variable displacement pump/motor 2440 continues to rotate in the same direction. Likewise, the hydraulic four-way two-position valve 3042 is shifted such that as fluid pressure comes from the opposite pressurized line (i.e., low pressure pistonless accumulator 2803, as opposed to low pressure pistonless accumulator 2804), the low pressure hydraulic turbine 3040 continues to rotate in the same direction. In this way, compressed gas is expanded in batches in a cyclical fashion generating useful power through the variable displacement pump/motor 2440 and the low pressure hydraulic turbine 3040. In a similar fashion, the system 3000 can be run in reverse in compression mode, pressurizing and forcing gas into pressure vessels 2310, 2311. The heat exchange methods illustrated in FIGS. 24 and 28 can all be implemented with the system 3000 illustrated in FIG. 30.

One possible application for the various systems discussed hereinabove includes a vehicle propulsion system as illustrated in FIGS. 31-36 and described below.

Figure 31:
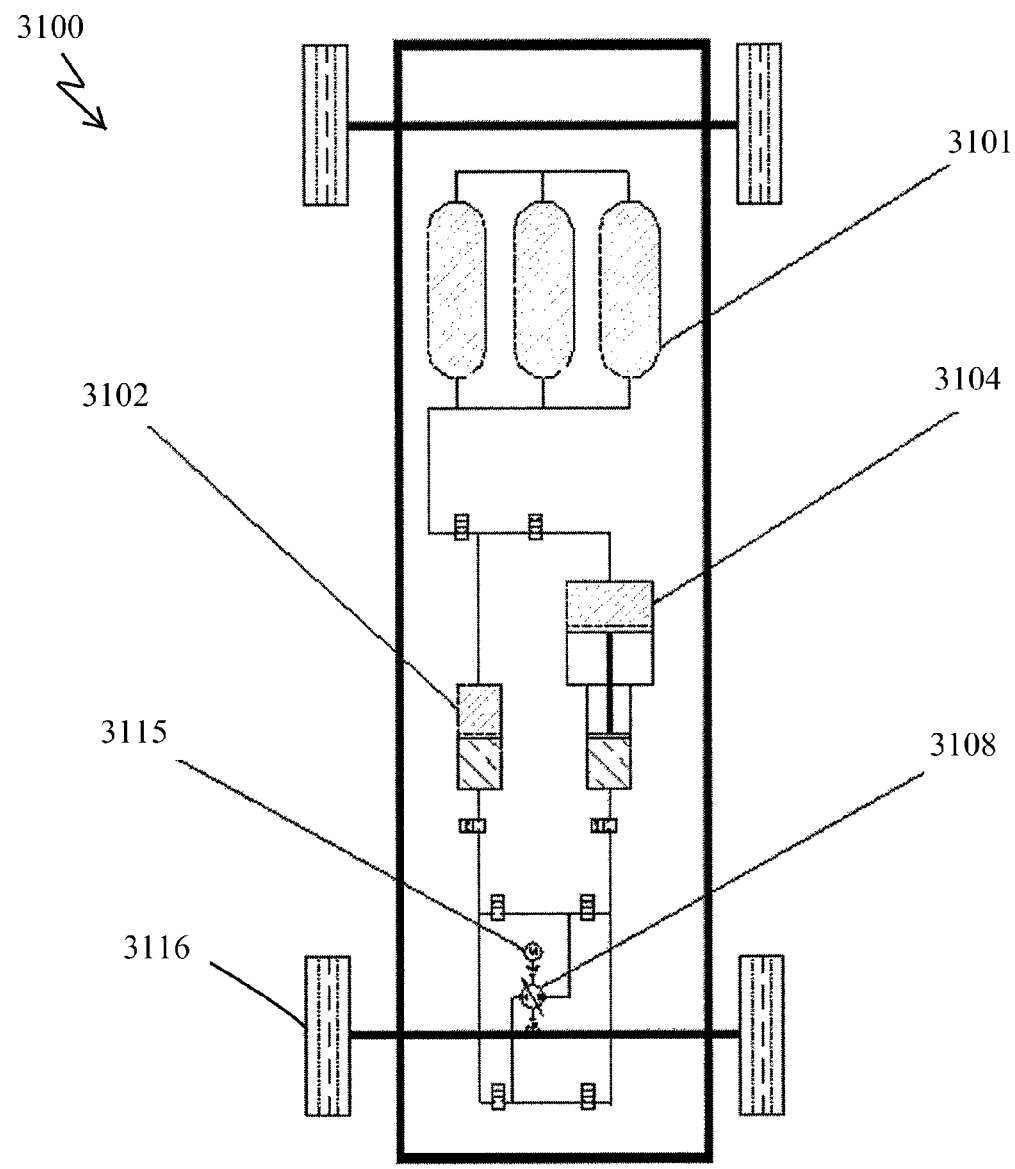
FIG. 31 is a schematic diagram of the major components of a compressed-air vehicle propulsion system and method in accordance with one embodiment of the invention that can use any of the various energy storage and recovery systems described herein.

FIG. 31 is a diagram of an illustrative embodiment of a compressed air vehicle propulsion system 3100 using an open-air staged hydraulic-pneumatic system. FIG. 31 also illustrates an example drive train for truck propulsion and regenerative braking. The major components of the system 3100 include energy stored in the form of compressed air in high pressure storage vessels 3101. Small batches of the high-pressure air are expanded sequentially in a hydraulic accumulator 3102 and a hydraulic intensifier 3104 down to approximately atmospheric pressure and vented. The expanding air in the accumulator 3102 and the intensifier 3104 drives a piston, which forces hydraulic fluid through a variable displacement hydraulic pump/motor 3108 via directional control valve 3110. The pump/motor 3108 is driven as a motor during expansion and provides power to the vehicle wheels 3116 and also can be used to drive an electric generator (alternator) 3115 for electricity for the vehicle. Additionally, the pump/motor 3108 can used for regenerative braking; that is it can be driven as a pump during vehicle braking or coasting to partially re-pressurize the accumulator 3102 and the intensifier 3104, storing some of the vehicle's energy of motion again as compressed air potential energy.

Figure 32:
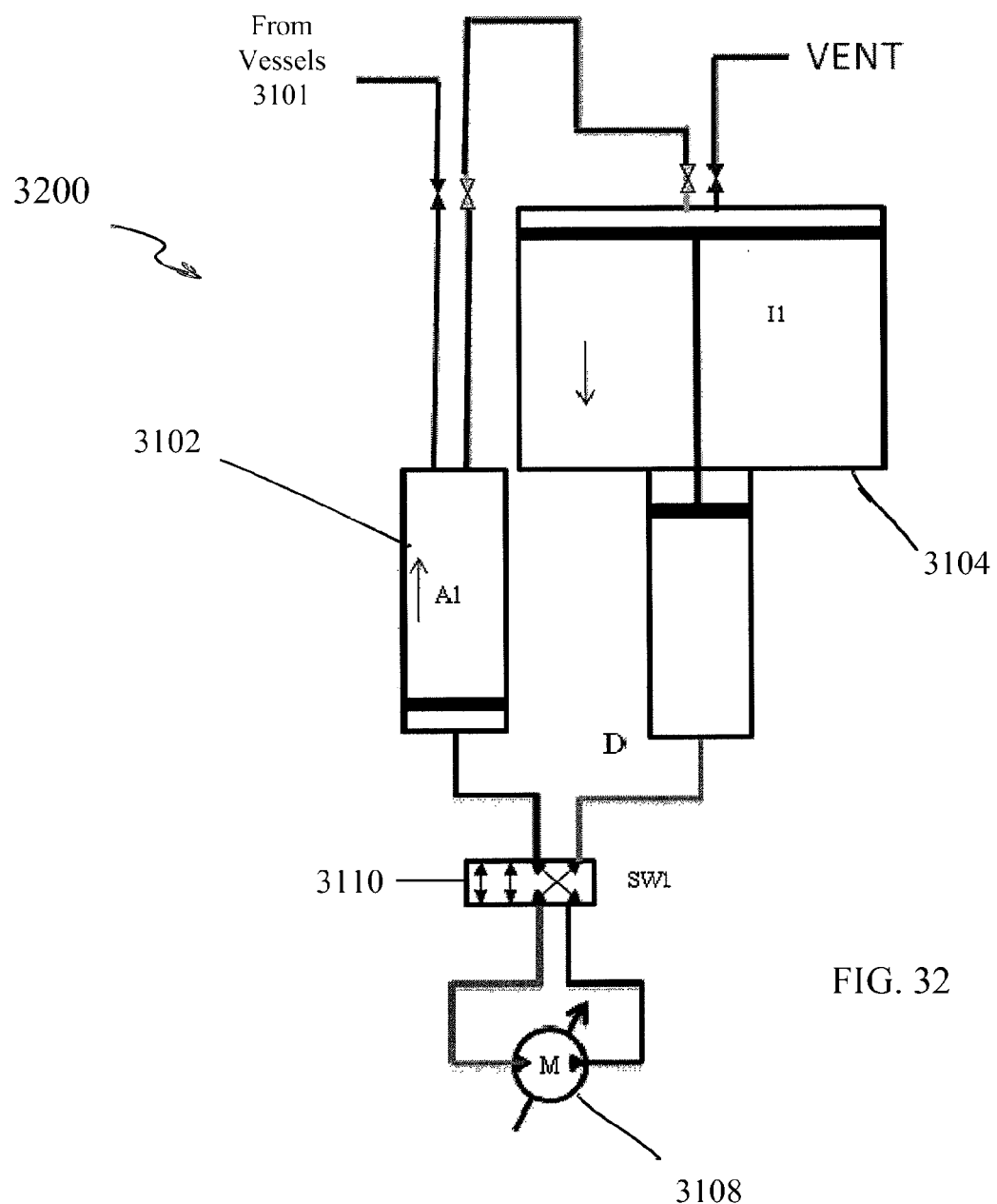
FIG. 32 is a schematic diagram of one embodiment of an open-air staged hydraulic-pneumatic system for use in a compressed-air vehicle propulsion system.

FIG. 32 is a schematic diagram of the major hydraulic-pneumatic components for a compressed-air vehicle propulsion system 3200 using an open-air staged hydraulic-pneumatic system. This diagram is nearly identical to one basic system described in the '057 application. In addition, any of the concepts shown and described in the '057 application can be utilized in the present invention. The system 3200 is shown in a state where mid-pressure compressed air is present in the accumulators 3102 (A1) and is expanding into the larger volume of the intensifier 3104 (I1) forcing fluid from the intensifier I1 through the hydraulic pump/motor 3108 (M1) and back into the accumulator A1. In this setup, the sizing of the intensifier I1 is such that the expanding air reaches atmospheric pressure at the end of the intensifier expansion.

Figure 33:
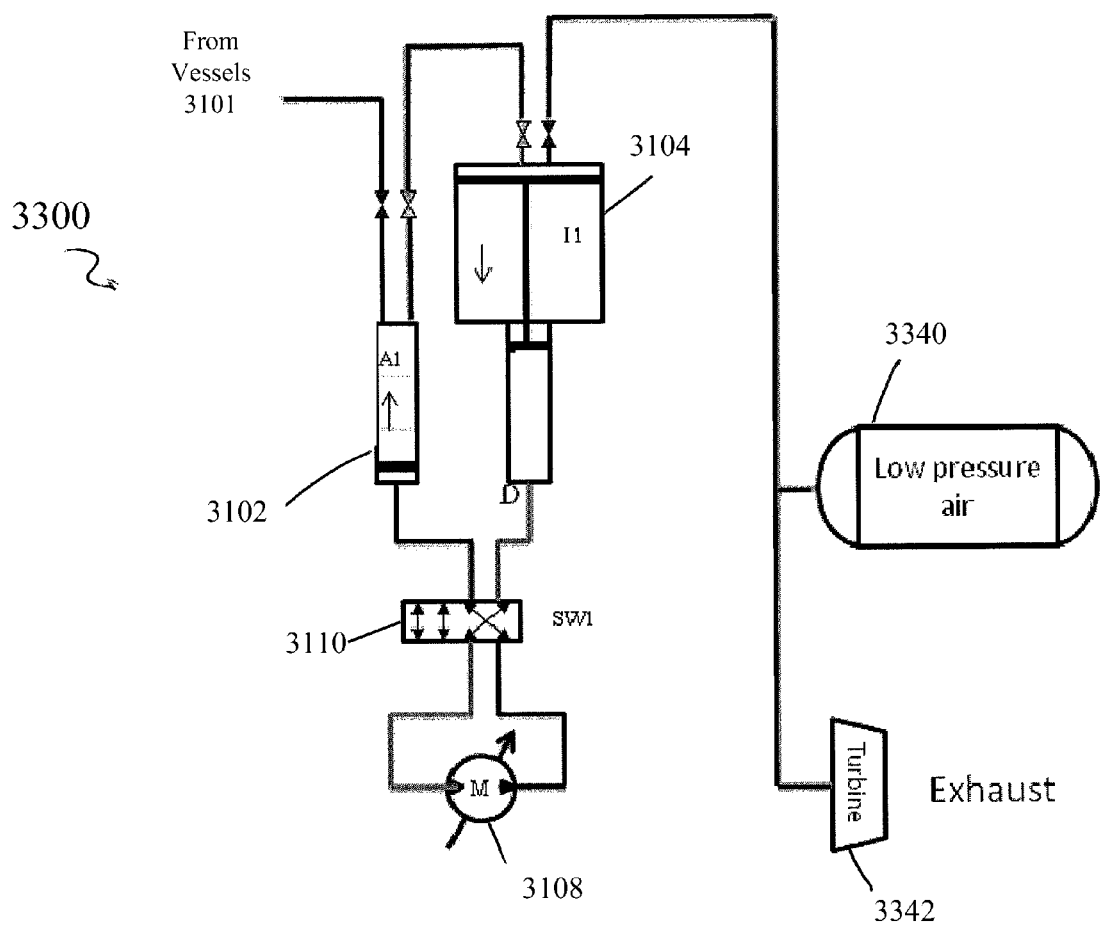
FIG. 33 is a schematic diagram of an alternative embodiment of the open-air staged hydraulic-pneumatic system of FIG. 32 including a low-pressure air turbine for increased power density.

FIG. 33 is a schematic diagram of an alternative embodiment of the system 3200 of FIG. 32. The system 3300 includes a low-pressure air turbine 3342 for increased power density. In this embodiment, air is expanded as in the system shown in FIG. 32, but the final low pressure in the intensifier I1 when cylinder expansion is complete is still substantially above atmospheric pressure (e.g., about 120 psi). Instead of venting this low-pressure air, it is run through an air motor (e.g., a turbine-based air motor 3342), at, for example, a nearly constant rate. The pressure is maintained at a nearly constant pressure with the addition of a low-pressure air tank 3340 and/or by adding a second set of hydraulic cylinders (accumulator and intensifier) operating out of phase with the first set. The low-pressure air can also be used for rapid actuation of valves and other compressed air systems.

The standard final low pressure for the cylinders shown in FIG. 33 is atmospheric pressure (~15 psi). By doubling the final low pressure in the cylinders (~30 psi), the cylinder sizing (volume) is essentially halved, in effect nearly doubling the power density. A second doubling of the final low pressure (~60 psi) would again reduce the cylinder sizing by half. A third doubling of the final low pressure (~120 psi) results in a nearly eight times increase in power density. An overall loss of expansion efficiency occurs, because the air is now expanded nearly adiabatically in the air turbine 3342; yet, by only expanding the air at low pressures (<120 psi), this efficiency loss occurs during a relatively small portion of the expansion from maximum pressure to atmospheric pressure. For example, for a 3000 psi system, over 75% of the energy of a quasi-isothermal expansion is recovered between 3000 psi and 120 psi, with less than 25% of the energy in the final 120 to 15 psi expansion. Running low-pressure air through the air turbine 3342 rather than expanding it to near-atmospheric pressure in larger cylinders offers a trade-off, i.e., increased power density with a loss of overall expansion efficiency. Choosing how to handle this potential trade-off is part of the design optimization process. Initial gas-bottle pressure affects this trade-off, as well as changing the volumetric energy density (and thus driving range for a given air storage volume) of the system.

Figure 34:
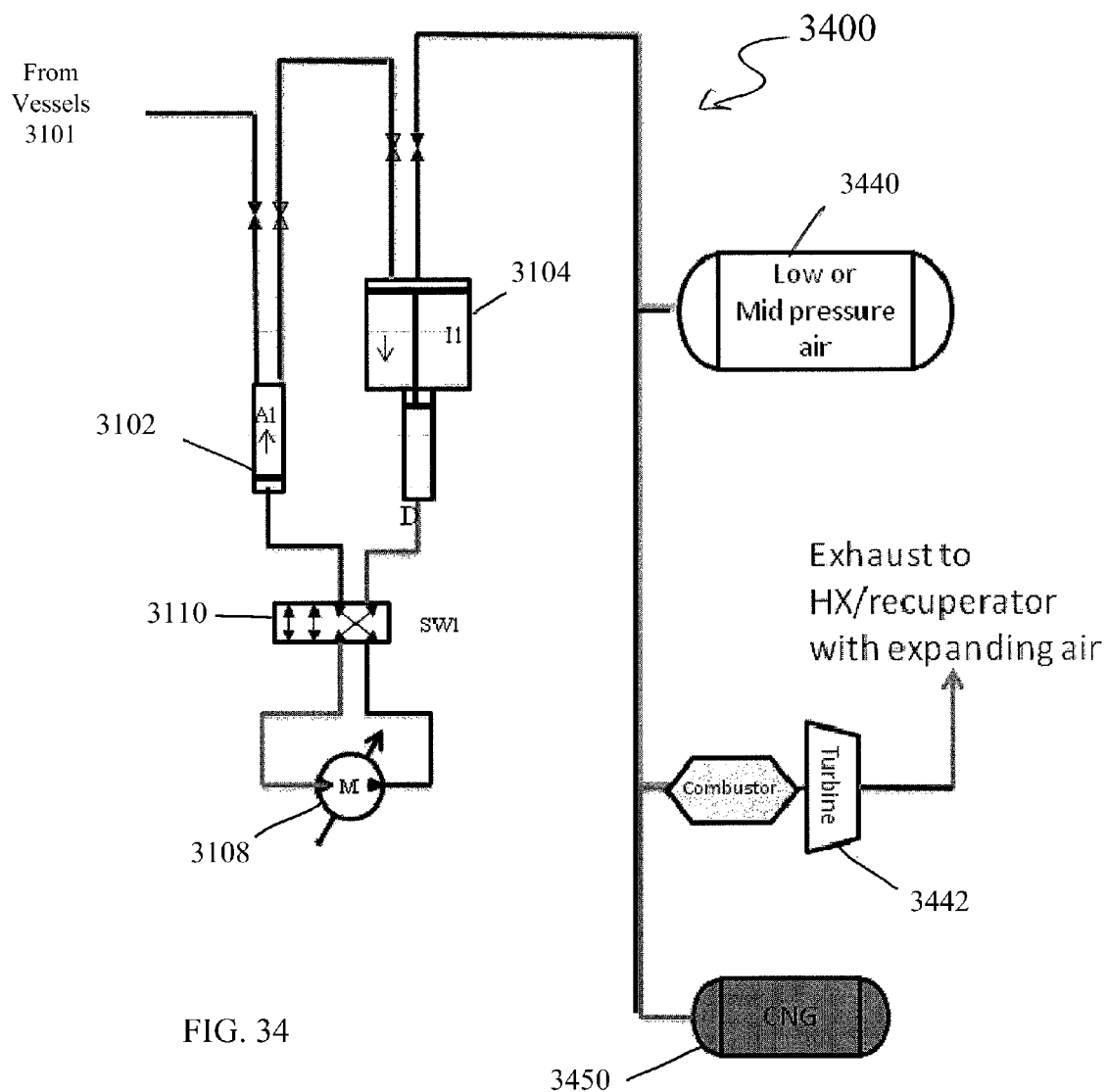
FIG. 34 is a schematic diagram of another alternative embodiment of the open-air staged hydraulic-pneumatic system of FIG. 32 including a low- or mid-pressure compressed natural gas turbine for increased power density and increased vehicle range.

FIG. 34 is a schematic diagram of another alternative embodiment of the system of FIG. 32. The system 3400 also includes a low- or mid-pressure compressed natural gas turbine/micro-turbine 3442 for increased power density and increased vehicle range. By adding a small pressure vessel with compressed natural gas 3450, the power density of the turbine 3442, as well as the range of the vehicle, can be increased substantially.

Figure 35:
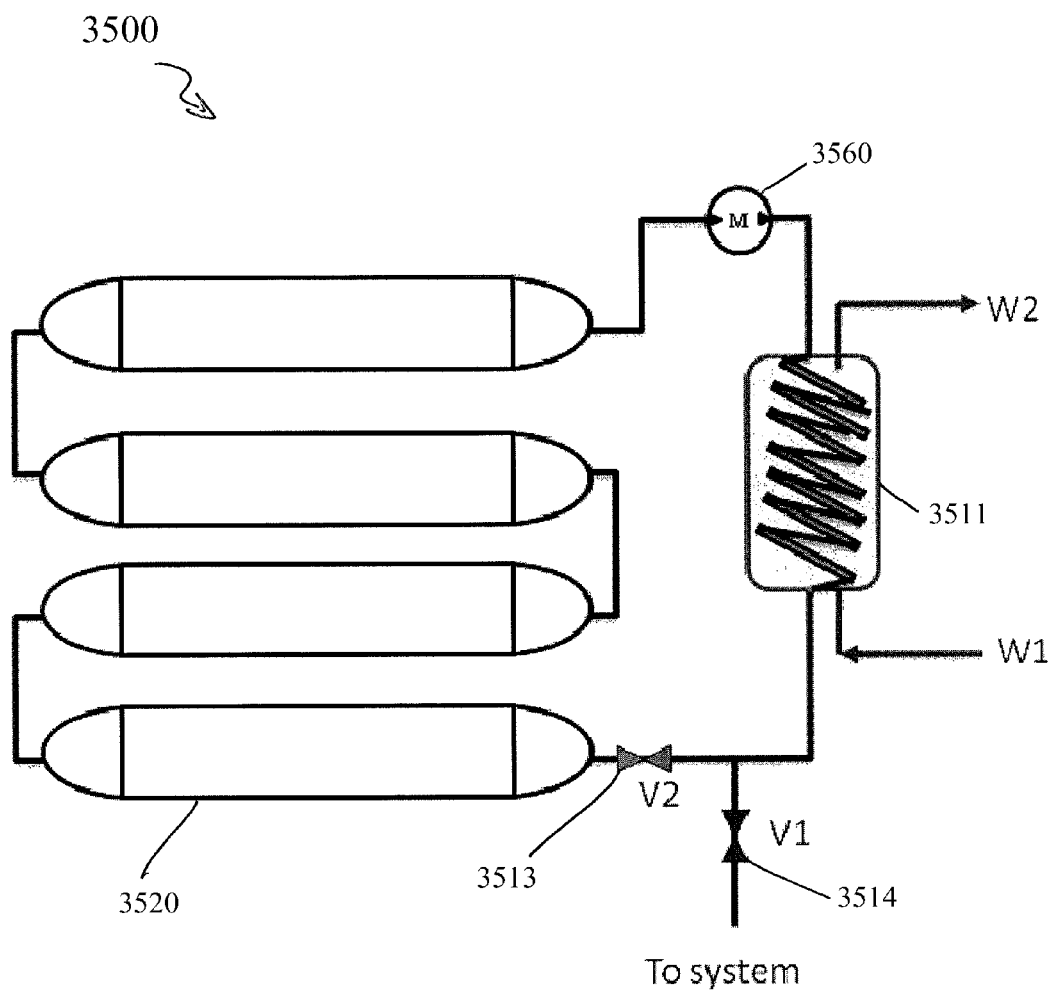
FIG. 35 is a schematic diagram of a compressed-air pressure vessel for use in a compressed-air vehicle propulsion system that uses an open-air staged hydraulic-pneumatic system in accordance with an alternative embodiment of the invention that uses the recuperation of thermal energy to preheat the compressed gas prior to and during expansion.

FIG. 35 is a schematic diagram of a compressed-air pressure vessel subsystem 3500 for a compressed air vehicle propulsion system using an open-air staged hydraulic-pneumatic system. The subsystem 3500 provides for the recuperation of thermal energy to preheat the compressed gas prior to and during expansion. Recuperated thermal energy (typically in the form of heated water or other fluid) from the combustion of compressed natural gas with compressed air is routed to a heat exchanger 3511 (e.g., a tube in shell type heat exchanger) where compressed air from the pressure vessels 3520 is circulated using an air pump 3560 operating as a circulator. The air pump 3560 operates with a small pressure change sufficient for circulation, but within a housing that is able to withstand high pressures: i.e., it circulates the high-pressure air through the heat exchanger 3511 without significantly increasing its pressure. In this way, the stored compressed air can be preheated by opening valve 3513 (V2) with valve 3514 (V1) closed and heated during expansion to the system by closing valve V2 and opening valve V1. Preheating a certain mass of compressed air in a fixed volume such as pressure vessels 3520 will increase the pressure of the compressed air and thus the stored potential energy. Upon expansion, more energy will be recovered from the compressed air, essentially recuperating energy from the waste heat of the turbine, and the final temperature of the expanded air will be higher than when the initial compressed air is at ambient temperature.

Figure 36:
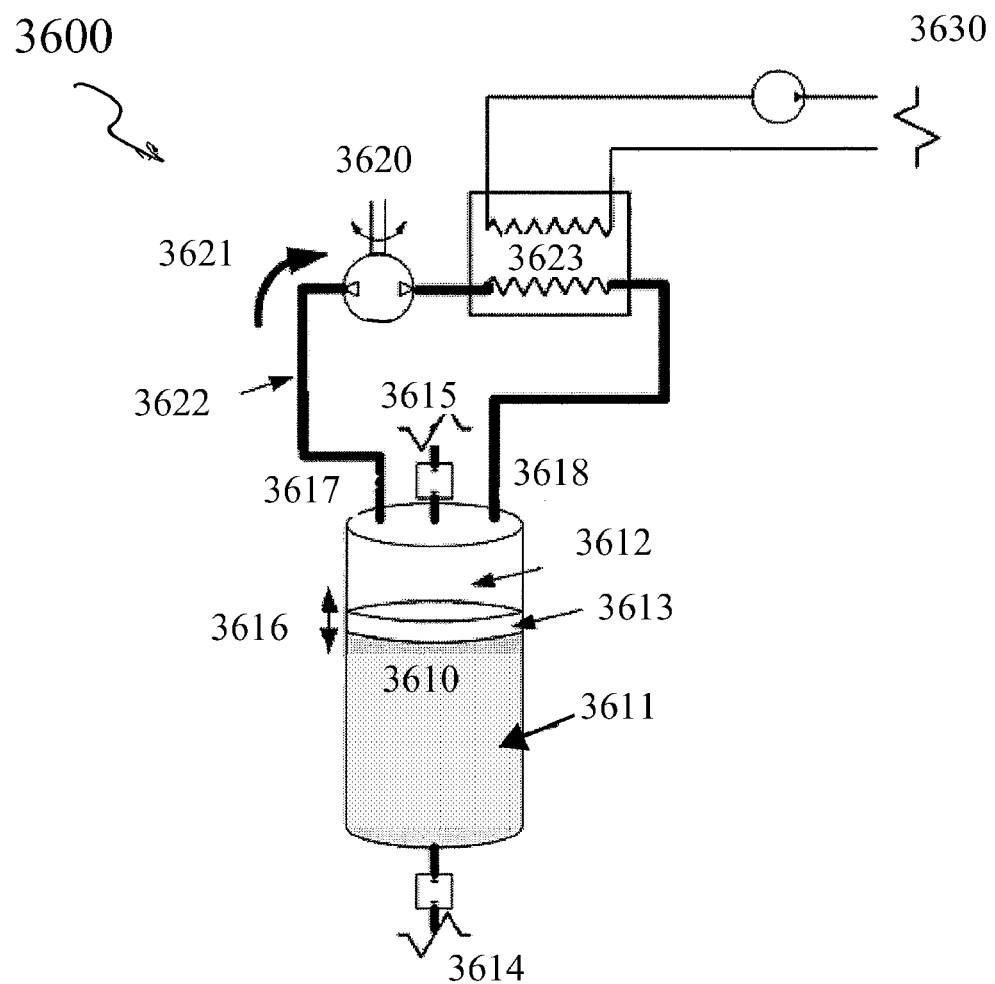
FIG. 36 is a schematic diagram of a hydraulic-pneumatic cylinder for use in a compressed air vehicle propulsion system that uses an open-air staged hydraulic-pneumatic system in accordance with an alternative embodiment of the invention that uses the recuperation of thermal energy to heat the compressed gas during expansion.

FIG. 36 is a diagram of a hydraulic-pneumatic cylinder (accumulator or intensifier), and heat transfer subsystem 3600 for use in a compressed air vehicle propulsion system using an open-air staged hydraulic-pneumatic system. The subsystem 3600 provides the recuperation of thermal energy to heat the compressed gas during expansion. The heat transfer subsystem 3600 can be of the types described in the '703 application incorporated herein. In one example of a heat transfer subsystem 3600, the cylinder 3610 (consisting of an air side 3612 separated by a moveable piston 3613 from a hydraulic fluid side 3611) has one or more gas circulation output ports (shown here as 3617, 3618) that are connected via piping 3622 to a gas circulator 3620 that is part of the heat transfer subsystem 3600. The gas circulator 3620 provides a predetermined flow (arrow 3621) of gas through the piping 3622. The output of the gas circulator 3620 is connected via a pipe to the gas input of a heat exchanger 3623. The other connections of the heat exchanger 3623 bring an external heat-exchange fluid (e.g., water) from a radiator or other source/sink 3630 to provide or extract thermal energy from the circulating compressed gas, maintaining the gas at nearly the temperature of the exchange fluid. As described in more detail in the '703 application, when using room-temperature external heat-exchange fluid, this system provides nearly isothermal expansion of the gases, improving efficiency and power output of the compressed gas energy storage and recovery system. In addition, the heated fluid can be used for vehicle interior heating and chilled fluid can be used for vehicle interior cooling.

Having described certain embodiments of the invention, it will be apparent to those of ordinary skill in the art that other embodiments incorporating the concepts disclosed herein may be used without departing from the spirit and scope of the invention. The described embodiments are to be considered in all respects as only illustrative and not restrictive.

What is claimed is:

1. An energy storage and recovery system suitable for the efficient use and conservation of energy resources, the system comprising:
    a pressure vessel for storage of compressed gas;
    selectively fluidly coupled to the pressure vessel, at least one liquid-piston cylinder assembly for at least one of expansion or compression of gas, whereby energy is recovered and stored during expansion and compression of the gas, respectively;
    selectively fluidly coupled to the at least one cylinder assembly, a vent for venting expanded gas to atmosphere;
    a control system for operating the at least one liquid-piston cylinder assembly; and
    a sensor system for monitoring at least a gas temperature in the at least one liquid-piston cylinder assembly, the control system being responsive to the sensor system,
    wherein the at least one of expansion or compression of the gas occurs substantially isothermally, thereby increasing efficiency of the energy recovery and storage.

2. The system of claim 1, wherein at least one said liquid-piston cylinder assembly comprises a liquid, and further comprising a heat transfer subsystem in fluid communication with the liquid-piston cylinder assembly, the heat transfer subsystem comprising:
    a circulation apparatus in fluid communication with the liquid-piston cylinder assembly for circulating the liquid through the heat transfer subsystem; and
    a heat exchanger in fluid communication with the circulation apparatus and the liquid-piston cylinder assembly, wherein the circulation apparatus circulates the liquid from the liquid-piston cylinder assembly, through the heat exchanger, and back to the liquid-piston cylinder assembly.

3. The system of claim 2, further comprising, disposed within the liquid-piston cylinder assembly, a spray mechanism for introducing the liquid into the liquid-piston cylinder assembly.

4. The system of claim 2, wherein the heat exchanger comprises a loop in fluid communication with a source of thermal energy comprising at least one of waste heat or an environmental heat exchanger at ambient temperature.

5. The system of claim 1, wherein (i) the at least one liquid-piston cylinder assembly comprises first and second liquid-piston cylinder assemblies, and (ii) the control system operates the first and second liquid-piston cylinder assemblies in a staged manner to provide a predetermined pressure profile at least one outlet.

6. The system of claim 1, wherein the at least one of expansion or compression of the gas is performed over a first range of pressures, and further comprising a pump/motor operative over the first range of pressures.

7. The system of claim 6, further comprising an electric motor/generator (i) coupled to the pump/motor, and (ii) operating at least one of substantially constant RPM, substantially constant torque, or substantially constant power.

8. The system of claim 6, further comprising a hydraulic booster fluidly coupled to and between the at least one liquid-piston cylinder assembly and the pump/motor.

9. The system of claim 1, wherein the at least one liquid-piston cylinder assembly comprises (i) a first liquid-piston cylinder assembly for at least one of expansion or compression of the gas over a first range of pressures, and (ii) a second liquid-piston cylinder assembly for at least one of expansion or compression of the gas over a second range of pressures lower than the first range of pressures.

10. An energy storage and recovery system suitable for the efficient use and conservation of energy resources, the system comprising:
    a pressure vessel for storage of compressed gas;
    selectively fluidly coupled to the pressure vessel, at least one liquid-piston cylinder assembly for at least one of expansion or compression of gas over a first range of pressures, whereby energy is recovered and stored during expansion and compression of the gas, respectively;
    selectively fluidly coupled to the at least one cylinder assembly, a vent for venting expanded gas to atmosphere;
    a control system for operating the at least one liquid-piston cylinder assembly;
    a sensor system for monitoring at least a gas temperature in the at least one liquid-piston cylinder assembly, the control system being responsive to the sensor system;
    a variable displacement hydraulic pump/motor operative over the first range of pressures; and
    an electric motor/generator (i) coupled to the pump/motor, and (ii) operating at least one of substantially constant RPM, substantially constant torque, or substantially constant power.

11. An energy storage and recovery system suitable for the efficient use and conservation of energy resources, the system comprising:
    a pressure vessel for storage of compressed gas;
    selectively fluidly coupled to the pressure vessel, at least one liquid-piston cylinder assembly for at least one of expansion or compression of gas, whereby energy is recovered and stored during expansion and compression of the gas, respectively, the at least one liquid-piston cylinder assembly comprising (i) a first liquid-piston cylinder assembly for at least one of expansion or compression of the gas over a first range of pressures, and (ii) a second liquid-piston cylinder assembly for at least one of expansion or compression of the gas over a second range of pressures lower than the first range of pressures;
    selectively fluidly coupled to the at least one cylinder assembly, a vent for venting expanded gas to atmosphere;
    a control system for operating the at least one liquid-piston cylinder assembly; and
    (i) coupled to the first liquid-piston cylinder assembly, a first pump/motor operative over the first range of pressures, and (ii) coupled to the second liquid-piston cylinder assembly, a second pump/motor operative over the second range of pressures.

12. The system of claim 11, wherein the first pump/motor comprises a variable displacement pump/motor.

13. The system of claim 11, wherein the second pump/motor comprises a hydraulic turbine.

14. The system of claim 11, further comprising (i) an electric motor/generator, and (ii) a shaft mechanically coupled to the electric motor/generator, wherein both of the first pump/motor and the second pump/motor are mechanically coupled to the shaft.

15. The system of claim 11, wherein at least one said liquid-piston cylinder assembly comprises a liquid, and further comprising a heat transfer subsystem in fluid communication with the liquid-piston cylinder assembly, the heat transfer subsystem comprising:
- a circulation apparatus in fluid communication with the liquid-piston cylinder assembly for circulating the liquid through the heat transfer subsystem; and
- a heat exchanger in fluid communication with the circulation apparatus and the liquid-piston cylinder assembly, wherein the circulation apparatus circulates the liquid from the liquid-piston cylinder assembly, through the heat exchanger, and back to the liquid-piston cylinder assembly.

16. The system of claim 15, further comprising, disposed within the liquid-piston cylinder assembly, a spray mechanism for introducing the liquid into the liquid-piston cylinder assembly.

17. The system of claim 15, wherein the heat exchanger comprises a loop in fluid communication with a source of thermal energy comprising at least one of waste heat or an environmental heat exchanger at ambient temperature.

18. The system of claim 11, wherein the control system operates the first and second liquid-piston cylinder assemblies in a staged manner to provide a predetermined pressure profile at least one outlet.

19. The system of claim 11, further comprising an electric motor/generator (i) coupled to at least one of the first pump/motor or the second pump/motor, and (ii) operating at least one of substantially constant RPM, substantially constant torque, or substantially constant power.

20. The system of claim 11, further comprising a sensor system for monitoring at least a gas temperature in the at least one liquid-piston cylinder assembly, the control system being responsive to the sensor system.

* * * * *

UNITED STATES PATENT AND TRADEMARK OFFICE
CERTIFICATE OF CORRECTION

Page 1 of 1

PATENT NO. : 8,046,990 B2
APPLICATION NO. : 13/026920
DATED : November 1, 2011
INVENTOR(S) : Benjamin R. Bollinger et al.

It is certified that error appears in the above-identified patent and that said Letters Patent is hereby corrected as shown below:

Column 55, Claim 5, line 59, should read:
-- profile at at least one outlet --

Column 55, Claim 7, line 66, should read:
-- operating at at least one of substantially constant RPM, substantially --

Column 56, Claim 10, line 31, should read:
-- and (ii) operating at at least one of substantially constant --

Column 58, Claim 18, line 8, should read:
-- profile at at least one outlet --

Column 58, Claim 19, line 11, should read:
-- motor or the second pump/motor, and (ii) operating at at least --

Signed and Sealed this
Sixth Day of December, 2011

David J. Kappos
*Director of the United States Patent and Trademark Office*